United States Patent [19]

Goto et al.

[11] Patent Number: 5,496,984
[45] Date of Patent: Mar. 5, 1996

[54] ELECTRICAL DISCHARGE MACHINE AND MACHINING METHOD THEREFOR

[75] Inventors: Akihiro Goto; Yoshio Ozaki; Atsushi Taneda, all of Aichi; Tatsushi Sato; Yoshihito Imai, both of Hyogo, all of Japan

[73] Assignee: Mitsubishi Denki Kabushiki Kaisha, Tokyo, Japan

[21] Appl. No.: 998,840

[22] Filed: Dec. 30, 1992

[30] Foreign Application Priority Data

Jan. 7, 1992 [JP] Japan .................................. 4-000786
Feb. 17, 1992 [JP] Japan .................................. 4-029711
Nov. 20, 1992 [JP] Japan .................................. 4-311963

[51] Int. Cl.$^6$ .................................................. B23H 1/02
[52] U.S. Cl. ................................ 219/69.18; 219/69.13; 219/69.17; 219/69.19
[58] Field of Search ........................ 219/69.13, 69.18, 219/69.19, 69.17

[56] References Cited

U.S. PATENT DOCUMENTS

| | | | |
|---|---|---|---|
| 3,705,286 | 12/1972 | Kondo et al. | 219/69.13 |
| 3,746,930 | 7/1973 | Van Best et al. | 361/86 |
| 3,812,317 | 5/1974 | De Bont et al. | 219/69.18 |
| 3,864,541 | 2/1975 | Inoue | 219/69.13 |
| 3,973,104 | 8/1976 | Ullmann et al. | 219/69.18 |
| 3,997,753 | 12/1976 | Inoue | 219/69.13 |
| 4,009,361 | 2/1977 | Stanton et al. | 219/69.13 |
| 4,071,729 | 1/1978 | Bell, Jr. | 219/69.13 |
| 4,236,057 | 11/1980 | Inoue | 219/69.13 |
| 4,322,595 | 3/1982 | Fowell et al. | 219/69.13 |
| 4,338,504 | 7/1982 | Gray | 219/69.13 |
| 4,348,573 | 9/1982 | El-Menshawy et al. | 219/69.17 |
| 4,367,400 | 1/1983 | Otto et al. | 219/69.13 |
| 4,504,722 | 3/1985 | Kishi et al. | 219/69.18 |
| 4,582,974 | 4/1986 | Itoh | 219/69.13 |
| 4,673,791 | 6/1987 | Konno et al. | 219/69.17 |
| 4,728,764 | 3/1988 | Matsumoto et al. | 219/69.13 |
| 4,731,514 | 3/1988 | Naotake et al. | 219/69.19 |
| 4,800,248 | 1/1989 | Futamura et al. | 219/69.18 |
| 4,806,719 | 2/1989 | Seevieder et al. | 219/69.13 |

FOREIGN PATENT DOCUMENTS

| | | | |
|---|---|---|---|
| 0009928 | 4/1980 | European Pat. Off. . | |
| 0252239 | 1/1988 | European Pat. Off. . | |
| 2099228 | 3/1972 | France . | |
| 2252900 | 6/1975 | France . | |
| 3327900 | 2/1984 | Germany . | |
| 47-13795 | 7/1972 | Japan . | |
| 49-135298 | 12/1974 | Japan . | |
| 53-143098 | 12/1978 | Japan . | |
| 59-192421 | 10/1984 | Japan | 219/69.13 |
| 61-44530 | 3/1986 | Japan | 219/69.13 |
| 64-5724 | 1/1989 | Japan | 219/69.13 |
| 2-212023 | 8/1990 | Japan | 219/69.13 |
| 2171822 | 9/1986 | United Kingdom | 219/69.18 |

Primary Examiner—Geoffrey S. Evans
Attorney, Agent, or Firm—Sughrue, Mion, Zinn, Macpeak & Seas; Richard C. Turner

[57] ABSTRACT

A method and apparatus for detecting and controlling the operation of an electric discharge machine for machining a workpiece. The machining is conducted by generating pulse discharges at a machining gap formed by a machining electrode and the workpiece opposed to each other. The alternating-current components or high frequency components of at least one of the current, voltage and impedance of the machining gap, the rectified components thereof, or amplitude, frequency or other signal characteristics thereof are detected and processed for control of the machining. The processing may include frequency analysis, pulse counting, threshold detection and the like using analog and digital processing.

35 Claims, 33 Drawing Sheets

| DISCHARGE STATUS DETECTOR \ SHORT CIRCUIT DETECTOR | SHORT CIRCUIT | NON-SHORT CIRCUIT |
|---|---|---|
| NORMAL | SHORT CIRCUIT | NORMAL |
| QUASI-ARC | SHORT CIRCUIT | QUASI-ARC |
| ARC | SHORT CIRCUIT | ARC |

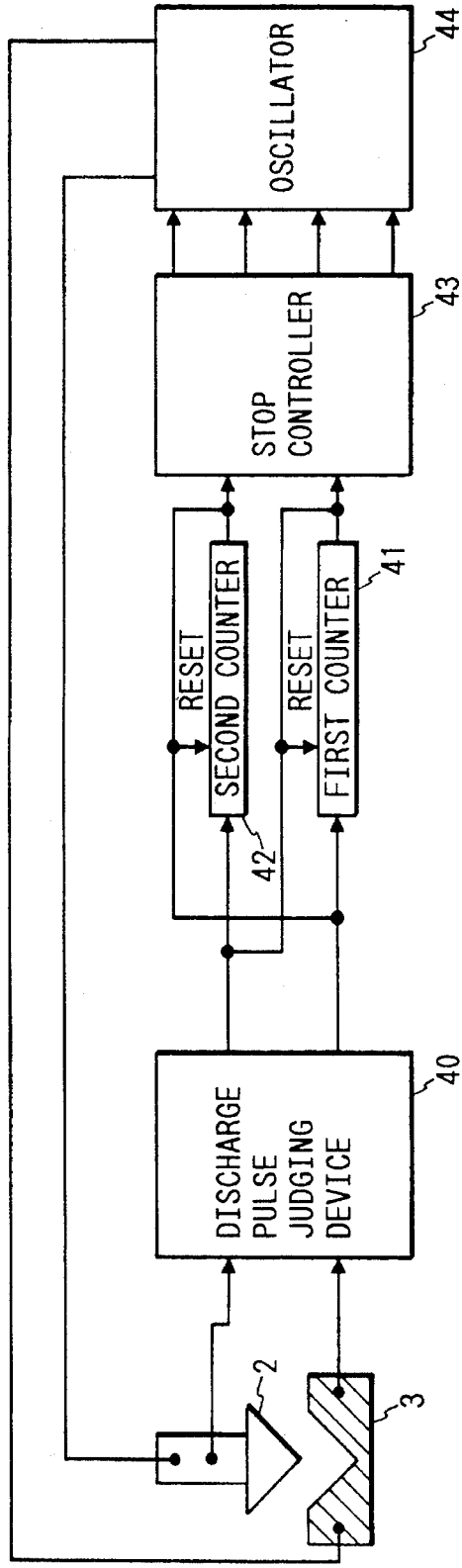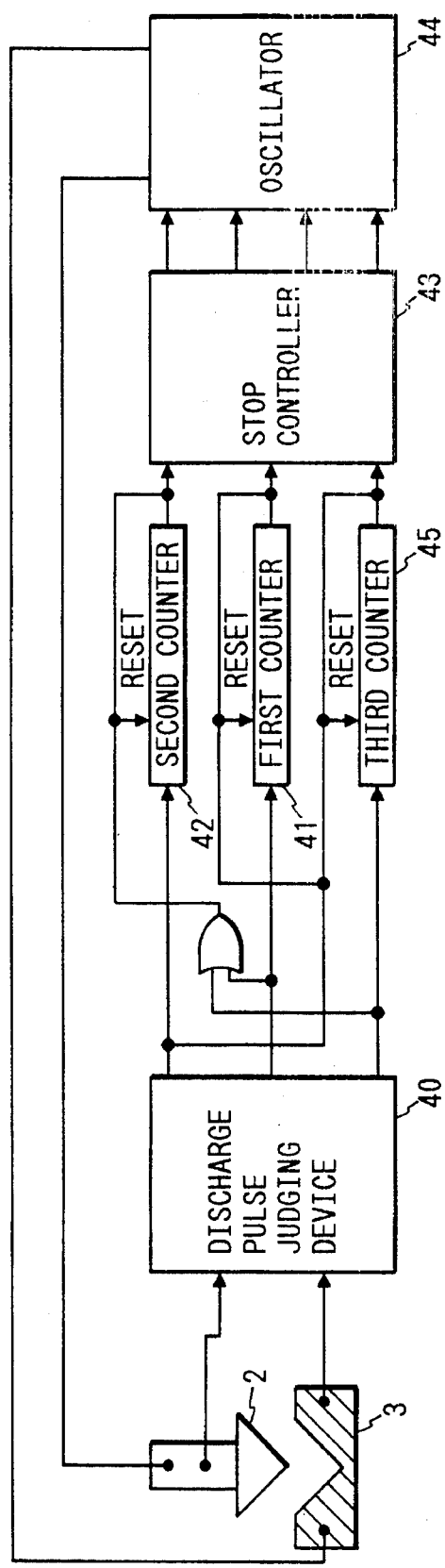

PATTERN A          PATTERN B

ELECTRICAL DISCHARGE MACHINE AND MACHINING METHOD THEREFOR

BACKGROUND OF THE INVENTION

1. Field of the Invention

The present invention relates to an electrical discharge machining method and an electrical discharge machine.

2. Description of the Background Art

In electrical discharge machining, a machining status must be detected and controlled to avoid the damage to workpiece surfaces caused by the generation of arc discharges. In an electrical discharge machine known in the art, an average voltage and current in a machining gap formed by a machining electrode and a workpiece opposed to each other were detected and the electrode position was adjusted to maintain the machining status. However, since it is difficult to avoid the generation of arc discharges only by detecting the average machining status of the machining gap, the workpiece is machined under machining conditions biased toward a considerably safe side. To improve the machining performance of the electrical discharge machine, the discharge status must be detected every electrical discharge and the optimum machining status maintained.

It is known that high frequency components overlap a voltage waveform, a current waveform and a gap impedance waveform during a normal discharge and they do not overlap the same during a faulty discharge. By utilizing this principle, a device for detecting a discharge status every electrical discharge has been devised. A device for separating these high frequency components with a high-pass filter and judging whether a discharge is normal or faulty is disclosed, for example, in Japanese Laid-Open Patent Publication No. SHO47-13795.

FIG. 49 shows an example of such conventional electrical discharge machine, wherein the numeral 1 indicates a machining power supply, 2 denotes an electrode, 3 represents a workpiece, 4 designates low frequency intercepting means, e.g., a high-pass filter, 5 indicates a rectifier, 35, 36 and 37 represent Schmidt circuits which are different in inverse voltage from each other, 38 denotes a switch, and 7 designates a discharge status display device.

Operation will now be described. Only while the machining power supply 1 applies a voltage to a machining gap, the switch 38 causes the voltage value of the machining gap to pass through the high-pass filter 4. The output of the high-pass filter 4 is rectified by the rectifier 5, segmented at a plurality of levels by the plurality of Schmidt circuits 35, 36, 37, and digitally displayed as a signal indicating a discharge status.

In the conventional electrical discharge machine which operates as described above, since the output of the high-pass filter 4 oscillates finely around approximately 0 V, the output of the rectifier 5 oscillates finely between 0 V and a maximum amplitude value. Accordingly, even the Schmidt circuits cannot prevent the discharge status output from making frequent changes and, in fact, the discharge status cannot be identified accurately.

Also, as the present inventors determined, high frequency components occurred immediately after the start of a discharge, independently of whether the discharge is normal or faulty. Thus, the conventional electrical discharge machine would determine a deteriorated discharge status as normal because the discharge status was detected over a whole discharge period.

Further, if a short circuit takes place at the machining gap, the amount of high frequency components generated depends on the degree of the short circuit. The deterioration of the discharge status and the occurrence of the short circuit are essentially different from each other and must be treated differently. However, since the discharge status is only judged according to the magnitude of high frequency components in the conventional electrical discharge machine, the discharge status is judged and machining conditions are controlled independently of whether a short circuit exists or not.

It is, accordingly, an object of the present invention to overcome the disadvantages in the conventional art by providing an electrical discharge machining apparatus and method therefor which detect a discharge status precisely at every single discharge and which control electrical discharge machining conditions precisely on the basis of the detected discharge status.

SUMMARY OF THE INVENTION

The first embodiment of the invention rectifies and smoothes the alternating-current components or high frequency components of at least one of the current, voltage and impedance of the machining gap to prevent the variations of the discharge status output and detect the discharge status accurately.

The second embodiment rectifies and averages the alternating-current components or high frequency components of at least one of the current, voltage and impedance of the machining gap to prevent the variations of the discharge status output and detect the discharge status accurately.

The third embodiment rectifies and integrates the alternating-current components or high frequency components of at least one of the current, voltage and impedance of the machining gap and resets integration per pulse to prevent the variations of the discharge status output and detect the discharge status accurately.

The fourth and fifth embodiments operate at integration starting time which is the time when the time constant of the low frequency intercepting means has elapsed, starting at the discharge occurrence time, to eliminate the influence of a disturbance waveform attributable to the transient characteristic of the low frequency intercepting means.

The sixth embodiment measures the length of time when at least one of the current, voltage and impedance of the machining gap, or the alternating-current components or high frequency components of the current, voltage and impedance of the machining gap, or the rectified outputs of the alternating-current components or high frequency components of the current, voltage and impedance of the machining gap is larger or smaller than the reference value to detect the magnitude of the high frequency components during a discharge and detect the discharge status precisely.

The seventh embodiment measures the number of times when at least one of the current, voltage and impedance of the machining gap, or the alternating-current components or high frequency components of the current, voltage and impedance of the machining gap, or the rectified outputs of the alternating-current components or high frequency components of the current, voltage and impedance of the machining gap is larger than the reference value to detect the magnitude of the high frequency components during discharge and detect the discharge status precisely.

The eighth and ninth embodiments measure at least either of the maximum value and minimum value during a discharge for at least one of the current, voltage and impedance of the machining gap, or the alternating-current components or high frequency components of the current, voltage and impedance of the machining gap, or the rectified outputs of the alternating-current components or high frequency components of the current, voltage and impedance of the machining gap to detect the magnitude of the high frequency components during discharge and detect the discharge status precisely.

The tenth embodiment conducts frequency analyses on at least one of the current, voltage and impedance of the machining gap and finds a frequency distribution or strength in a specific frequency zone to make frequency analyses only on the pulse waveform during a discharge and to detect the discharge status precisely.

The eleventh embodiment also adds up the outputs of the discharge status detecting means over a plurality of pulses to detect the discharge status precisely even in a condition under which a sufficient discharge status detection output cannot be provided by one pulse.

The twelfth embodiment measures the alternating-current components or high frequency components of the current, voltage and impedance of the machining gap not less than 1 μsec after the occurrence of a discharge to detect the discharge status, whereby the influence of the high frequency components generated immediately after the start of the discharge can be avoided.

The thirteenth embodiment detects not only the discharge status but also the occurrence of a short circuit, whereby the deterioration of the discharge status can be differentiated from the short circuit occurrence and the discharge status can be detected precisely.

The fourteenth embodiment detects not only the discharge status but also the occurrence of a short circuit, executes only one type of machining condition control independently of the detected discharge status if a short circuit has occurred, and controls the machining condition according to the detected discharge status if a short circuit does not occur, whereby the discharge status can be detected precisely and the machine can be simplified.

The fifteenth embodiment precisely detects the electrical discharge machining status at the machining gap.

The sixteenth embodiment prevents continuous arcs from occurring for a period of time required to change the machining condition from the command means when electrical discharge machining is being carried out under the machining condition which will deteriorate the discharge status especially abruptly.

The seventeenth embodiment precisely detects the electrical discharge machining status at the machining gap and prevents continuous arcs from occurring for a period of time required to change the machining condition from the command means when electrical discharge machining is being carried out under the machining condition which will deteriorate the discharge status especially abruptly.

Each of the eighteenth and nineteenth embodiments properly detects in its early stage the premonitory phenomenon of continuous arcs which will damage the machined surface of the workpiece and exercises prompt control to avoid continuous arcs.

The twentieth embodiment properly detects in its early stage the premonitory phenomenon of continuous arcs which will damage the machined surface of the workpiece and exercises prompt control to avoid continuous arcs.

Each of the twenty-first and twenty-second embodiments selects an appropriate machining condition to avoid a continuous arc phenomenon which will damage the machined surface of the workpiece.

The electrical discharge machine concerned with the twenty-third and twenty-fourth embodiments properly detects in its early stage the premonitory phenomenon of continuous arcs which will damage the machined surface of the workpiece, exercises prompt control to avoid continuous arcs, and selects an appropriate machining condition.

Each of the twenty-fifth to the twenty-seventh embodiments provides a stable machining status in the initial stage of electrical discharge machining.

The twenty-eighth embodiment samples and converts the discharge voltage, discharge current or impedance into digital values and analyzes the high frequency components, direct-current component, etc., of the waveform on the basis of said digital values to eliminate disturbance attributable to the transient characteristic of the low frequency intercepting means or high frequency intercepting means.

The twenty-ninth embodiment recognizes the waveform shape of the discharge voltage, discharge current or impedance to eliminate disturbance attributable to the transient characteristic of the low frequency intercepting means or high frequency intercepting means.

BRIEF DESCRIPTION OF THE DRAWINGS

FIG. 30 is a block diagram illustrating a sixteenth embodiment of the invention.

FIG. 32 is a block diagram illustrating a seventeenth preferred embodiment of the invention.

DESCRIPTION OF THE PREFERRED EMBODIMENTS

Figure 1:
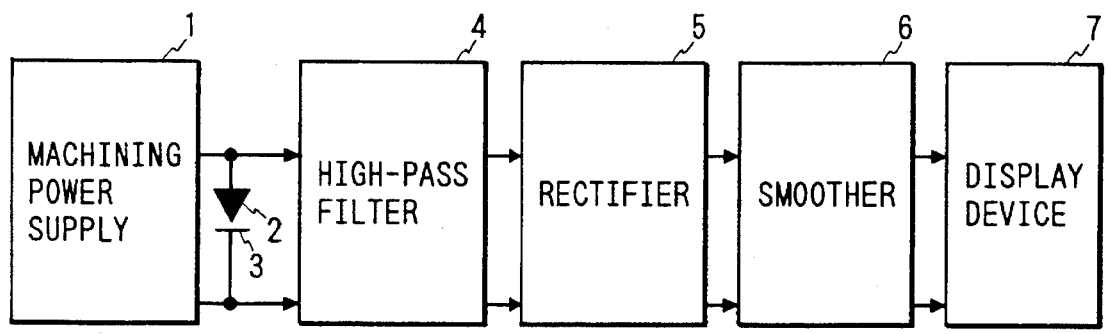
FIG. 1 is an arrangement diagram illustrating a first embodiment of the invention.
Figure 2:
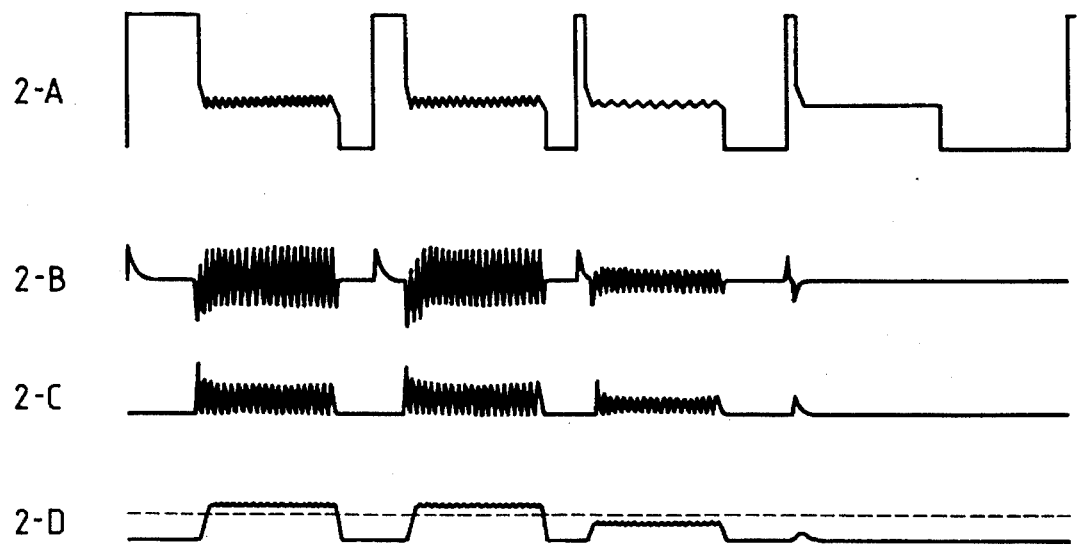
FIG. 2 illustrates waveform diagrams of certain input/output signals in the main area of the first embodiment of the invention.
Figure 49:
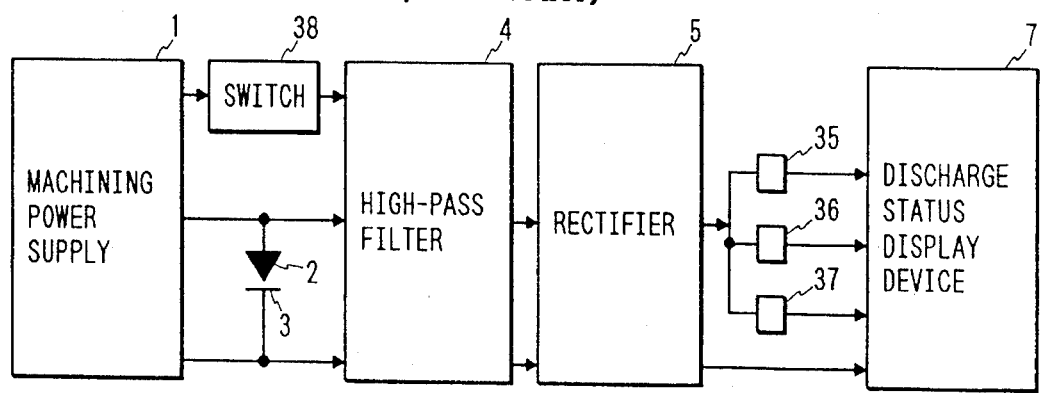
FIG. 49 is an arrangement diagram of an electrical discharge machine known in the art.

A first embodiment of the prevent invention will now be described with respect to FIG. 1, which is an arrangement diagram of an apparatus related to the present invention. Parts identical or corresponding to the conventional electrical discharge machine illustrated in FIG. 49 are given identical reference characters and will not be described here. In FIG. 1, the numeral 6 indicates a smoothing device, e.g., a smoother consisting of a resistor and a capacitor. FIG. 2 shows an input/output signal waveform example in the main area of the present embodiment, wherein waveform 2-A shows the voltage waveform of the machining gap, waveform 2-B shows the output waveform of the high-pass filter 4, waveform 2-C shows the output waveform of the rectifier 5, and waveform 2-D shows the output waveform of the smoother 6. A broken line shown in waveform 2-D indicates a judgement threshold value (a given set value). A discharge is normal if high frequency components are located above this threshold value, and is abnormal or is becoming abnormal if the high frequency components are located below the threshold value.

Operation will now be described with reference to FIGS. 1 and 2. A pulse-shaped voltage is applied to the machining gap by the machining power supply 1 to carry out electrical discharge machining. At this time, the voltage waveform 2-A of the machining gap is, for example, as shown in FIG. 2. From this voltage waveform, only high frequency components are fetched by the high-pass filter 4 and the waveform 2-B changes as shown in FIG. 2. They are then rectified by the rectifier 5 and change into a signal waveform 2-C as shown in FIG. 2, and subsequently, are smoothed by the smoother 6 and change into a signal waveform 2-D, as shown in FIG. 2. According to the level of this output, the display device 7 shows the discharge status.

When the high frequency components are rectified and then smoothed as described above, the magnitude of the high frequency components is provided as a voltage level, the variation of the discharge status output is prevented, and the discharge status can be detected accurately.

Figure 3:
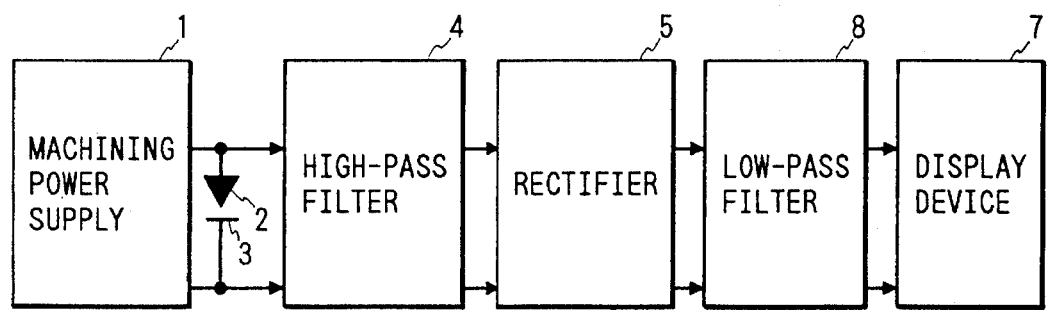
FIG. 3 is an arrangement diagram illustrating a second embodiment of the invention.
Figure 4:
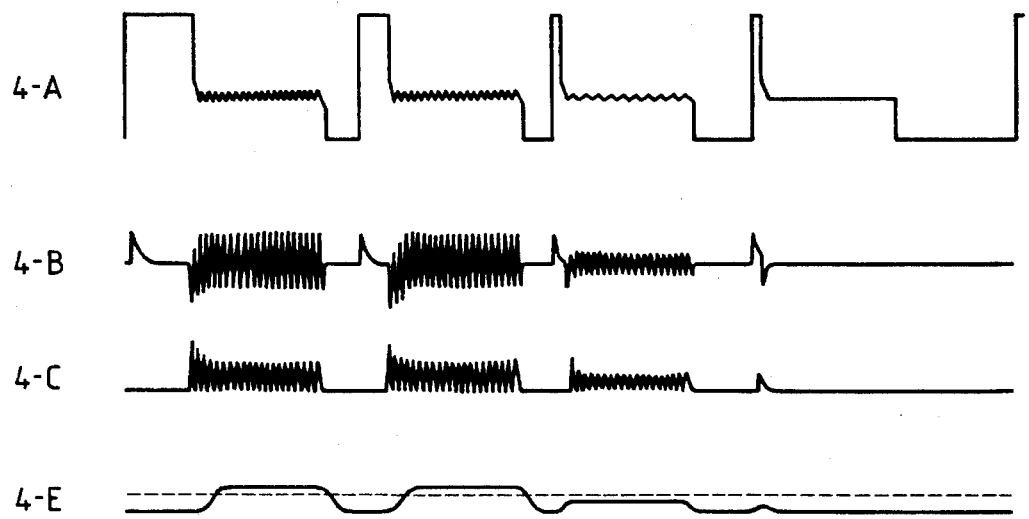
FIG. 4 illustrates waveform diagrams of certain input/output signals in the main area of the preferred embodiment of FIG. 3.

FIG. 3 is an arrangement diagram of a second embodiment of the invention. Parts identical or corresponding to the embodiment in FIG. 1 are given identical reference characters and will not be described here. In FIG. 3, the numeral 8 indicates a low-pass filter acting as averaging means for averaging the output of the rectifier 5. FIG. 4 shows an input/output signal waveform example in the main area of the present embodiment, wherein the voltage waveform of the machining gap 4-A, the high-pass filter 4 output waveform 4-B, the rectifier 5 output waveform 4-C, and the low-pass filter 8 output waveform 4-E, can be seen.

Operation will now be described with reference to FIGS. 3 and 4. A pulse-shaped voltage is applied to the machining gap by the machining power supply 1 to carry out electrical discharge machining. At this time, the voltage waveform of the machining gap is, for example, as shown in waveform 4-A. From this voltage waveform, only high frequency components are fetched by the high-pass filter 4 and the waveform changes as shown in waveform 4-B. They are then rectified by the rectifier 5 and change into a signal waveform 4-C, and subsequently, are averaged by the low-pass filter 8 and change into a signal waveform 4-E. According to the level of this output, the display device 7 shows the discharge status.

When the high frequency components are rectified and then averaged as described above, the magnitude of the high frequency components is provided as a voltage level, the variation of the discharge status output is prevented, and the discharge status can be detected accurately.

Figure 5:
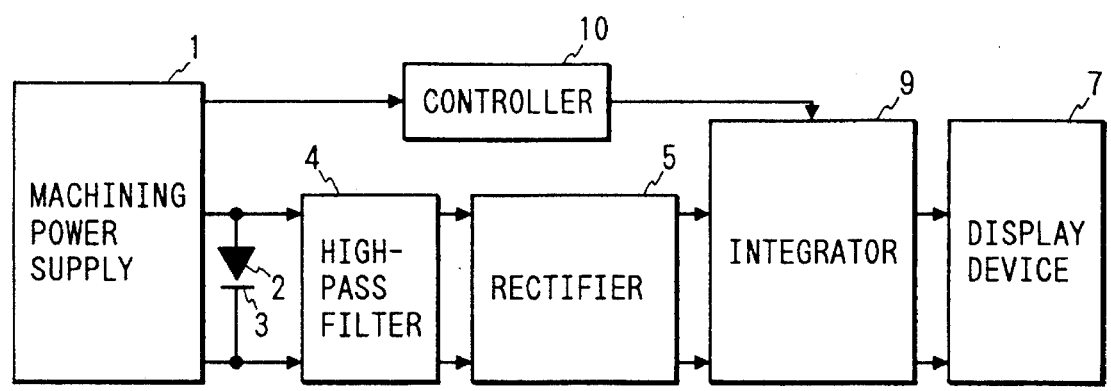
FIG. 5 is an arrangement diagram illustrating a third embodiment of the invention.
Figure 6:
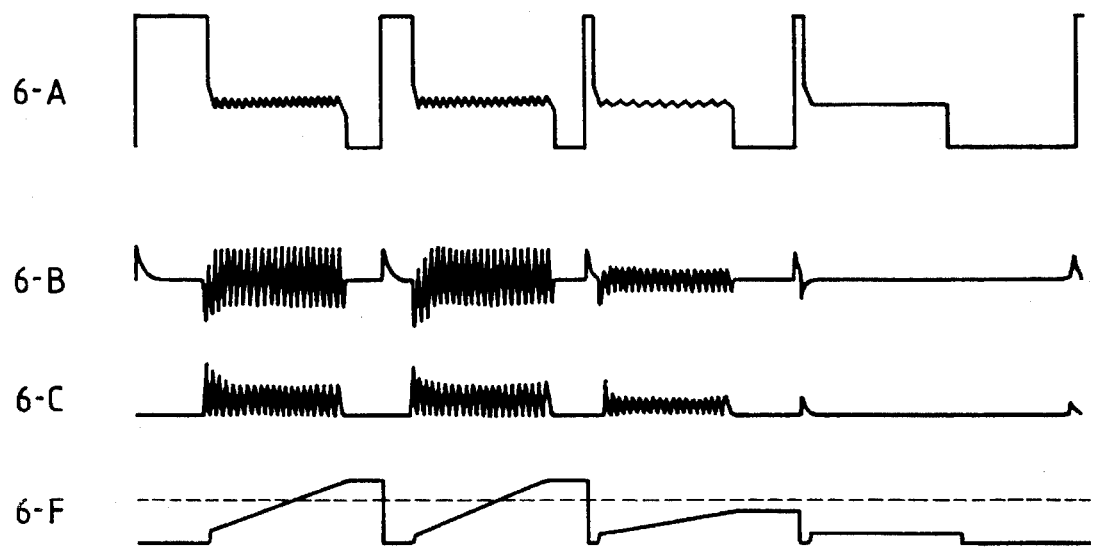
FIG. 6 is a waveform diagram illustrating input/output signals in the main area of the preferred embodiment of the invention in FIG. 5.

FIG. 5 is an arrangement diagram of a third embodiment of the invention. Parts identical or corresponding to the embodiment in FIG. 1 are given identical reference characters and will not be described here. In FIG. 5, the numeral 9 indicates an integrator and 10 represents a controller for controlling the integration start and reset of the integrator 9. FIG. 6 shows an input/output signal waveform example in the main area of the present embodiment, wherein the voltage waveform 6-A of the machining gap, the output waveform 6-B of the high-pass filter 4, the output waveform 6-C of the rectifier 5, and the output waveform 6-F of the integrator 9, can be seen.

Operation will now be described with reference to FIGS. 5 and 6. A pulse-shaped voltage is applied to the machining gap by the machining power supply 1 to carry out electrical discharge machining. At this time, the voltage waveform of the machining gap is, for example, shown as waveform 6-A. From this voltage waveform, only high frequency components are fetched by the high-pass filter 4 and the waveform changes to that illustrated as 6-B. They are then rectified by the rectifier 5 and change into a signal waveform 6-C. In the meantime, when the controller 10 controls the integrator 9 to reset integration at the application of the voltage to the machining gap and to start integration at the occurrence of a discharge, the output waveform of the integrator 9 is as shown as signal 6-F. According to this output value of the integrator 9 detected during stop time, the display device 7 shows the discharge status.

When the high frequency components are rectified and then integrated as described above, the magnitude of the high frequency components is provided as a voltage level, the variation of the discharge status output is prevented, and the discharge status can be detected accurately.

While the integrator 9 was controlled in synchronization with voltage application or discharge occurrence in this embodiment, it is apparent that the integrator 9 may be controlled at any timing if the output of the rectifier 5 can be integrated per pulse, e.g., integration is started a predetermined period of time after a discharge has occurred, integration is reset and started simultaneously with voltage application, or integration is reset immediately before integration start after discharge occurrence. Also, when this embodiment is designed to hold or check the output of the integrator 9 a predetermined period of time after integration start, the discharge status output can be provided independently of the termination time of the discharge and identical effects are produced.

Figure 7:
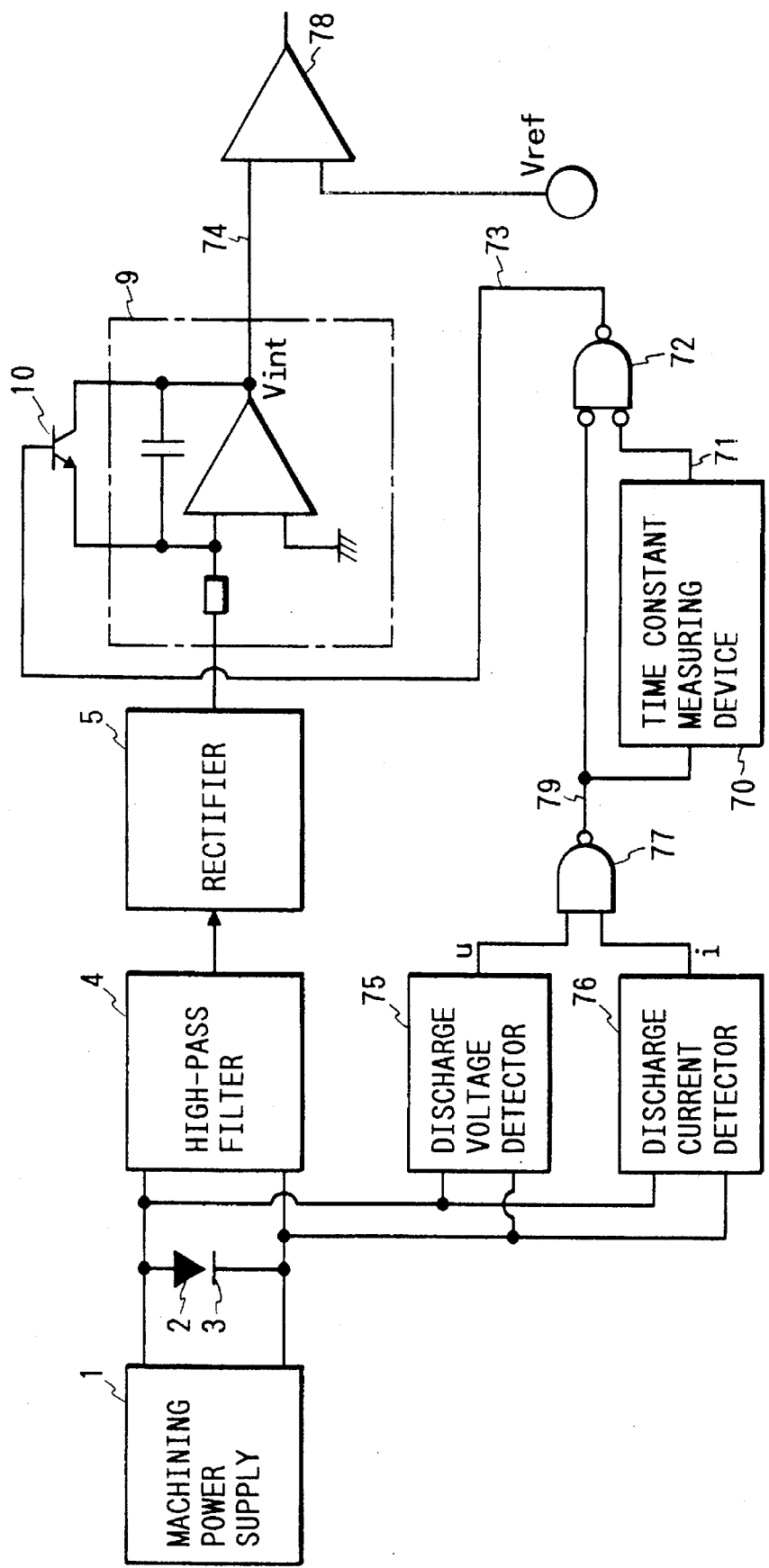
FIG. 7 is an arrangement diagram illustrating a fourth embodiment of the invention.
Figure 8:
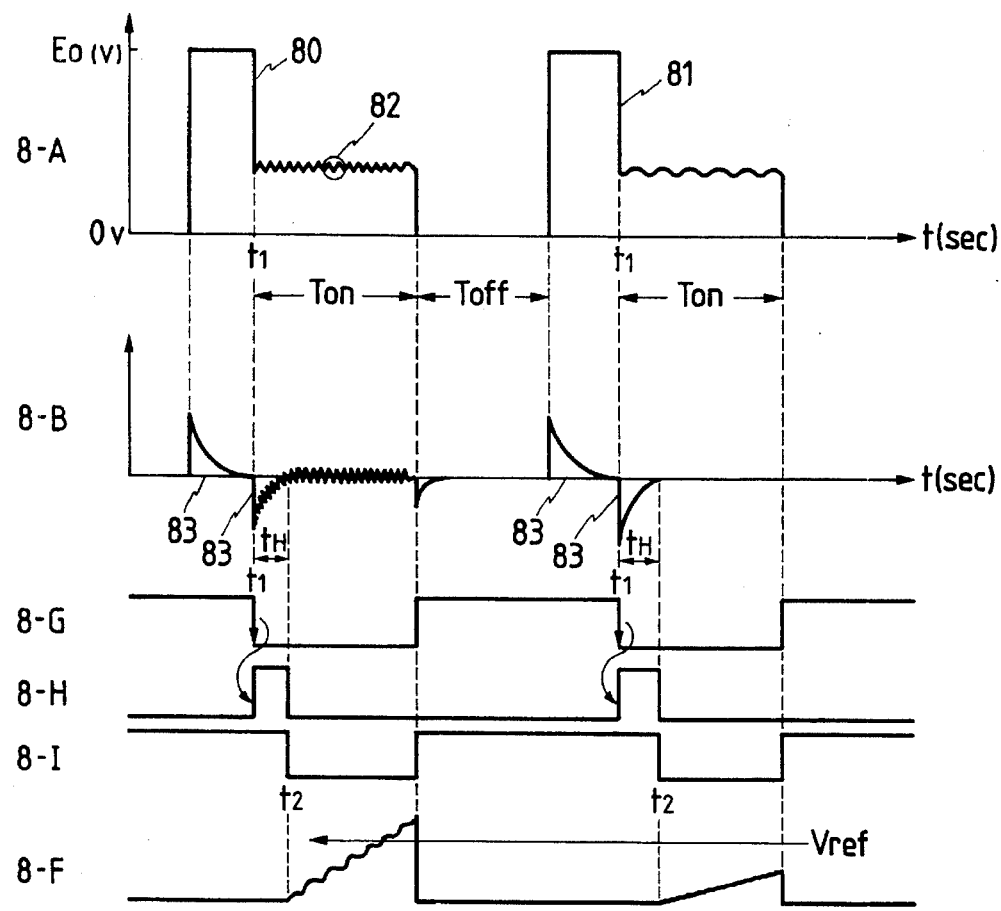
FIG. 8 is a waveform diagram illustrating input/output signals in the main area of the preferred embodiment in FIG. 7.

FIG. 7 is an arrangement diagram of a fourth embodiment of the invention. Parts identical or corresponding to the embodiment in FIG. 5 are given identical reference characters and will not be described here. In FIG. 7, the numeral 70 indicates a time constant measuring device serving as time constant measuring means for measuring the time constant tH of the high-pass filter 4, 71 represents an output thereof, 72 denotes a logic circuit, 73 designates an output thereof, 74 indicates an output of the integrator 9, and 10 denotes a reset device for the integrator 9. 75 indicates a discharge voltage detector, 76 designates a discharge current detector, 77 denotes a logic circuit, and 78 indicates a comparator. FIG. 8 shows an input/output signal waveform example in the main area of the present embodiment, wherein the voltage waveform of the machining gap 8-A, the output waveform 8-B of the high-pass filter 4, the output waveform 8-G of the logic circuit 77, the output waveform 8-H of the time constant measuring device 70, the output waveform 8-I of the logic circuit 72, and the output waveform 8-F of the integrator are shown.

Operation will now be described with reference to FIGS. 7 and 8. In FIG. 8, 80 and 81 indicate discharge voltage waveforms of the machining gap, Ton denotes a discharge pulse width, Toff represents stop time, t1 designates discharge detection time, t2 indicates time after the time constant tH of the high-pass filter 4 starting at discharge detection time t1 (t2=t1+tH), 82 represents high frequency components of the discharge voltage, and 83 designates a disturbance waveform attributable to the transient characteristic of the high-pass filter 4, and the time constant measuring device 70 outputs a high level for a period of time tH, starting at the time when the output 79 of the logic circuit 77 rises, as shown in waveform 8-H. The logic circuit 72 receives the output 79 of the logic circuit 77 and the output 71 of the time constant measuring device 70 and outputs the signal 73 shown as waveform 8-I. The time when the output signal 73 rises is indicated as t2 in waveform 8-I. The reset device 10 resets the integrator 9 while the output 73 of the logic circuit 72 is high. Namely, only while the output 73 of the logic circuit 72 is low, the integrator 9 integrates rectification output Vrec. The comparator 78 compares reference voltage Vref with the integration output 74 shown in waveform 8-F, judges it as a normal discharge pulse if the integration output 74 is larger than reference voltage Vref at the end of discharge pulse width Ton, and judges it as an arc discharge pulse if smaller.

Figure 9:
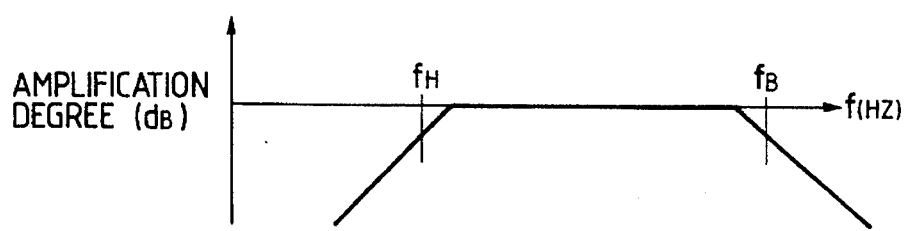
FIG. 9 is an arrangement diagram illustrating a modification of the fourth embodiment of the invention.

Whereas the detection of the high frequency components of the discharge voltage waveform was described in this embodiment, it is apparent that the principles of the embodiment are applicable to the discharge current waveform and the impedance waveform of the machining gap. Also, while the use of the high-pass filter was described in the fourth embodiment, the same effects will be produced by using a band-pass filter as shown in FIG. 9 which has a high-pass characteristic for the detection of high frequency components and further cuts the area of the high frequency.

Figure 10:
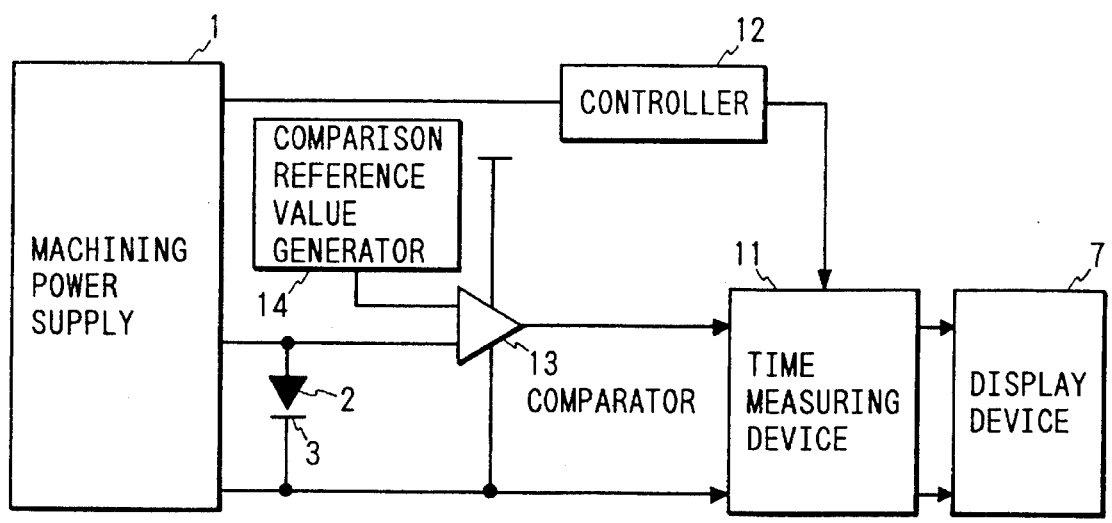
FIG. 10 is an arrangement diagram illustrating a fifth embodiment of the invention.
Figure 11:
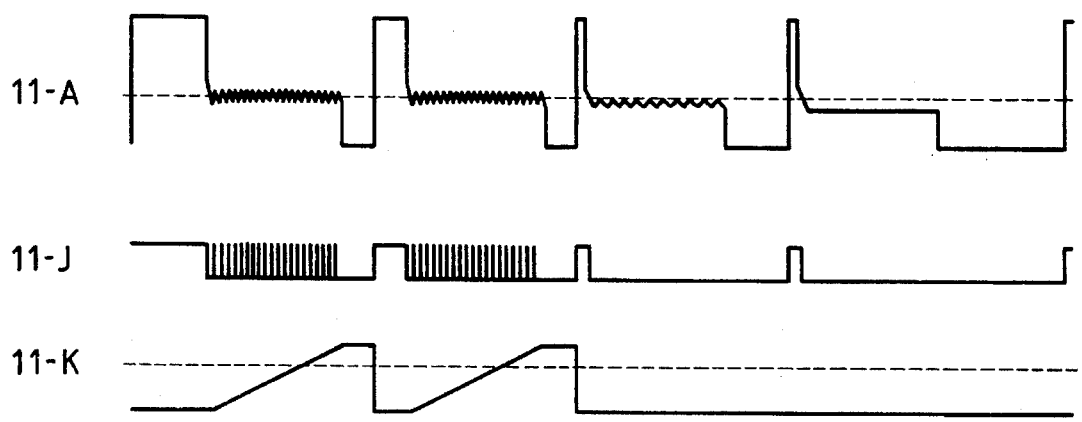
FIG. 11 is a waveform diagram illustrating input/output signals in the main area of the preferred embodiment in FIG. 10.

FIG. 10 is an arrangement diagram of a fifth embodiment wherein parts identical or corresponding to the embodiment in FIG. 1 are given identical reference characters and will not be described here. In FIG. 10, the numeral 11 indicates a time measuring device, 12 designates a controller for controlling the reset of the time measuring device 11, 13 denotes a comparator, and 14 represents a comparison reference value generator. FIG. 11 shows an input/output signal waveform example in the main area of the present embodiment, wherein the voltage waveform 11-A of the machining gap, the output waveform 11-J of the comparator 13, and the output waveform 11-K of the time measuring device 12 are shown.

Operation will now be described with reference to FIGS. 10 and 11. A pulse-shaped voltage is applied to the machining gap by the machining power supply 1 to carry out electrical discharge machining. At this time, the voltage waveform of the machining gap is, for example, as shown in waveform 11-A. This voltage waveform is compared at a certain level by the comparator 13 and changes as shown in waveform 11-J. Meanwhile, the controller 12 resets the time measuring device 11 when the voltage is applied to the machining gap and cancels the reset status when a discharge is detected. Further, since the time measuring device 11 starts time measurement on the leading edge of the comparator 13 output and stops time measurement on the trailing edge thereof, it measures the length of time when the voltage waveform exceeds the comparison level during a single discharge, and the time measurement output is as shown in waveform 11-K. According to the time measurement output during stop time, the display device 7 shows the discharge status.

In the above design, the magnitude of high frequency components in a discharge pulse can be measured according to the time when the high frequency components have a predetermined or larger amplitude, whereby the discharge status can be detected accurately.

Whereas the time measuring device 11 was controlled in synchronization with voltage application or discharge occurrence in this embodiment, it is apparent that the time measuring device 11 may be controlled at any timing if the length of time when the voltage waveform during a discharge exceeds the comparison level can be measured per pulse, e.g., reset is canceled a predetermined period of time after a discharge has occurred, or the time measuring device 11 is reset immediately before reset cancellation after discharge occurrence. Also, when the present embodiment is designed to hold or check the output of the time measuring device 11 a predetermined period of time after reset cancellation, the discharge status output can be provided independently of the termination time of the discharge and identical effects are produced. Further, when the time measuring device 11 is designed to output as the time measurement output a value obtained by subtracting a time measurement value at a preceding pulse from a time measurement value measured, there is an advantage that the controller 12 for controlling the reset of the time measuring device 11 is not required.

Also, while the period of time when the voltage waveform exceeds the comparison level during a single discharge was measured in this embodiment, the length of time when the voltage waveform falls below the comparison level may be measured to provide the same effects, e.g., by starting time measurement on the trailing edge of the comparator 13 output and stopping the time measurement on the leading edge thereof. In this case, it should be noted that as the measurement period of time is made longer, the high frequency components are fewer.

Figure 12:
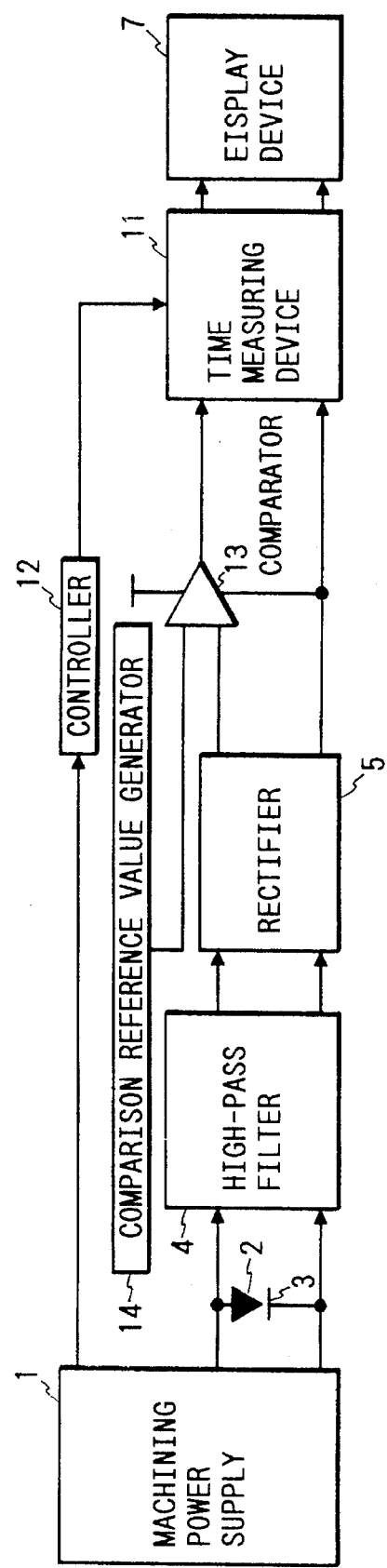
FIG. 12 is an arrangement diagram illustrating a sixth embodiment of the invention.

FIG. 12 is an arrangement diagram of a sixth embodiment of the invention, wherein parts identical or corresponding to the conventional electrical discharge machine in FIG. 49 and the embodiment in FIG. 10 are given identical reference characters and will not be described here.

Operation will now be described. The operation is generally identical to that of the above embodiment in FIG. 10; however, since the voltage waveform of the machining gap passes the high-pass filter 4 and is then input to the comparator 13, the influence of direct-current component variations and a low frequency swell can be eliminated and the discharge status detected more accurately. The present embodiment is also identical to that previous embodiment in that the discharge status can be detected by measuring not only the time when the voltage waveform exceeds the comparison level but also the time when it falls below the comparison level. Also, the output of the high-pass filter 4 may be rectified and then input to the comparator 13 to have the same effects. Particularly in the case of full-wave rectification, the amplitude of an area falling below an average level can also be evaluated, whereby the discharge status can be detected much more accurately.

Figure 13:
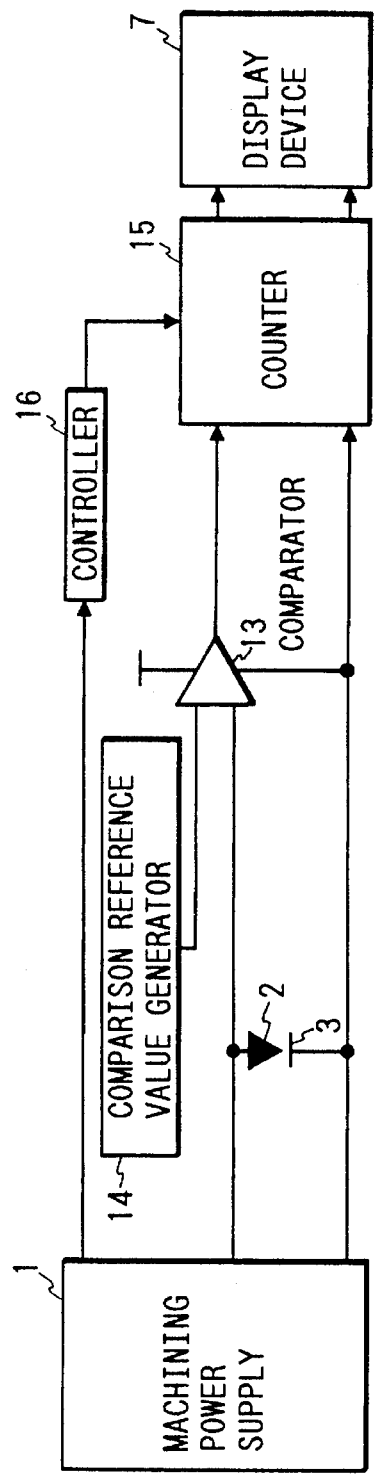
FIG. 13 is an arrangement diagram illustrating a seventh preferred embodiment of the invention.
Figure 14:
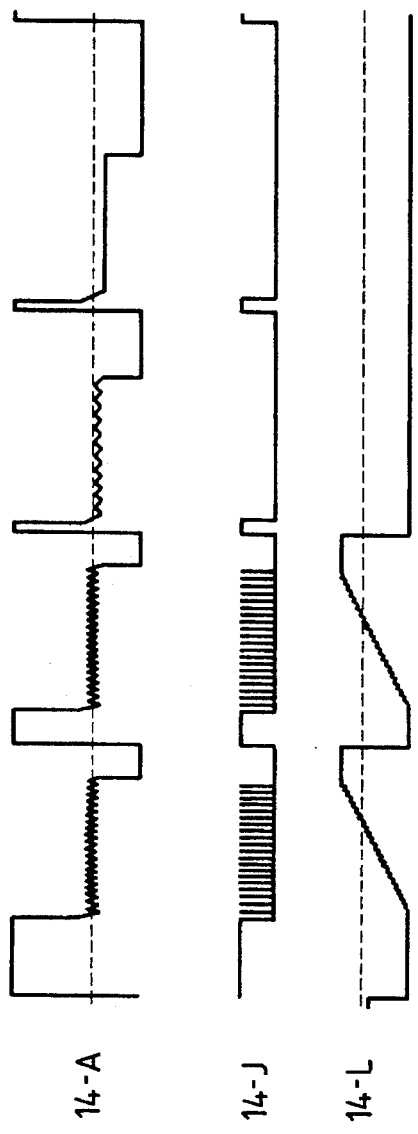
FIG. 14 is a waveform diagram illustrating input/output signals in the main area of the preferred embodiment of the invention in FIG. 13.

FIG. 13 is an arrangement diagram of a seventh embodiment of the invention. Parts identical or corresponding to the embodiment in FIG. 10 are given identical reference characters and will not be described here. In FIG. 13, the numeral 15 indicates a counter and 16 designates a controller for controlling the reset of the counter 15. FIG. 14 shows an input/output signal waveform example in the main area of the present embodiment, wherein waveform 14-A shows the voltage waveform of the machining gap, waveform 14-J shows the output waveform of the comparator 13, and waveform 14-L shows the output waveform of the counter 15.

Operation will now be described with reference to FIGS. 13 and 14. A pulse-shaped voltage is applied to the machining gap by the machining power supply 1 to carry out electrical discharge machining. At this time, the voltage waveform of the machining gap is, for example, as shown in waveform 14-A. This voltage waveform is compared at a certain level by the comparator 13 and changes as shown in waveform 14-J. Since the counter 15 is arranged to be reset when the voltage is applied to the machining gap and to increment its count value on the leading edge of the comparator 13 output (14-L), it measures the number of times when the voltage waveform exceeds the comparison level during a single discharge. Generally, in the voltage during a discharge in electrical discharge machining, high frequency components overlap an approximately constant bias voltage. Hence, by counting the number of times when the voltage value reaches the comparison level provided slightly above or below the bias voltage, the magnitude of the amplitude of high frequency components can be measured, whereby the discharge status can be detected according to said count value. The display device 7 shows the discharge status according to the value of the counter 15 during stop time.

Whereas the counter 15 was controlled in synchronization with voltage application or discharge occurrence in this embodiment, it is apparent that the counter 15 may be controlled at any timing if the number of times when the voltage waveform during a discharge exceeds the comparison level can be measured per pulse, e.g., operation is stopped until predetermine time elapses after discharge occurrence, or reset and start are made simultaneously with discharge occurrence. Also, when the embodiment is designed to hold or check the output of the counter 15 a predetermined period of time after a discharge start or a count start, the discharge status output can be provided independently of the termination time of the discharge and identical effects are produced. Further, when the counter 15 is designed to output as the counter output a value obtained by subtracting a count value at a preceding pulse from a count value measured, there is an advantage that the controller 16 for controlling the reset of the counter 15 is not required.

Also, while the leading edge of the comparator 13 out was counted in this embodiment, it is a matter of course that the trailing edge of the comparator 13 output or both the leading edge and the trailing edge thereof may be counted.

Figure 15:
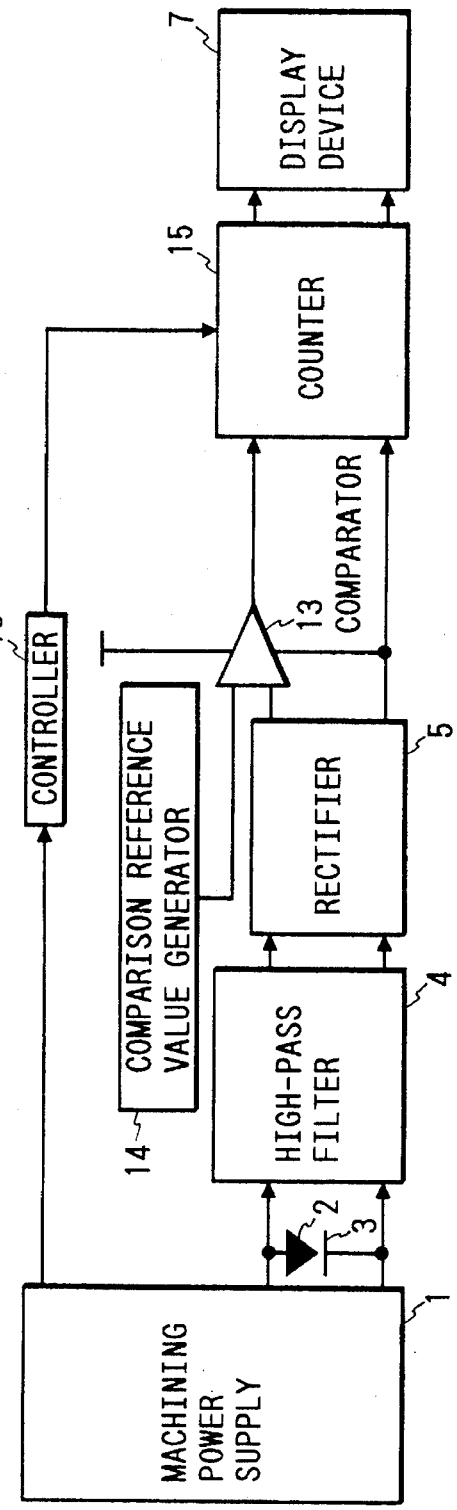
FIG. 15 is an arrangement diagram illustrating an eighth embodiment of the invention.

FIG. 15 is an arrangement diagram of an eighth embodiment of the invention. Parts identical or corresponding to the conventional electrical discharge machine in FIG. 49 and the embodiment in FIG. 13 are given identical reference characters and will not be described here.

Operation will now be described. The operation is generally identical to that of the embodiment in FIG. 13; however, since the voltage waveform of the machining gap passes the high-pass filter 4 and is then input to the comparator 13, the influence of direct-current component variations and a low frequency swell can be eliminated and the discharge status detected more accurately. The present embodiment is identical to the above identified embodiment in that the discharge status may be detected by counting not only the number of leading edges of the comparator 13 output but also the number of trailing edges thereof. Also, the output of the high-pass filter 4 may also be rectified and then input to the comparator 13 to provide the same effects. Particularly in the case of full-wave rectification, the amplitude of an area falling below an average level can also be evaluated, whereby the discharge status can be detected further more accurately.

Figure 16:
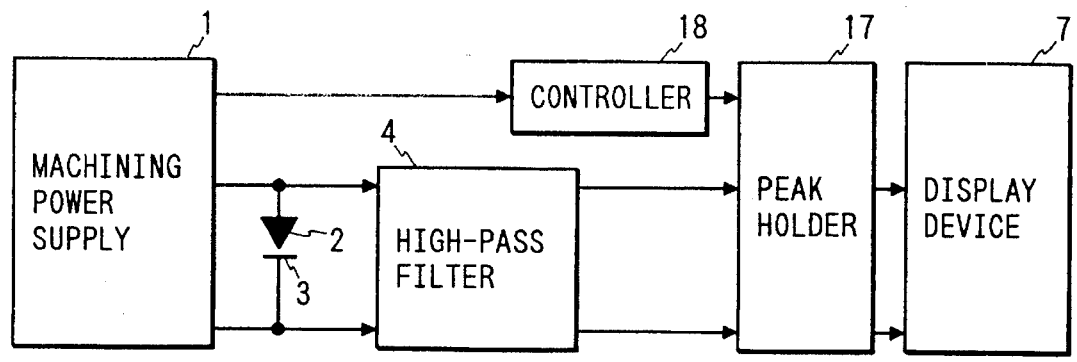
FIG. 16 is an arrangement diagram illustrating a ninth embodiment of the invention.
Figure 17:
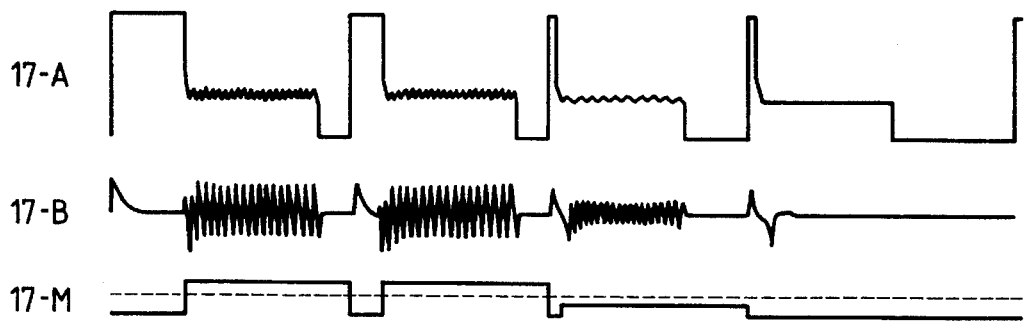
FIG. 17 is a waveform diagram illustrating input/output signals in the main area of the preferred embodiment of the invention in FIG. 16.

FIG. 16 is an arrangement diagram of a ninth embodiment of the invention. Parts identical or corresponding to the embodiment in FIG. 1 are given identical reference characters and will not be described here. In FIG. 16, the numeral 17 indicates a peak holder acting as peak holding means and 18 designates a controller acting as control means for controlling the reset of the peak holder 17. FIG. 17 shows an input/output signal waveform example in the main area of the present embodiment, wherein waveform 17-A shows the voltage waveform of the machining gap, waveform 17-B shows the output waveform of the high-pass filter 4, and waveform 17-M shows the output waveform of the peak holder 17.

Operation will now be described with reference to FIGS. 16 and 17. A pulse-shaped voltage is applied to the machining gap by the machining power supply 1 to carry out electrical discharge machining. At this time, the voltage waveform of the machining gap is, for example, as shown in waveform 17-A. From this voltage waveform, only high frequency components are fetched by the high-pass filter 4 and the waveform changes as shown in waveform 17-B. In the meantime, the controller 18 resets the peak holder 17 when the voltage is applied to the machining gap and cancels the reset status when a discharge is detected. Further, the peak holder 17 provides output as shown in waveform 17-M because it holds the highest voltage value measured during operation. The display device 7 displays the discharge status according to the value of the peak holder 17 during the stop time.

Since the above design allows the maximum amplitude value during a discharge to be measured, the discharge status can be detected accurately.

Whereas the peak holder 17 was controlled in synchronization with voltage application or discharge occurrence in this embodiment, it is apparent that the peak holder 17 may be controlled at any timing if the maximum amplitude value of all or some voltage values during a discharge can be measured per pulse, e.g., reset is canceled a predetermined period of time after a discharge has occurred, or the peak holder 17 is reset immediately before reset cancellation after discharge occurrence. Also, when this embodiment is designed to hold or check the peak hold output a predetermined period of time after reset cancellation, the discharge status output can be provided independently of the termination time of the discharge and identical effects are produced.

The peak holder 17 designed to maintain the highest voltage value in this embodiment may also be arranged to maintain the lowest voltage value to provide the same effects. Also, while this embodiment was designed to hold only one peak, a plurality of peak holder 17 and comparator 13 may be combined or another measure taken to take the add-up value or average value of a plurality of peak values or to take, for example, the third largest peak value, in which case there is an advantage that misoperation is unlikely to take place due to noise. Also, it is a matter of course that peak detection made in response to the output of the high-pass filter 4 in this embodiment may be performed directly with respect to the voltage waveform during a discharge to produce the identical effects. Also, the output of the high-pass filter 4 may be rectified and then input to the peak holder 17 to provide the identical effects. Especially in the case of full-wave rectification, both the minimum value and the maximum value can be evaluated, whereby the discharge status can be detected further more accurately.

Figure 18:
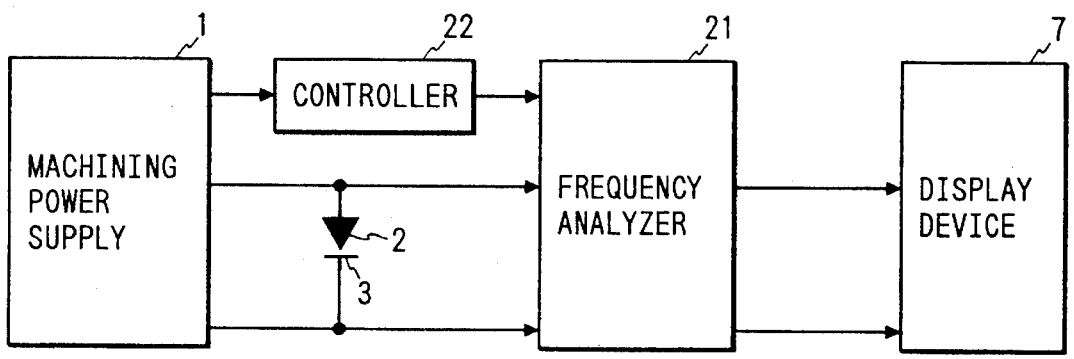
FIG. 18 is an arrangement diagram illustrating the tenth embodiment of the invention.

FIG. 18 is an arrangement diagram of a tenth embodiment of the invention. Parts identical or corresponding to the conventional electrical discharge machine in FIG. 49 are given identical reference characters and will not be described here. In FIG. 18, 21 indicates a frequency analyzer and 22 denotes a controller for the frequency analyzer 21.

Figure 19A:
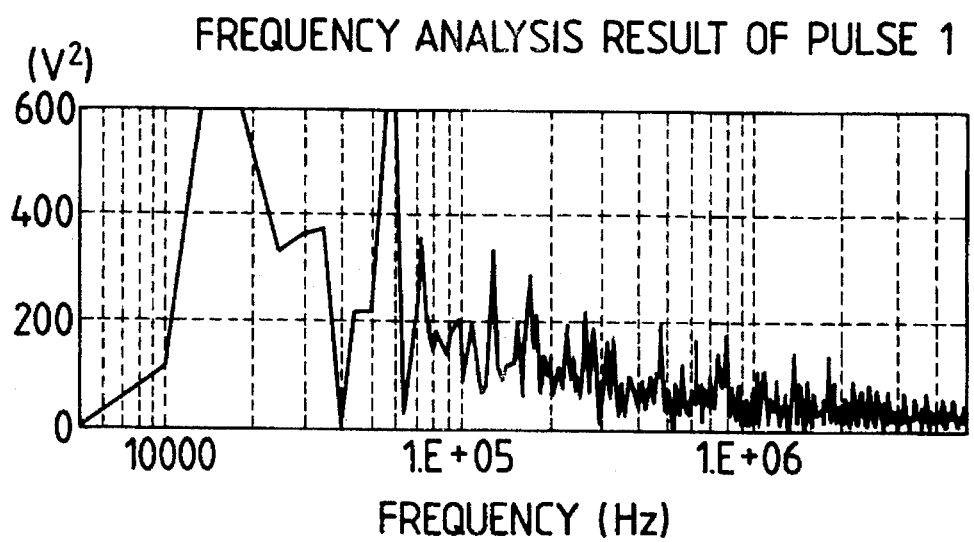
FIGS. 19A and 19B illustrate the results of frequency analyses on discharge pulses.
Figure 19B:
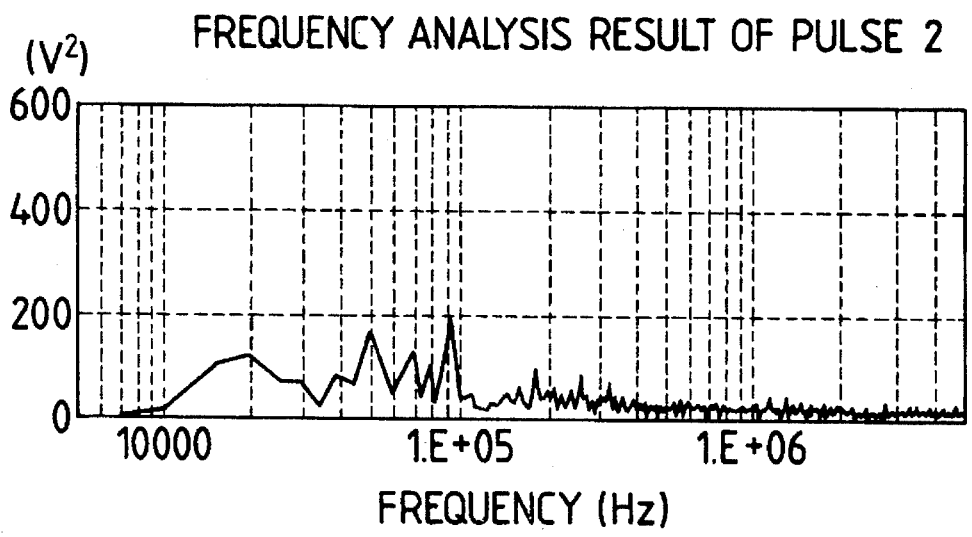

Operation will now be described. As soon as a discharge takes place, the controller 22 starts the frequency analyzer 21. After a predetermined time has elapsed, the controller 22 transmits an output command to the frequency analyzer 21, which then outputs the frequency at the center of gravity of a spectrum waveform as the discharge status and causes the display device 7 to display that status. Subsequently, the controller 22 resets the frequency analyzer 21 to be ready for a next discharge. FIGS. 19-A and 19-B show the results of frequency analyses made by the frequency analyzer 21 on pulses 1 and 2 which are different discharge pulses. In these figures, the frequency band shown is up to 5,000,000 Hz.

Since the above arrangement operates the frequency analyzer 21 only during a discharge, the influence of repeated frequency changes on the discharge due to the fluctuation of no-load time and the control of stop time can be eliminated and the output can be provided per pulse, whereby the discharge status can be measured and displayed accurately.

The frequency analyzer 21 arranged to output the frequency at the center of gravity of a spectrum waveform in this embodiment may also be designed to output any analyzed amount related to the magnitude of high frequency components, such as the area of the spectrum waveform in a specific frequency zone or average strength at one or more specific frequencies. Also, the whole or partial spectrum waveform of the frequency analysis result may be displayed intact as a pattern to provide much information to the operator of the electrical discharge machine. It will be recognized as a matter of course that analysis results over a plurality of pulses may be displayed, e.g., the averages, variances and degrees of change of the analysis results are displayed for a plurality of pulses or displayed in a plurality of display positions in sequence. Also, it is a matter of course that the frequency analyzer 21 started simultaneously with discharge occurrence in this embodiment may be started any time if during a discharge. Also, while the frequency analyzer 21 was provided as hardware in this embodiment, frequency analyses may be made by, for example, the FFT calculation of the waveform during the discharge in order to produce the same effects.

Figure 20:
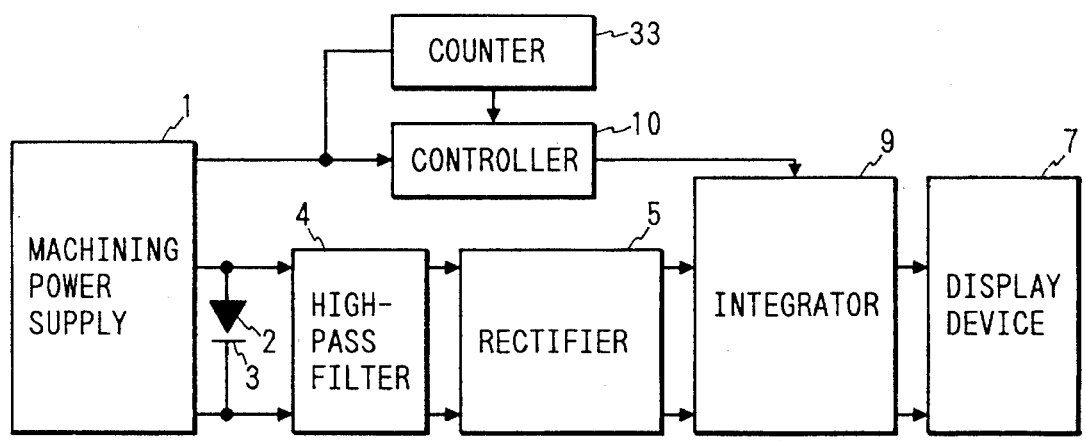
FIG. 20 is an arrangement diagram illustrating a eleventh embodiment of the invention.
Figure 21:
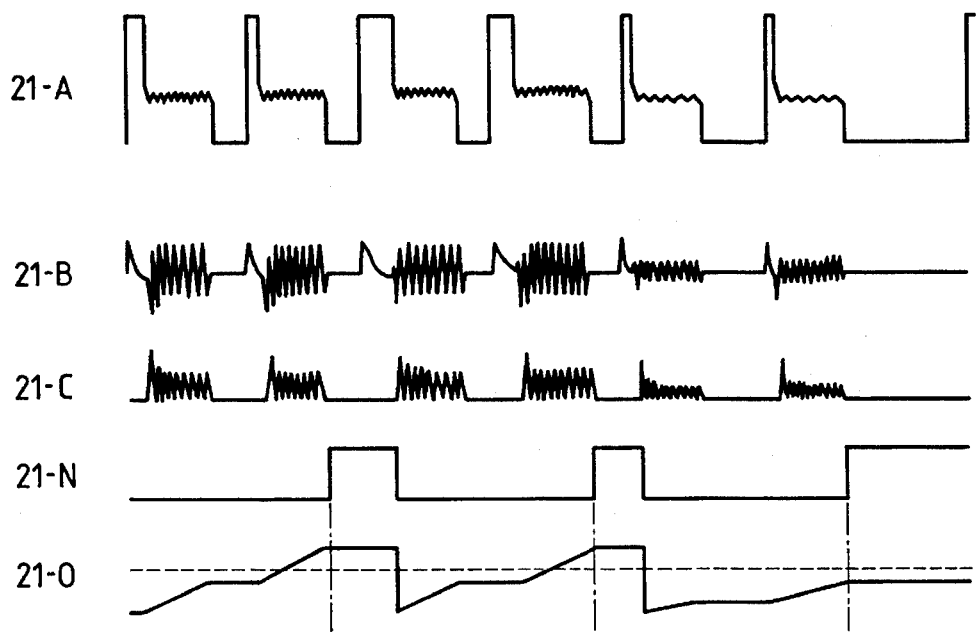
FIG. 21 is a waveform diagram illustrating input/output signals in the main area of the preferred embodiment of the invention illustrated in FIG. 20.

FIG. 20 is an arrangement diagram of an eleventh embodiment of the invention. Parts identical or corresponding to the embodiment in FIG. 5 are given identical reference characters and will not be described here. In FIG. 20, the numeral 33 indicates a counter. FIG. 21 shows an input/output signal waveform example in the main area of the present embodiment, wherein waveform 21-A shows the voltage waveform of the machining gap, waveform 21-B shows the output waveform of the high-pass filter 4, waveform 21-C shows the output waveform of the rectifier 5, waveform 21-N shows the count-up output waveform of the counter 33, and waveform 21-O shows the output waveform of the integrator 9.

Operation will now be described with reference to FIGS. 20 and 21. A pulse-shaped voltage is applied to the machining gap by the machining power supply 1 to carry out electrical discharge machining. At this time, the voltage waveform of the machining gap is, for example, shown as waveform 21-A. From this voltage waveform, only high frequency components are fetched by the high-pass filter 4 and the waveform changes as shown in 21-B. They are then rectified by the rectifier 5 and Change into a signal waveform 21-C. In the meantime, the counter 33 is designed to be incremented every time a discharge ends, and when incremented up to a preset value, to reset the count value and generate a count-up output until a next discharge occurs. When it is designed to count up at two discharge pulses, the waveform 21-N is output. Also, when the controller 10 instructs the integrator 9 to reset and start integration on the trailing edge of the count-up output, the integration output is as shown in waveform 21-O. According to the output of the integrator 9 on the leading edge of this count-up output, the display device 7 displays the discharge status. Since the above arrangement accumulates integrations over a plurality of discharge pulses, the discharge status can be grasped properly even in a condition under which discharge time is especially short and sufficient integration time cannot be taken.

Whereas only pulses in which the discharge current flowed were counted in this embodiment, counting all the generated voltage pulses by, for example, counting the number of times when the application of the voltage pulse to the machining gap has ended allows all voltage pulses including those when the machining gap is open to be counted and produces the same effect. Also, the counter 33 provided to count the discharge pulses in this embodiment may be replaced by a software area provided in an integration controller for counting discharge pulses to have the identical effect. Also, while integration was controlled in synchronization with voltage application or discharge occurrence in this embodiment, the embodiment is identical to the third embodiment in that integration may also be controlled at any timing if the output of the rectifier 5 can be integrated per pulse. Also, count made at the end of a discharge in this embodiment may also be made at any timing if the discharge status output can be checked after a predetermined number of discharge pulses have occurred, e.g., at the application of the voltage to the machining gap.

Also, while the technique of the above embodiment of the invention employed the rectifier 5 and the integrator 9 to measure high frequency components, it is apparent that the technique described in any of the previous embodiments of the invention or any other method that allows the amplitude of high frequency components to be measured may be adopted.

While the discharge status detection output provided to the display device 7 in each of the previous embodiments of the invention, clearly it may also be provided to a machining condition controller which is designed to change the machining condition toward a lower risk of arc discharge if there are a few high frequency components and toward a higher risk of arc discharge but higher machining efficiency if there are many high frequency components, in which case the machining condition can be changed faster than by operator control.

Also, whereas the analog value was output by the discharge status detector in each of the previous embodiments of the invention, a comparator or the like may be provided at the output stage to segment the analog value at one or more levels to be quantized and digitally output. Further, the digital output may be input to the machining condition controller to control the machining condition, whereby there is an advantage that machining condition control can be exercised easily.

Figure 22:
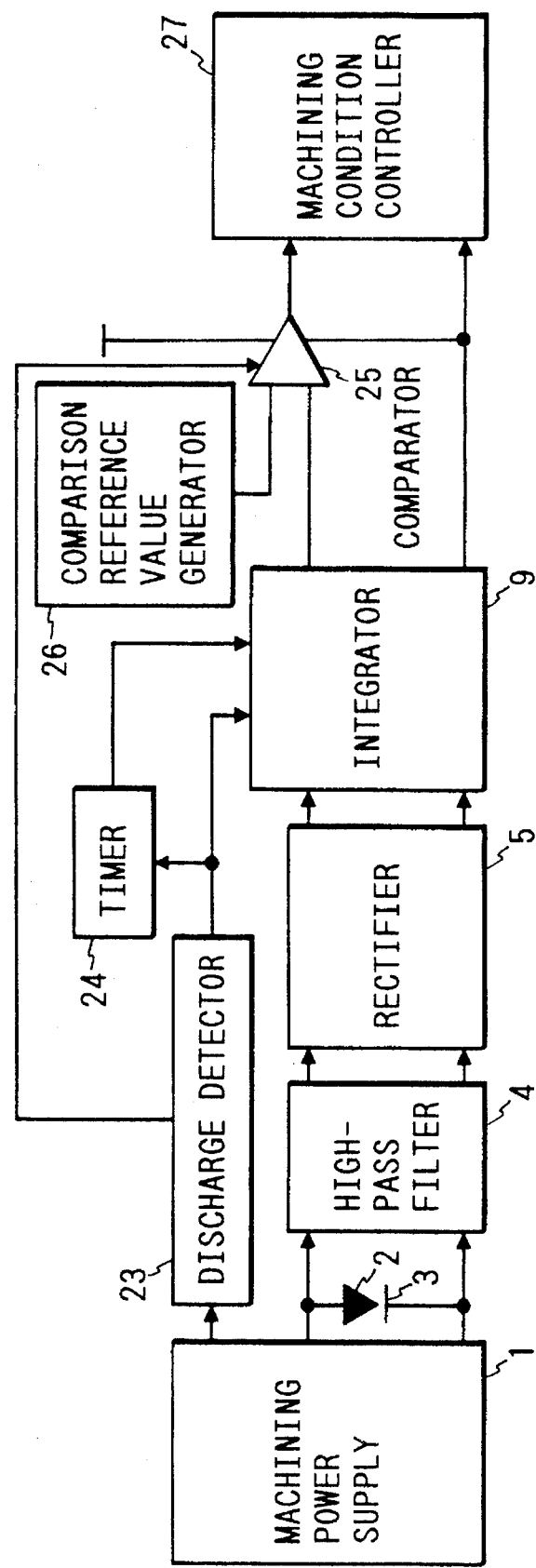
FIG. 22 is an arrangement diagram illustrating a twelfth preferred embodiment of the invention.
Figure 23:
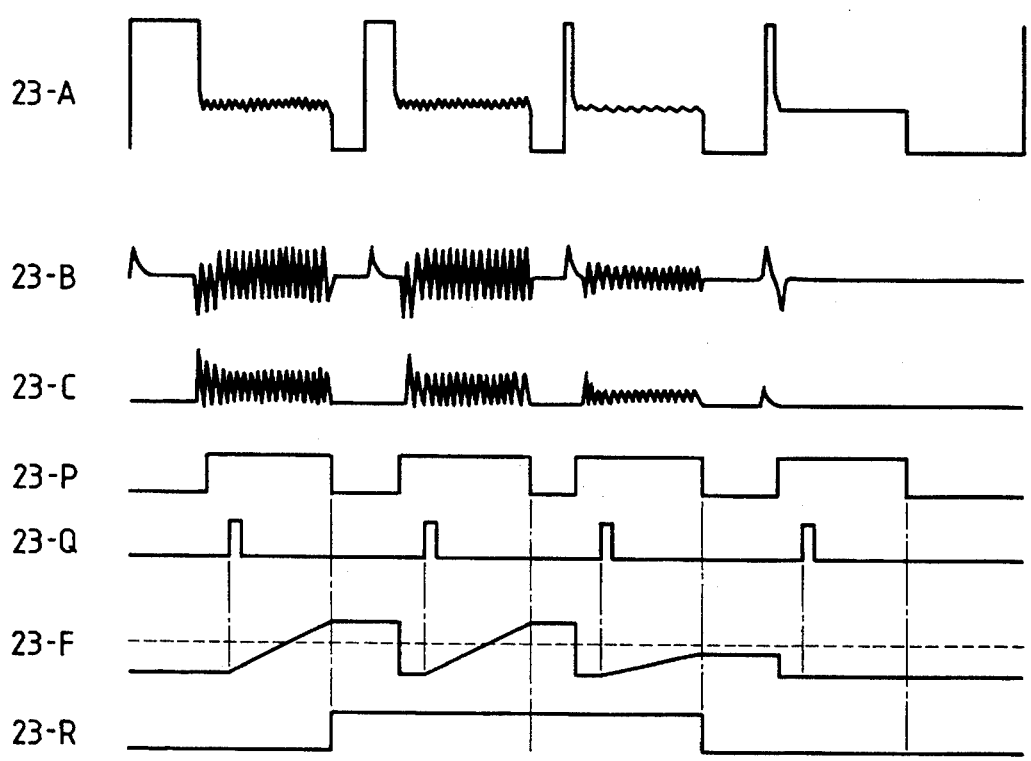
FIG. 23 is a waveform diagram illustrating input/output signals in the main area of the preferred embodiment of the invention in FIG. 22.

FIG. 22 is an arrangement diagram of an twelfth embodiment of the invention. Parts identical or corresponding to the embodiment in FIG. 5 are given identical reference characters and will not be described here. In FIG. 22, the numeral 23 indicates a discharge detector, 24 designates a timer, 25 denotes a comparator, 26 represents a comparison reference value generator, and 27 indicates a machining condition controller. FIG. 23 shows an input/output signal waveform example in the main area of the present embodiment, wherein waveform 23-A shows the voltage waveform of the machining gap, waveform 23-B shows the output waveform of the high-pass filter 4, waveform 23-C shows the output waveform of the rectifier 5, waveform 23-P shows the output of the discharge detector 23, waveform 23-Q shows the output of the timer 24, waveform 23-F shows the output of the integrator 9, and waveform 23-R shows the output of the comparator 25.

Operation will now be described with reference to FIGS. 22 and 23. A pulse-shaped voltage is applied to the machining gap by the machining power supply 1 to carry out electrical discharge machining. At this time, the voltage waveform of the machining gap is, for example, waveform 23-A. From this voltage waveform, only high frequency components are first passed by the high-pass filter 4 and the waveform changes to waveform 23-B. Here, it is desired that a value larger than 50 kHz be employed as the cut-off frequency of the high-pass filter 4. Also, to prevent misoperation due to noise, it is further recommended to use a band-pass filter which cuts high frequency components higher than required (for example, components of more than several hundred MHz). Next, the high frequency components obtained are rectified by the rectifier 5, changed into a waveform 23-C, and are then input to the integrator 9.

Now, when the voltage applied causes a discharge to occur between the electrode 2 and the workpiece 3, the discharge detector 23 raises a discharge detection output (waveform 23-P). A discharge occurrence detection method considered is, for example, to compare the voltage or current of the machining gap with a reference value. On the leading edge of the discharge detection output, the integrator 9 is reset and the timer 24 is started. The timer 24 used is, for example, a one-shot multivibrator, a binary counter/timer or the like. After a predetermined period of time (1 μsec or longer is desired and about half of the discharge time is much better) has elapsed, the timer 24 generates a measurement start output (waveform 23-Q). This output causes the reset status of the integrator 9 to be canceled and the output of the rectifier 5 to be integrated, causing the output waveform of the integrator 9 to be as shown in waveform 23-F. When the discharge ends, the discharge detector 23 drops the discharge detection output. A discharge termination detection method considered is, for example, to compare the voltage or current of the machining gap with a reference value or to detect a signal with which the machining power supply 1 operates the switching device therein. On the trailing edge of the discharge detection output, the comparator 25 compares the output of the integrator 9 with the reference value and outputs the normal/fault judgement of the discharge (waveform 23-R). The machining condition controller 27 checks the output of the comparator 25 during stop time, and extends the stop time if the discharge status is judged to be poor (waveform 23-A).

Since the above arrangement causes the measurement of high frequency components to be started soon after discharge occurrence, the influence of the high frequency components generated immediately after a discharge start upon the discharge status detection can be avoided and the discharge status measured precisely. Also, since the high frequency components are integrated over a certain length of time, the present embodiment has an advantage that it is not subject to the influence of noise.

While the integrator 9 was designed to be started by the measurement start output in this embodiment, the high-pass filter 4 or the rectifier 5 may also be arranged to be started by the measurement start output, providing the same effects. Also, whereas the comparator 25 was arranged to operate on the trailing edge of the discharge detection output in this embodiment, it is apparent that a second timer may be provided and the comparator 25 designed to operate a predetermined time after the measurement start output, or alternatively, the output of the comparator 25 operating continuously may be held on the trailing edge of the discharge detection output in order to produce the same effects. Furthermore, the integrator 9 arranged to be reset on the leading edge of the discharge detection output in this embodiment may also be reset any time between normal/faulty discharge judgement and integration start, e.g., at a point when the machining power supply 1 has applied the voltage. Also, it is a matter of course that the output of the comparator 25 checked during the stop time may be checked any time after the judgement of a normal/faulty discharge.

Also, while the technique of this embodiment of the invention uses the rectifier 5 and the integrator 9 to measure high frequency components, it is apparent that any of the techniques described in the previous embodiments of the invention wherein, for example, the output of the rectifier 5 is smoothed or is caused to pass the low-pass filter, the total time or the number of times when the voltage of the machining gap or the amplitude of the high-pass filter 4 output exceeds a certain level is measured or the maximum value of the amplitude is measured, computation is made on the analog-to-digital conversion output, or the frequency analysis is performed on the voltage of the machining gap, or any other method that allows the amplitude of high frequency components to be measured, may be adopted.

Also, whereas the stop time was extended when the discharge status was deteriorated in that embodiment, a further better result will be obtained by reducing the stop time when the discharge status improves. Further, it is apparent that the machining condition to be controlled is not limited to the stop time but may be any machining condition that influences the discharge status, such as machining current, discharge time, electrode pull-up operation (jump), dielectric pressure and servo voltage. Clearly, control may either be exercised toward a lower risk of arc discharge if the discharge status is poor or toward a higher risk of arc discharge but higher machining efficiency if the discharge status is excellent, as disclosed in Japanese Laid-Open Patent Publication No. SHO62-10769, Japanese Laid-Open Patent Publication No. SHO49-92696 or Japanese Laid-Open Patent Publication No. SHO58-50811.

Also, the machining condition controlled according to the discharge status output at a single discharge in that embodiment may be controlled according to the output at a plurality of discharges, or only a display may be provided for the operator without the machining condition being controlled.

Further, while the machining condition was controlled according to the result obtained by the digital classification of the measurement result of high frequency components by the comparator in the embodiment, it is a matter of course that the measurement result of high frequency components may be displayed intact in the analog value or utilized for machining condition control as described in the previous embodiments of the invention.

Figure 24:
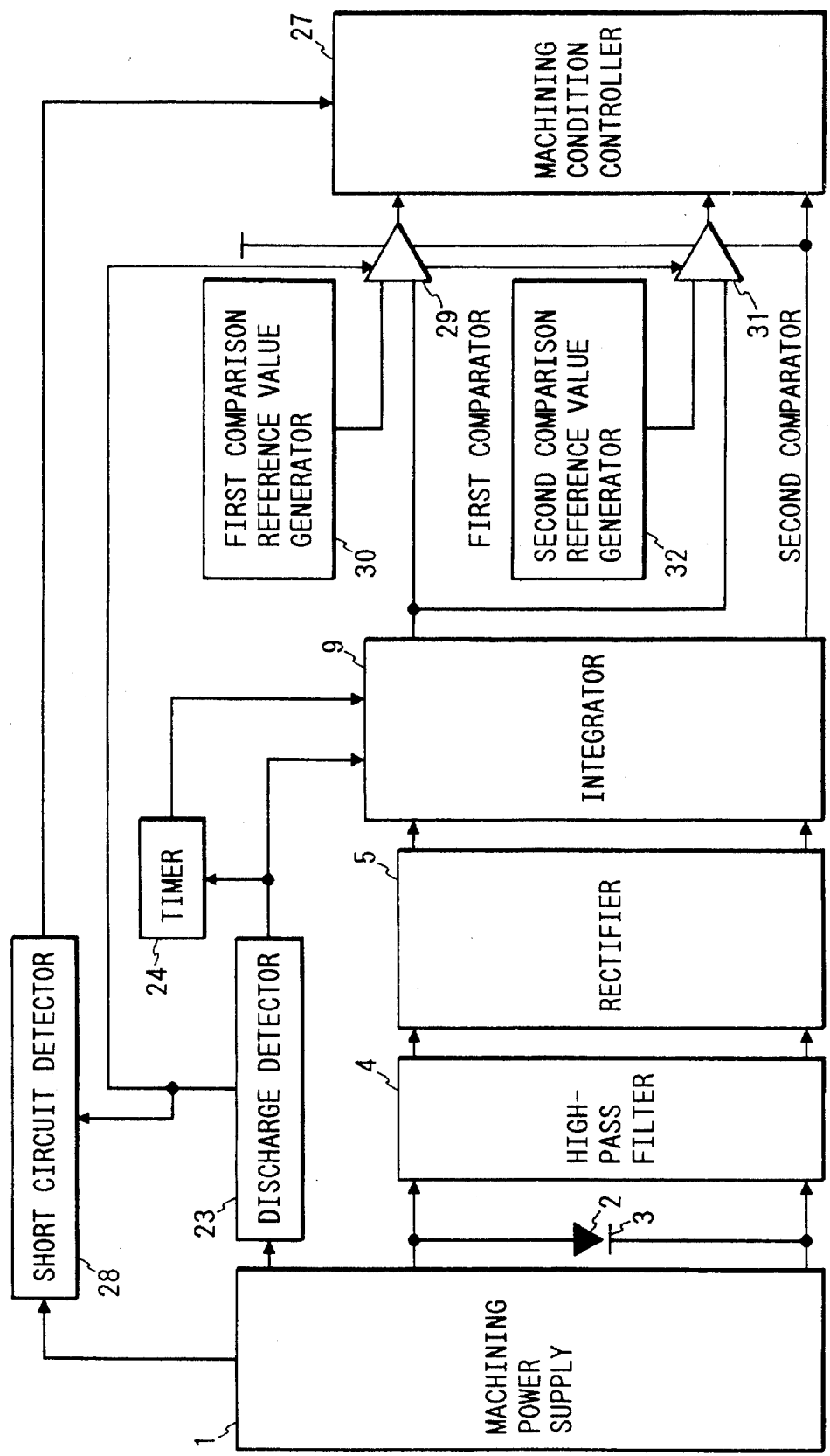
FIG. 24 is an arrangement diagram illustrating a thirteenth preferred embodiment of the invention.
Figure 25:
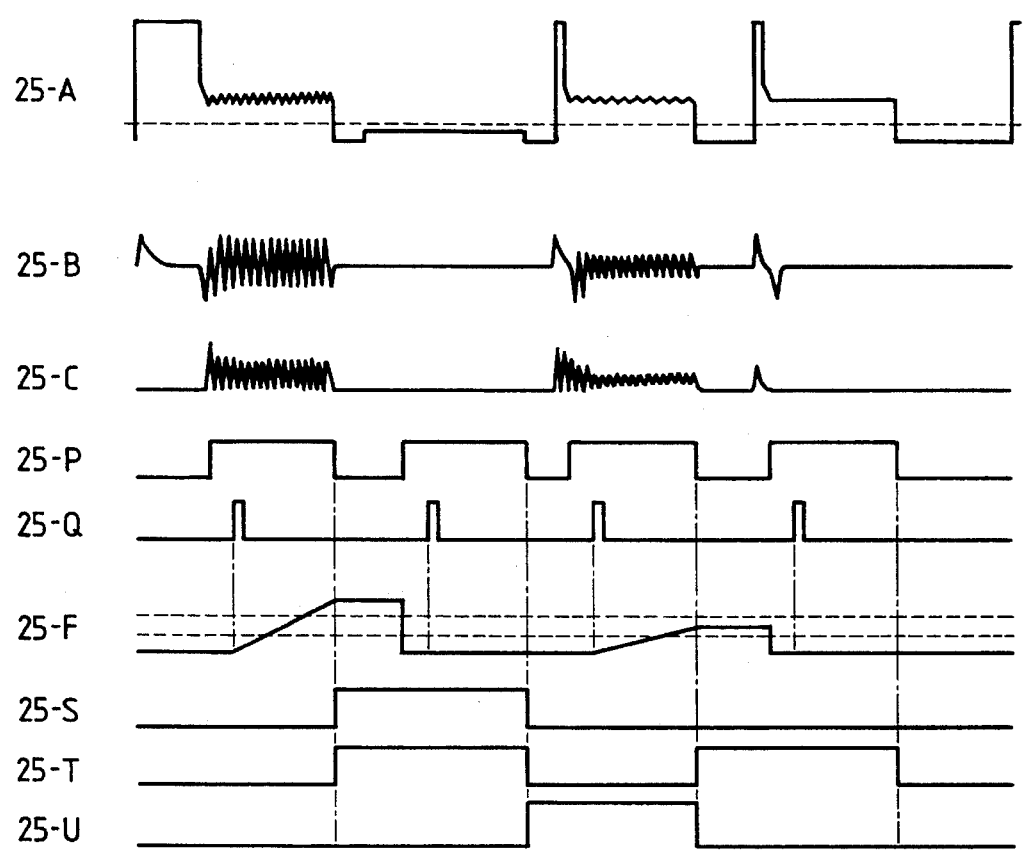
FIG. 25 is a waveform diagram illustrating input/output signals in the main area of the preferred embodiment of the invention in FIG. 24.

FIG. 24 is an arrangement diagram of a thirteenth embodiment of the invention. Parts that are identical or corresponding to the embodiment in FIG. 22 are given identical reference characters and will not be described here. In FIG. 24, the numeral 28 indicates a short circuit detector serving as short circuit detecting means, 29 designates a first comparator acting as first comparing means, 30 represents a first comparison reference value generator acting as first comparison reference value generating means, 31 denotes a second comparator acting as second comparing means, and 32 indicates a second comparison reference value generator acting as second comparison reference value generating means. FIG. 25 shows an input/output signal waveform example in the main area of the present embodiment, wherein parts identical or corresponding to the embodiment in FIG. 22 are given identical reference characters and will not be described here. In FIG. 25, waveform 25-S shows the output waveform of the first comparator 29 which compares the output of the discharge detector 23 with a first reference value, waveform 25-T shows the output waveform of the second comparator 31 which compares the output of the discharge detector 23 with a second reference value. The waveform 25-U shows the output signal of the short circuit detector 28. FIGS. 26A–26D illustrate the distribution of the high frequency component magnitude of the machining gap voltage in the progress of electrical discharge machining.

Figure 26A:
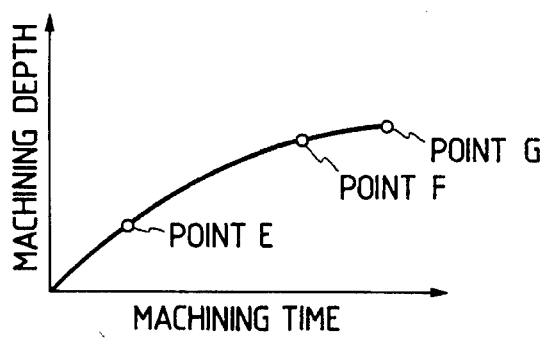
FIGS. 26A–26D illustrate the distribution of high frequency component magnitude of a machining gap voltage in the progress of electrical discharge machining.
Figure 26B:
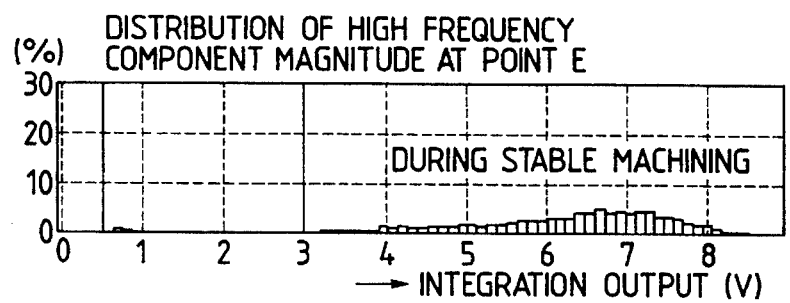
Figure 26C:
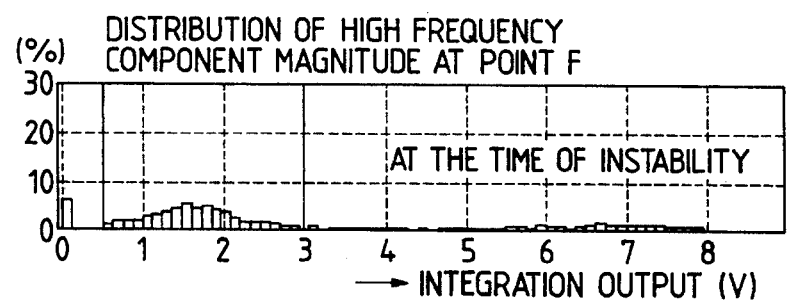
Figure 26D:
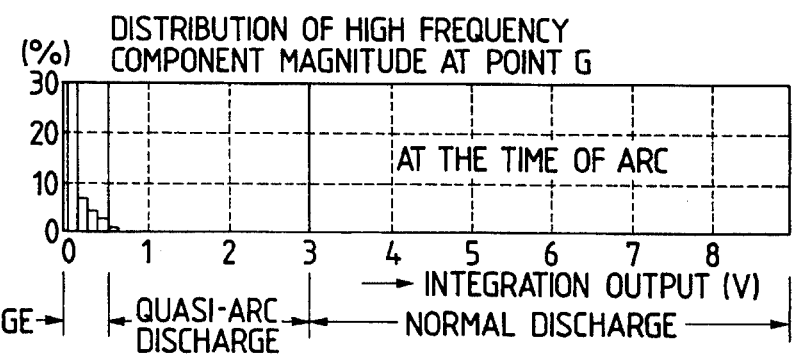

Operation will now be described with reference to FIGS. 24, 25 and 26A–26D. The operation up to the integration of high frequency components in the voltage of the machining gap is identical to that in the previous embodiment of the invention and the integration output is input to the first comparator 29 and the second comparator 31. On the trailing edge of the discharge detection output, the first comparator 29 provides the digital output of the comparison result between the integrator 9 output and the first reference value shown as waveform 25-S. At the same time, the second comparator 31 provides the digital output of the comparison result between the integrator 9 output and the second reference value which has been set lower than the first reference value shown as waveform 25-T. Accordingly, discharge pulses are classified by the first and the second comparators 29, 31 into three different types. Namely, as shown in FIGS. 26B–26D, as electrical discharge machining progresses from the stable status to the instable status to the arc status, the distribution of the integrator 9 output shows the segmentation of three areas. Hence, more accurate judgement can be made by classifying the discharge pulses into a normal discharge pulse, a quasi-arc discharge pulse and an arc discharge pulse. These pulses are hereinafter referred to as a normal discharge, a quasi-arc discharge and an arc discharge in order of larger high frequency components.

In the meantime, the short circuit detector 28 checks the voltage value of the machining gap on the trailing edge of the discharge detection output, compares it with a short circuit reference voltage (15 V or less desired), and digitally outputs a short circuit detection signal (waveform 25-U). Here, the short circuit detector 28, which compares the machining gap voltage value during a discharge with the reference value, has been provided not to differentiate the normal discharge from the arc discharge with the reference voltage set to approximately 20 V when steel is machined by a copper electrode, as was often seen conventionally, but to judge whether or not the electrode 2 and the workpiece 3 are in a short circuit status. The short circuit status in this case does not only mean the direct contact of the electrode 2 with the workpiece 3 but also includes a short circuit via chips, tar transformed from the dielectric, or a carbon film formed on the electrode surface. Hence, the machining gap voltage value cannot be completely 0 V and the voltage of approximately several volts is developed. Since the short circuit reference voltage depends on the electrode material, etc., like the arc discharge voltage, there is not a common value to all cases but it is set to not more than 15 V, or more desirably, to not more than 10 V, for the electrode 2 of copper and the workpiece 3 of steel.

Now, the machining condition controller 27 obtains for each pulse three different judgement outputs, i.e., the normal discharge, the quasi-arc discharge and the arc discharge. These outputs are derived from the first and second comparators 29, 31 and two different judgement outputs, which indicate the presence and absence of the short circuit status, from the short circuit detector As a result, the machining condition controller 27 is given six different judgement outputs. The machining condition controller 27 does not change the machining condition in the cases of a short circuit and a non-short circuit normal discharge, changes the stop time to a longer value in the case of a quasi-arc discharge, and changes the stop time to a further longer value in the case of an arc discharge.

In the above arrangement, in addition to the identification of the discharge status by the presence/absence of high frequency components, the present embodiment is designed to judge discharge pulses and control the machining condition in consideration of the presence/absence of the short circuit status, whereby the machining status can be maintained optimally.

Whereas relatively simple machining control was adopted in that embodiment, it is a matter of course that separate machining condition changing methods may be adopted for all the six different discharges, e.g., the machining conditions remain unchanged for the short-circuit normal discharge, the stop time is reduced for the non-short-circuit normal discharge, the servo voltage is increased for the short-circuit quasi-arc discharge, the servo voltage is decreased for the non-short-circuit quasiarc discharge, the electrode pull-up operation (jump) is performed for the short-circuit arc discharge, and the stop time is increased for the non-short-circuit arc discharge, and that the machining condition other than the stop time may also be changed. For such control, reference can be made to the techniques disclosed in the Japanese Laid-Open Patent Publications previously identified herein.

While a particular technique was described in the twelfth embodiment of the invention to detect high frequency components, it is a matter of course that all the techniques related to the detection of high frequency components in the voltage, current and impedance of the machining gap described in the prior embodiments of the invention may be adopted and it also is apparent that any other high frequency component detecting technique may be adopted. Also, the discharge pulses classified into three types according to high frequency components in that embodiment may be classified into two, four or more types to provide the same effects. Also, whereas the machining condition was controlled immediately after the discharge pulse was classified, the machining condition may be controlled using the classification results of a plurality of pulses, e.g., the machining condition is changed when the count value of the classified pulse counted reaches a predetermined value or a classification pattern becomes a specific form. Also, only a display may be provided for the operator without the machining condition being controlled.

Further, the occurrence of a short circuit detected using the voltage level of the machining gap in that thirteenth embodiment may be detected in any method, e.g., the excess of the discharge current over the reference value or the change in impedance of the machining gap, to produce the same effects.

Figures 27, 29:
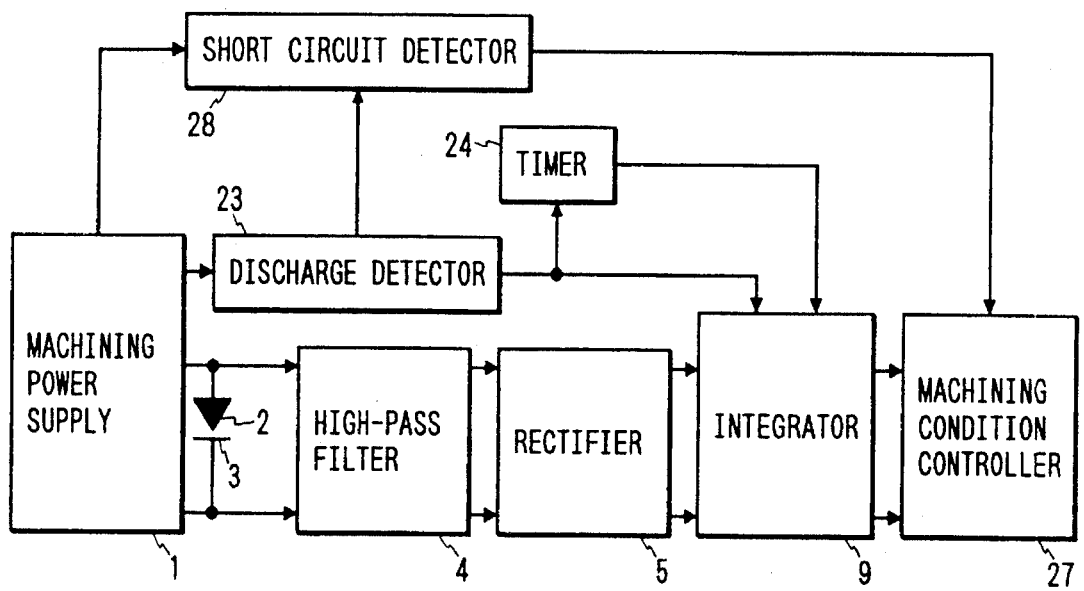
FIG. 27 is an arrangement diagram illustrating a fourteenth preferred embodiment of the invention.
FIG. 29 is a waveform diagram illustrating the input/output table of a logic circuit in another preferred embodiment of the invention in FIGS. 27 and 28.

FIG. 27 is an arrangement diagram of a fourteenth embodiment of the invention. Parts identical or corresponding to the embodiment in FIG. 22 and the embodiment in FIG. 24 are given identical reference characters and will not be described here.

Operation will now be described with reference to FIG. 27. The operation up to the integration of high frequency components in the voltage of the machining gap is identical to that in the twelfth embodiment of the invention and the integration output is input to the machining condition controller 27. Also, the operation of the short circuit detector 28 is identical to that of the thirteenth embodiment of the invention and the detection result is input to the machining condition controller 27. Accordingly, the discharge status output as in the twelfth embodiment of the invention and the short circuit detection result as in the thirteenth embodiment of the invention are input to the machining condition controller 27. When a short circuit is detected, the machining condition controller 27 keeps the machining condition unchanged and waits for the next short circuit detection and discharge status detection results. When a short circuit is not detected, the machining condition controller 27 makes adjustment to reduce the stop time as the discharge status becomes better.

In the above arrangement, the influence of the discharge status output at the occurrence of a short circuit upon machining condition control can be avoided and appropriate machining condition control exercised for a short circuit.

The machining condition kept unchanged at the occurrence of a short circuit in the embodiment may be changed in any manner, e.g., the electrode pull-up operation may be performed or the servo voltage increased, if the machining condition control at the detection of a short circuit remains the same independently of the discharge status output. Also, while the stop time was changed according to the discharge status when a short circuit was not detected in this embodiment, the machining condition may be changed in any manner, e.g., the servo voltage may be changed or the electrode pull-up/pull-down operation speed changed.

Also, while the technique described in the twelfth embodiment of the invention was employed to detect high frequency components in that embodiment, it is a matter of course that all the techniques related to the detection of high frequency components in the voltage, current and impedance of the machining gap described in the previous embodiments may be adopted and it is also apparent that any other high frequency component detecting technique may be adopted. Also, whereas the machining condition was controlled immediately after the discharge status was output, the machining condition may be controlled by adding up the discharge status outputs at a plurality of pulses. Further, the occurrence of a short circuit detected using the voltage level of the machining gap in that embodiment may be detected in any method, e.g., the excess of the discharge current over the reference value or the change in impedance of the machining gap.

Figure 28:
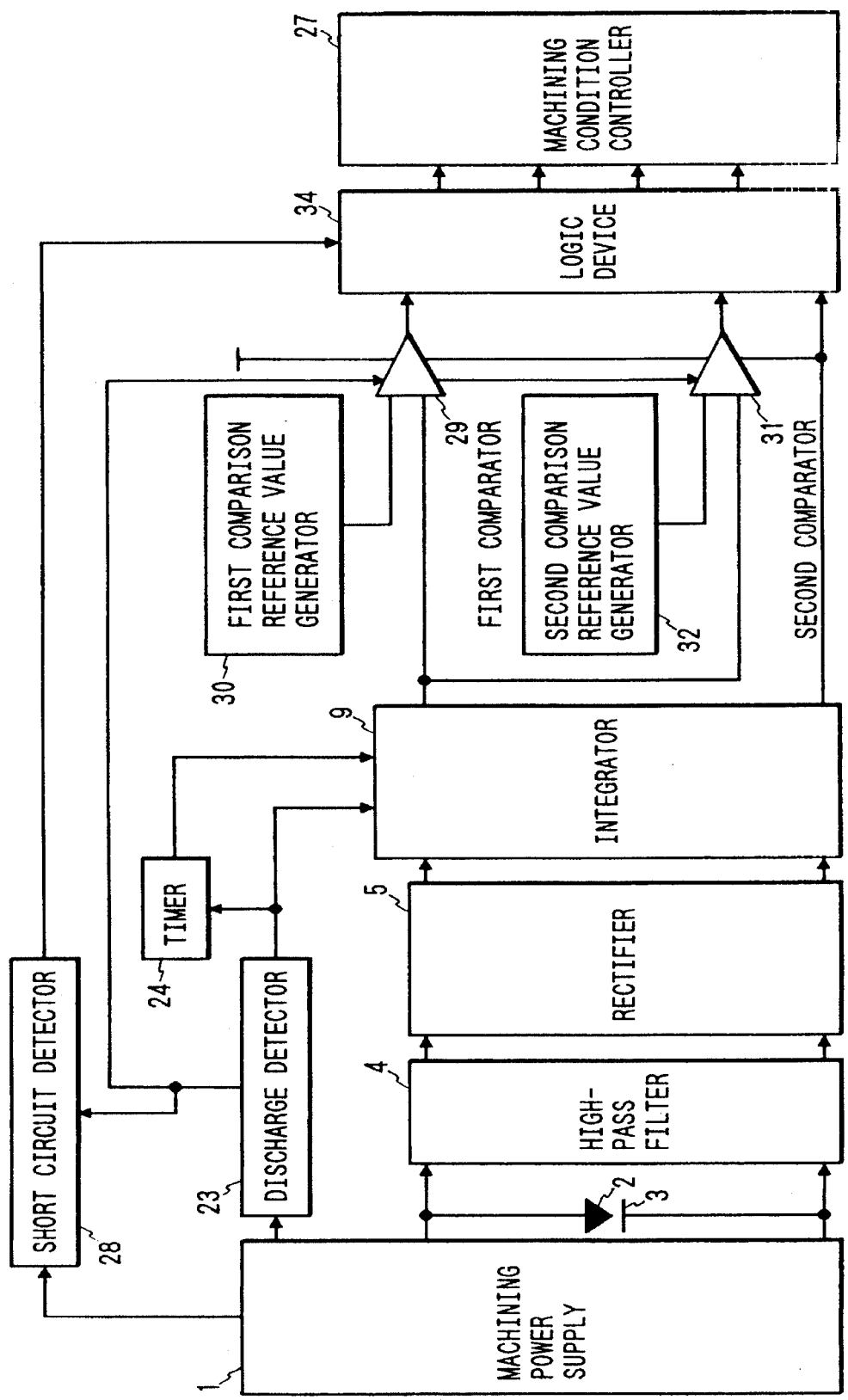
FIG. 28 is an arrangement diagram illustrating a fifteenth preferred embodiment of the invention.

FIG. 28 is an arrangement diagram of a fifteenth embodiment in the invention. Parts identical or corresponding to the embodiment in FIG. 24 are given identical reference characters and will not be described here. In FIG. 28, the numeral 34 indicates a logical device serving as logical means. FIG. 29 is an input-output table of the logical device 34 in the present embodiment.

Operation will now be described. The operation is generally identical to the embodiment of the thirteenth embodiment of the invention with the exception that the output of the first comparator 29, the output of the second comparator 31, and the output of the short circuit detector 28 are input to the logical device 34. The logical device 34 designed to operate in accordance with the input-output table shown in FIG. 29 is arranged to transmit a short circuit signal if a short circuit is detected by the short circuit detector 28, and to transmit a normal discharge signal, a quasi-arc discharge signal or an arc discharge signal according to the outputs of the first and second comparators 29, 31 if a short circuit is not detected. Therefore, while the discharge pulses were classified into six different types in the thirteenth embodiment of the invention, they are integrated into four types in the present embodiment. The machining condition controller 27 keeps the conditions unchanged in response to said short circuit signal, reduces the stop time in response to said normal discharge signal, and extends the stop time in response to said quasi-arc discharge and arc discharge signals.

In the above arrangement, the short circuit detector 28 allows the discharge status to be detected precisely, and further, the six different pulses required for the thirteenth embodiment to be simplified into four different types, whereby the machine is simplified.

This embodiment may adopt any machining condition changing method, e.g., the machining conditions are kept unchanged for a short circuit and a normal discharge, and the stop time is changed to a longer value for a quasi-arc discharge and to a further longer value for an arc discharge. Also, it is a matter of course that the machining conditions other than the stop time may be changed, e.g., the electrode pull-up operation (jump) is performed for a short circuit, the stop time is reduced for a normal discharge, the conditions remain unchanged for a quasi-arcdischarge, and the stop time is extended for an arc discharge.

Also, while the six different pulses obtained from the first and second comparators 29, 31 and the short circuit detector 28 were integrated into four different types by the logical device 34 in said embodiment, they may be integrated into four different types by software using a computer without the logical device 34 being provided, or the same control may be carried out for the three different types for which a short circuit has been detected among said six different types, without the pulses being integrated, to essentially exercise control of four different types. Also, the discharge pulses classified into three different types according to high frequency components in this embodiment may be classified into two, four or more types as in the thirteenth embodiment of the invention to produce the identical effects. Also, whereas the machining condition was controlled immediately after the discharge pulse was classified in said embodiment, the machining condition may be controlled using the classification results of a plurality of pulses, e.g., the machining condition is changed when the count value of the classified pulse counted reaches a predetermined value or a classification pattern becomes a specific form. Also, only a display may be provided for the operator without the machining condition being controlled.

While the technique described in the twelfth embodiment of the invention was employed to detect high frequency components in the first and second embodiments, these embodiments are identical to the thirteenth embodiment of the invention in that any of the high frequency component detecting techniques described in the previous first to twelfth embodiments or any other high frequency component detecting technique may be adopted, and that the occurrence of a short circuit may be detected in any method, e.g., the measurement of the discharge current or impedance.

Whereas the voltage waveform was caused to pass the high-pass filter 4 to provide high frequency components in the first to the fourteenth embodiments, a band-pass filter may be employed in place of the high-pass filter 4 to cut unnecessary high frequency components in order to avoid misoperation due to noise, whereby the discharge status can be detected further more accurately. Also, it is apparent that, for example, alternating-current components may be obtained through a capacitor connected in series, direct-current bias components may be removed by the subtraction of the reference voltage value, desired frequency components may be detected by a resonance circuit provided, or an electromagnetic wave generated from the machining gap may be detected by an antenna provided in the vicinity to detect high frequency components, thereby producing the same effects. Further, in the detection of high frequency components with said resonance circuit or antenna, high frequency components may be detected at a desired single frequency or several frequencies, but when they are detected in a desired frequency zone, e.g., by providing a multiplicity of resonance circuits or detection circuits, the discharge status can be detected further more accurately.

Also, while high frequency components in the voltage of the machining gap were detected in the first to the fourteenth embodiments, it is a matter of course that high frequency components generated in the current or impedance of the machining gap may be detected to provide the same effects.

FIG. 30 is a block diagram illustrating a sixteenth embodiment of the invention, wherein the numeral 40 indicates a discharge pulse judging device serving as discharge pulse judging means, 41 designates a first counter for counting quasi-arc discharge pulses determined to be faulty by the discharge pulse judging device 40, 42 denotes a second counter for counting normal discharge pulses determined to be normal by the discharge pulse judging device 40, 43 represents a stop controller for increasing the stop time of electrical discharge machining by the output of the first counter 41 and decreasing the stop time by the output of the second counter 42, and 44 indicates an oscillator.

Operation will now be described in accordance with FIG. 30. The first counter 41 for counting quasi-arc discharge pulses counts the pulses determined to be faulty by the discharge pulse judging device 40. On reaching its set value, the first counter 41 outputs a control pulse to the stop controller 43 and is reset simultaneously. Also, when a normal discharge pulse occurs, the first counter 41 is reset. The second counter 42 for counting normal discharge pulses counts the normal discharge pulses determined to be normal by the discharge pulse judging device 40. On reaching its set value, the second counter 42 outputs a control pulse to the stop controller 43 and is reset at the same time. Also, when a quasi-arc discharge pulse occurs, the second counter 42 is reset. Depending on the control pulse output from the first counter 41, the machining condition is changed to render the stop time longer either in a single stage or in a plurality of stages. Depending on the control pulse output from the second counter 42, the machining condition is changed to make the stop time shorter either in a single stage or in a plurality of stages. The stop time, of which upper or lower limit has been predetermined, may be kept unchanged if the control pulse is output during that stop time. The object to be controlled is not limited to the stop time and a machining current value, discharge duration, a jump condition, etc., may be used independently or combined according to the status of the machining gap as disclosed in, for example, Japanese Laid-Open Patent Publication No. SHO62-10769, Japanese Laid-Open Patent Publication No. SHO49-92696 or Japanese Laid-Open Patent Publication No. SHO58-50811.

Figure 31:
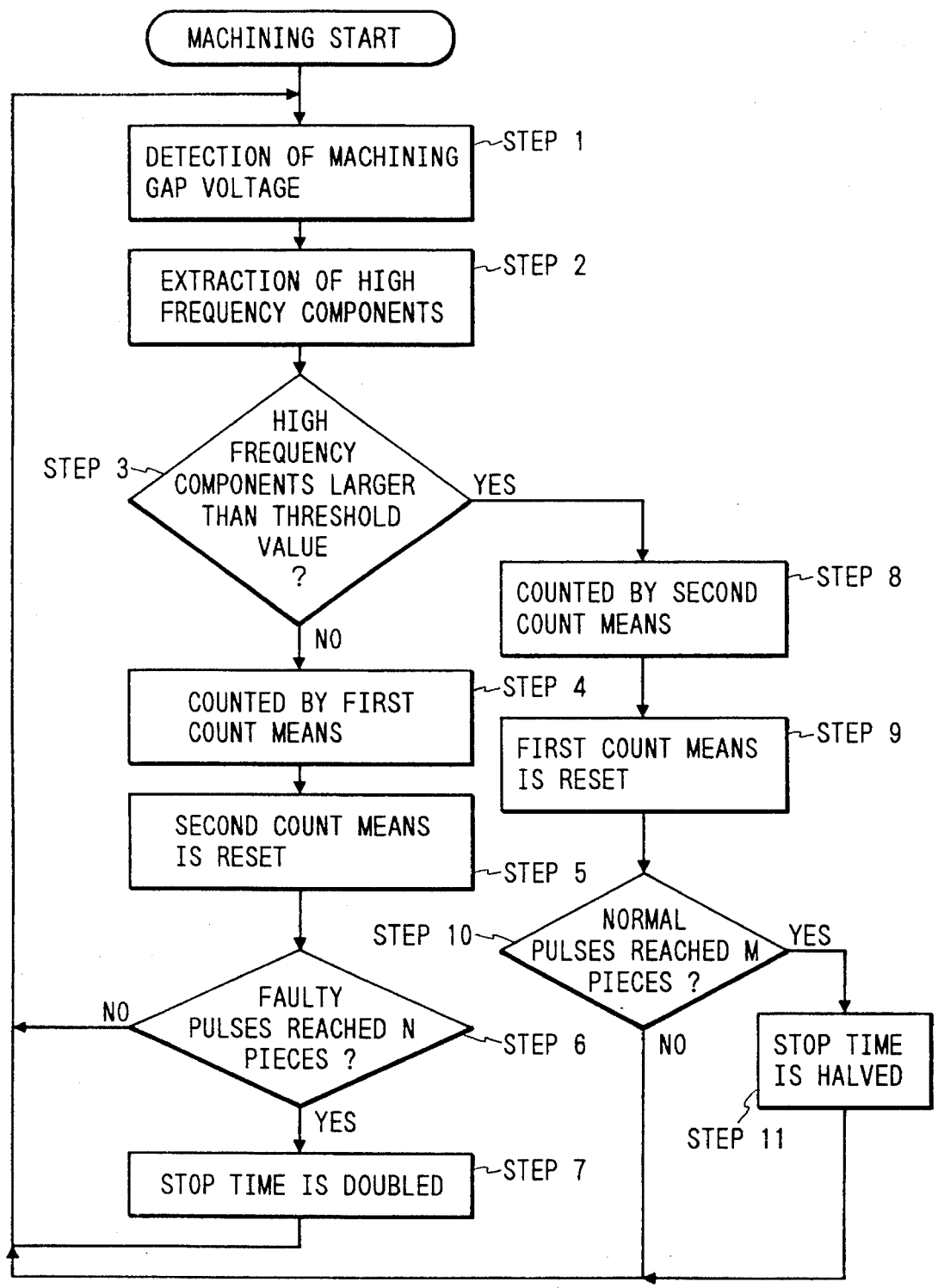
FIG. 31 is a flowchart illustrating a preferred embodiment of a control method according to the machine concerned with the invention in FIG. 30.

FIG. 31 is a flowchart which illustrates a control method using the machine by exemplifying the control of stop time and operation will now be detailed in accordance with this FIG. 31.

First, the machining gap voltage is detected at the start of machining (step 1) and high frequency components are extracted as described above (step 2). It is then judged whether the high frequency components extracted at step 2 are larger than the threshold value or not (step 3). If smaller, the pulses are judged to be faulty and the number of those pulses is counted by the first counter 41 (step 4) and the second counter 42 is reset (step 5). Subsequently, it is judged whether N pieces of faulty pulses have occurred consecutively or not (step 6). If N pieces have not occurred consecutively, the operation returns to the stage preceding step 1 without any further processing. If N pieces have taken place consecutively, the stop time is, for example, doubled (step 7) and the execution returns to the stage preceding step 1.

If the high frequency components are larger than the threshold value at step 3, the pulses are judged to be normal and the number of those pulses is counted by the second counter 42 (step 8) and the first counter 41 is reset (step 9). Then, it is judged whether M pieces of said normal pulses have occurred consecutively or not (step 10). If M pieces of normal pulses have not occurred consecutively at step 10, the execution returns to the stage preceding step 1 without any further processing. If M pieces have occurred consecutively, the stop time is, for example, halved (step 11) and the operation returns to the stage preceding step 1.

The high frequency components of the machining gap voltage are detected as described in the above procedure to control the stop time.

The discharge pulses can be classified into three or more types. FIG. 32 is a block diagram showing a seventeenth embodiment of the invention in which the discharge pulses have been grouped into three different types, and which is a modification to the embodiment shown in FIG. 30. In this case, in addition to said normal discharge pulse and quasi-arc discharge pulse, an extremely instable discharge pulse is classified into an arc discharge pulse. Referring to FIG. 32, 45 indicates a third counter serving as third count means for counting the arc discharge pulses which are extremely instable discharge pulses.

Operation will now be described. The first counter 41 for counting quasi-arc discharge pulses counts the quasi-arc discharge pulses determined to be faulty by the discharge pulse judging device 40. On reaching its set value, the first counter 41 outputs a control pulse to the stop controller 43 and is reset at the same time. Also, when a normal discharge pulse occurs, the first counter 41 is reset. The third counter 45 for counting arc discharge pulses, which are extremely instable discharge pulses, counts the arc discharge pulses determined to be extremely instable by the discharge pulse judging device 40. On reaching its set value, the third counter 45 outputs a control pulse to the stop controller 43 and is reset at the same time. Also, when a normal discharge pulse occurs, the third counter 45 is reset. Meanwhile, the second counter 42 for counting normal discharge pulses counts the normal discharge pulses determined to be normal by the discharge pulse judging device 40. On reaching its set value, the second counter 42 outputs a control pulse to the stop controller 43 and is reset simultaneously. Also, when a quasi-arc discharge pulse or an arc discharge pulse takes place, the second counter 42 is reset. Depending on the control pulse output from the first counter 41 for counting the quasi-arc discharge pulses or the control pulse output from the third counter 45 for counting the arc discharge pulses, machining condition is changed to render the stop time longer either in a single stage or in a plurality of stages. Depending on the control pulse output from the second counter 42 for counting the normal discharge pulses, the machining condition is changed to make the stop time shorter either in a single stage or in a plurality of stages. The way of changing a stop by the control pulse output from the first counter 41 for counting the quasi-arc discharge pulses can be made different from that of changing a stop by the control pulse output from the third counter 45 for counting the arc discharge pulses. For example, when a stop is changed by the control pulse output from the third counter 45 for counting the arc discharge pulses, it may be set to be longer than the stop changed by the control pulse output from the first counter 41 for counting the quasi-arc discharge pulses. As in FIG. 30, the stop time, of which upper or lower limit has been predetermined, can be kept unchanged if the control pulse is output during that stop time. Also, the object to be controlled is not limited to the stop time and may be a machining current value, discharge duration, a jump condition, etc.

Figure 33:
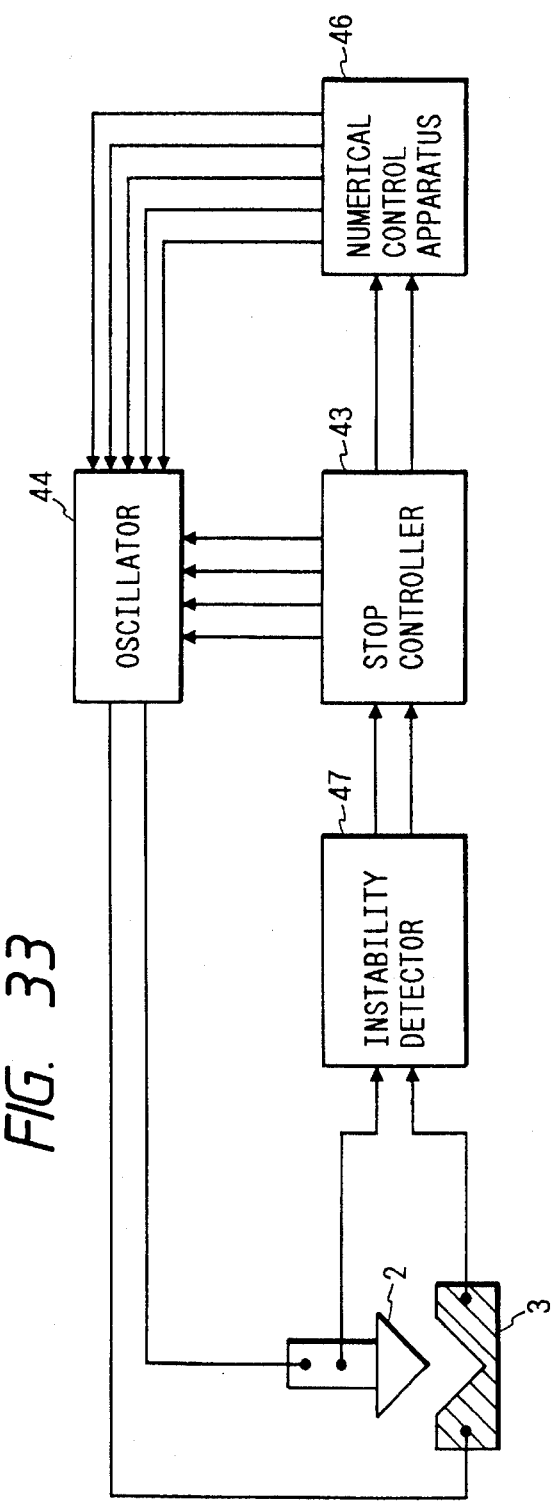
FIG. 33 is a block diagram illustrating an eighteenth embodiment of the invention.

FIG. 33 is a block diagram illustrating an electrical discharge machine concerned with an eighteenth embodiment of the invention, which includes a controller for changing the machining condition under the command of command means, e.g., a numerical control apparatus, if discharge status detector for detecting an electrical discharge machining status has detected stability or instability, and for temporarily stopping the discharge or temporarily controlling the machining condition to be mild from when the discharge status detector has detected stability or instability until when the machining condition is changed under the command of the numerical control apparatus. Referring to FIG. 33, 46 indicates a command device, e.g., a numerical control apparatus, and 47 denotes an instability detector for the electrical discharge machining. The other parts are identical to those in previous embodiments, are identified by identical reference characters and will not be described here.

The operation of the electrical discharge machine according to the eighteenth embodiment of the invention arranged as described above will now be described. When the electrical discharge machining status becomes instable and carbon attaches to a workpiece 1 as a premonitory phenomenon leading to continuous arcs, the continuation of the machining in this status will soon lead to continuous arcs and damage the workpiece 1. However, weakening the machining condition when the carbon has attached to the workpiece 1 causes the carbon to be removed and the machining status to be recovered. When the electrical discharge machining status has become instable, a command to change the machining condition is given by the numerical control apparatus 46 and the machining condition is kept weak or mild temporarily until the machining condition is changed, thereby preventing the machining gap status during that period from being worsened and recovering the machining gap status.

Figure 34:
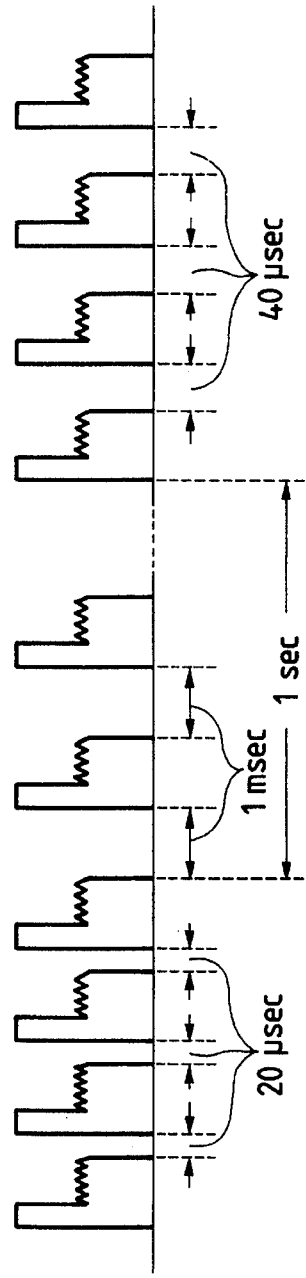
FIG. 34 illustrates a stop time controlling method according to the invention of FIG. 33.

Namely, when the instability of the machining status is recognized by the instability detector 47, the stop time is increased for approximately one second by the stop controller 43 to longer than 1 msec. The numerical control apparatus 46 receives information on the machining instability from the stop controller 43 and gives a mild machining condition command. Although a certain period of time is required from when the numerical control apparatus 46 has received the instability information to when the new condition command is provided actually, instability can be avoided during that period because the stop time has been increased for approximately one second. FIG. 34 shows an example of a stop time controlling method. For instance, this figure shows how the stop time changes when the numerical control apparatus 46 gives a command to change the stop time to 40 μsec upon the detection of instability during machining at the stop time of 20 μsec. Generally, as signal processing time, a delay of approximately several 100 μsec will occur between when the command is given by the numerical control apparatus 46 and when the stop time is actually changed. In order to protect the workpiece from damage during that delay time, control is exercised for about 1 second to force the stop time to be increased to longer than 1 msec.

Figure 35:
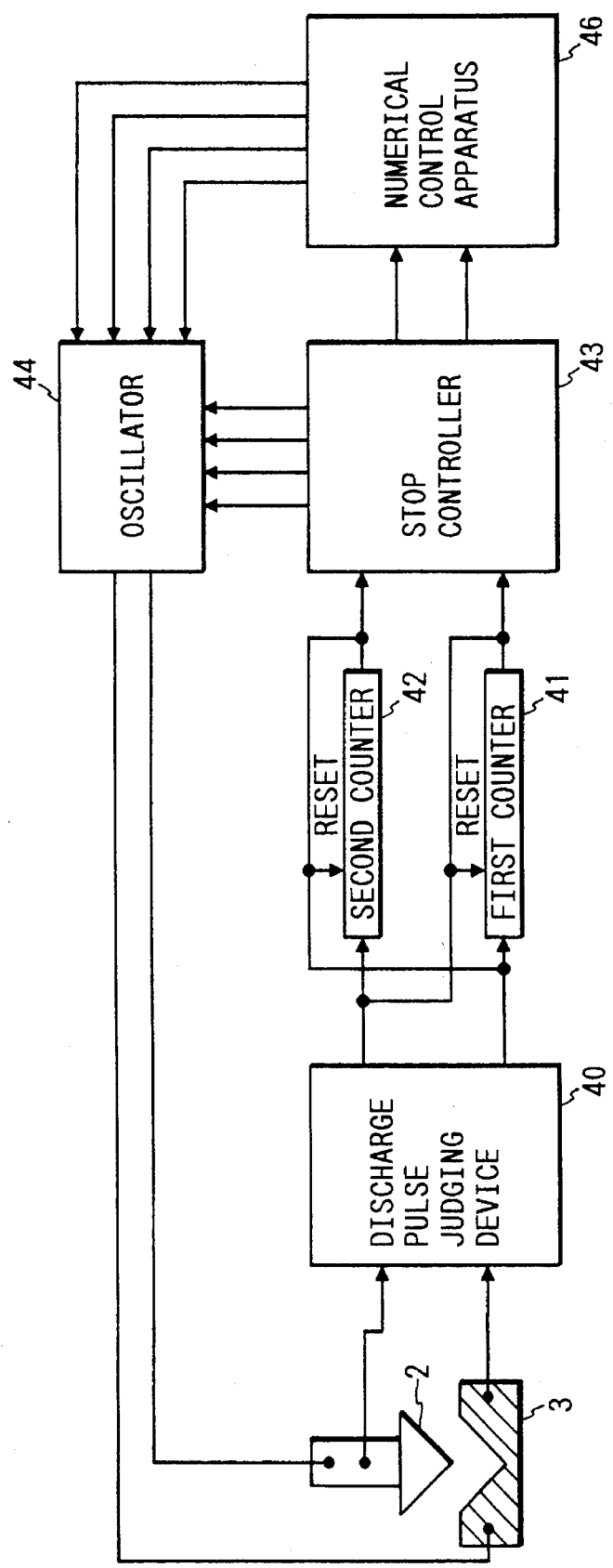
FIG. 35 is a block diagram illustrating nineteenth embodiment of the invention.

FIG. 35 is a block diagram illustrating an electrical discharge machine related to an nineteenth embodiment of the invention, which includes discharge pulse judging device 40 for determining whether each discharge pulse is normal or faulty, first counter 41 for counting the number of successive quasi-arc discharge pulses, second counter 42 for counting the number of successive normal discharge pulses, and stop controller 43 for changing the machining condition under the command of a command device, e.g., a numerical control apparatus 46, when each counter 41, 42 has reached its set value, and for temporarily stopping the discharge or temporarily controlling the machining condition to be mild from when each counter 41, 42 has reached its set value until when the machining condition is changed under the command of the numerical control apparatus 46. The other parts are identical to those of previous embodiments, are identified by identical reference characters, and will not be described here.

Operation will now be described. When the first counter 41 for counting quasi-arc discharge pulses has reached its set value and the instability of the machining status is recognized, the stop time is increased approximately one second by the stop controller 43 to longer than 1 msec. The numerical control apparatus 46 receives information on the machining instability from the stop controller 43 and gives a mild machining condition command. Although a certain period of time is required from when the numerical control apparatus 46 has received the instability information to when the new condition command is given actually, instability can be avoided during that period because the stop time has been increased approximately one second. As in previous embodiments, the object to be controlled is not limited to the stop time and may be a machining current value, discharge duration, a jump condition, etc.

Figure 36:
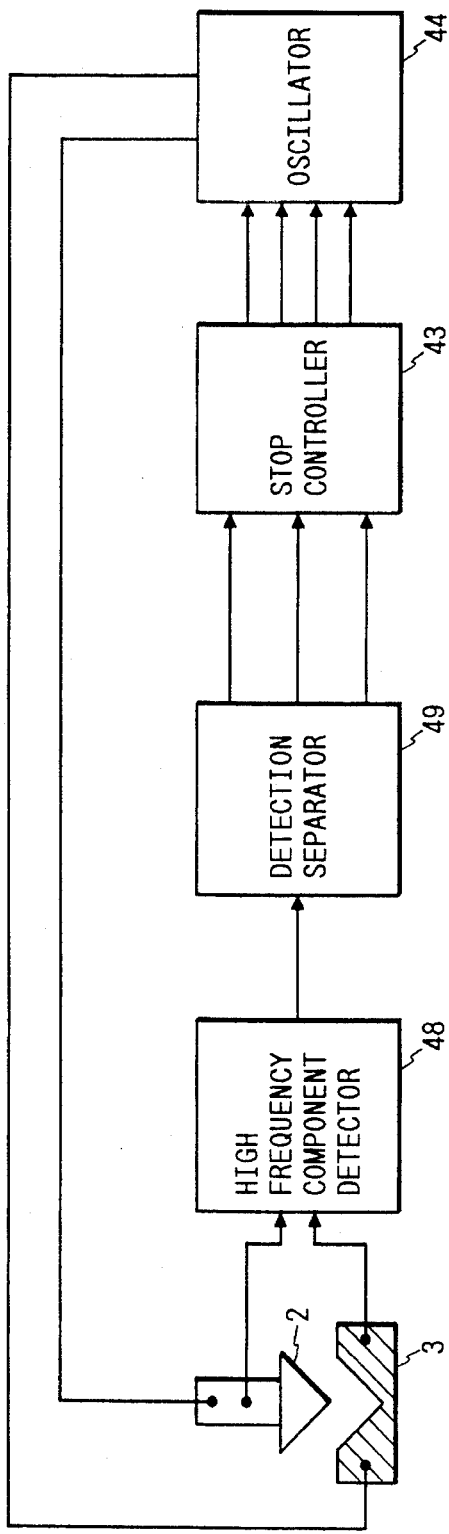
FIG. 36 is a block diagram illustrating a twentieth preferred embodiment of the invention.

FIG. 36 is a block diagram illustrating an electrical discharge machine concerned with a twentieth embodiment of the invention, wherein 48 indicates a high frequency component detector acting as high frequency component detecting means for detecting high frequency components included in a machining gap voltage during electrical discharges, and 49 represents a detection separator serving as detection separating means for separating discharge pulses into three stages depending on the high frequency component magnitude, i.e., a discharge pulse in a first stage wherein there are a smallest number of high frequency components is defined as an arc discharge pulse, a discharge pulse in a second stage wherein there are a second smallest number of high frequency components defined as a quasi-arc discharge pulse, and a discharge pulse in a third stage wherein there are a largest number of high frequency components defined as a normal discharge pulse. 43 indicates a stop controller for controlling the stop time of electrical discharge machining under the control of a signal from the high frequency component detector 48. The other parts are identical to those in previous embodiments, are identified by identical reference characters, and will not be described here.

Operation will now be described. When a discharge pulse determined by the detection separator 49 to be a quasi-arc discharge pulse with a few high frequency components takes place, the machining condition is slightly mildened by the stop controller 43. When a discharge pulse determined by the detection separator 49 to be an arc discharge pulse with the fewest high frequency components occurs, the machining condition is greatly mildened by the stop controller 43. When a normal discharge pulse with the largest number of high frequency components is generated, the machining condition is hardened by the stop controller 43. Generally, the stop time during electrical discharge machining is approximately several 10 μsec. To slightly weaken the machining condition indicates that machining energy is reduced by increasing the stop time to about several times longer, and to greatly weaken the machining condition indicates that the machining energy is reduced by increasing the stop time to longer than 1 mSec. To harden the machining condition means that the machining energy is increased by reducing the stop time to, for example, half.

The object to be controlled is not limited to the stop time. It may be, for example, a jump distance, machining time between jumps, discharge duration or discharge current. When the object to be controlled is the stop time, the variation of the stop time can be changed as required.

Figure 37:
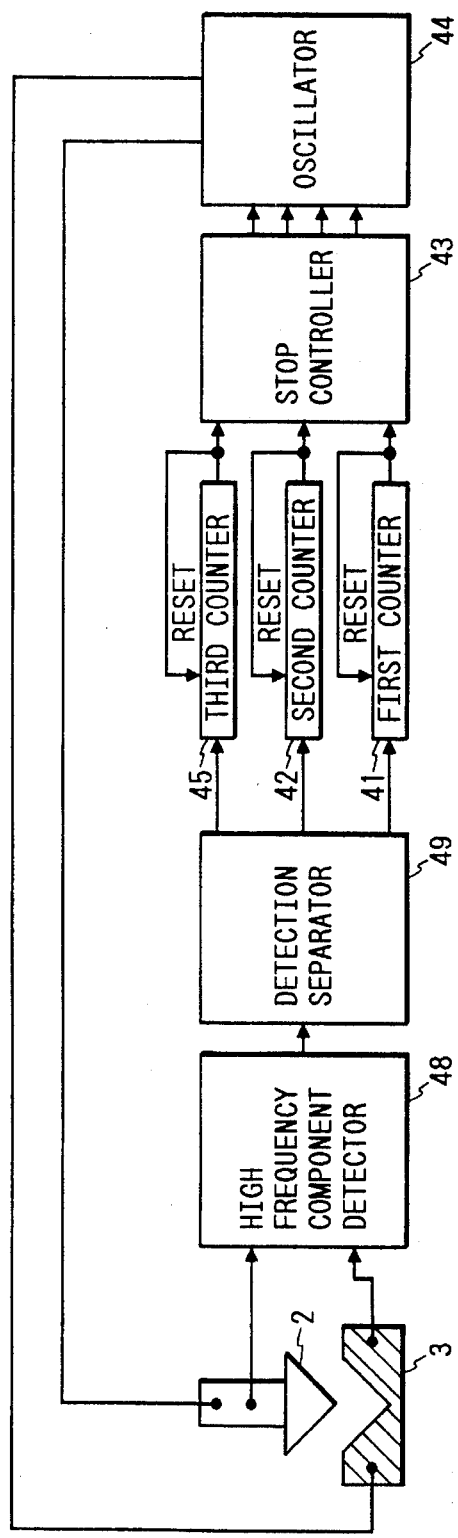
FIG. 37 is a block diagram illustrating a twenty-first preferred embodiment of the invention.

FIG. 37 is a block diagram illustrating an electrical discharge machine related to a twenty-first embodiment of the invention, wherein 48 indicates a high frequency component detector for detecting high frequency components included in a machining gap voltage during electrical discharges, and 49 designates a detection separator for separating discharge pulses into three stages depending on the high frequency component magnitude, i.e., an arc discharge pulse with a smallest number of high frequency components, a quasi-arc discharge pulse having a second smallest number of high frequency components, and a normal discharge pulse having a largest number of high frequency components. 41 indicates a first counter for counting arc discharge pulses having the smallest number of high frequency components, 42 represents a second counter for counting quasi-arc discharge pulses with the second smallest number of high frequency components, and 45 denotes a third counter for counting normal discharge pulses having the greatest number of high frequency components. 43 indicates a stop controller for controlling the stop time of electrical discharge machining under the control of a signal from the high frequency component detector 48. The other parts are identical to those of previous embodiments, are designated by identical reference characters, and will not be described here.

Operation will now be described. The discharge pulses are grouped into the three stages by the detection separator 49 and counted by the corresponding counters 41, 42, 45. When the first counter 41 for counting arc discharge pulses having the smallest number of high frequency components reaches its set value, the stop time is increased to, for instance, longer than 1 μmsec, and at the same time, the first counter 41 is reset. When the second counter 42 for counting quasi-arc discharge pulses having the second smallest number of high frequency components reaches its set value, the stop time is, for example, doubled, and at the same time, the second counter 42 is reset. When the third counter 45 for counting normal discharge pulses including the largest number of high frequency components reaches its set value, the stop time is, for example, halved, and simultaneously, the third counter 45 is reset. In this case, the discharge pulses in the first stage may be counted as the discharge pulses in the second stage.

The object to be controlled is not limited to the stop time. It may be, for example, a jump distance, machining time between jumps, discharge duration or discharge current. When the object to be controlled is the stop time, the variation of the stop time can be changed as required.

Figure 38:
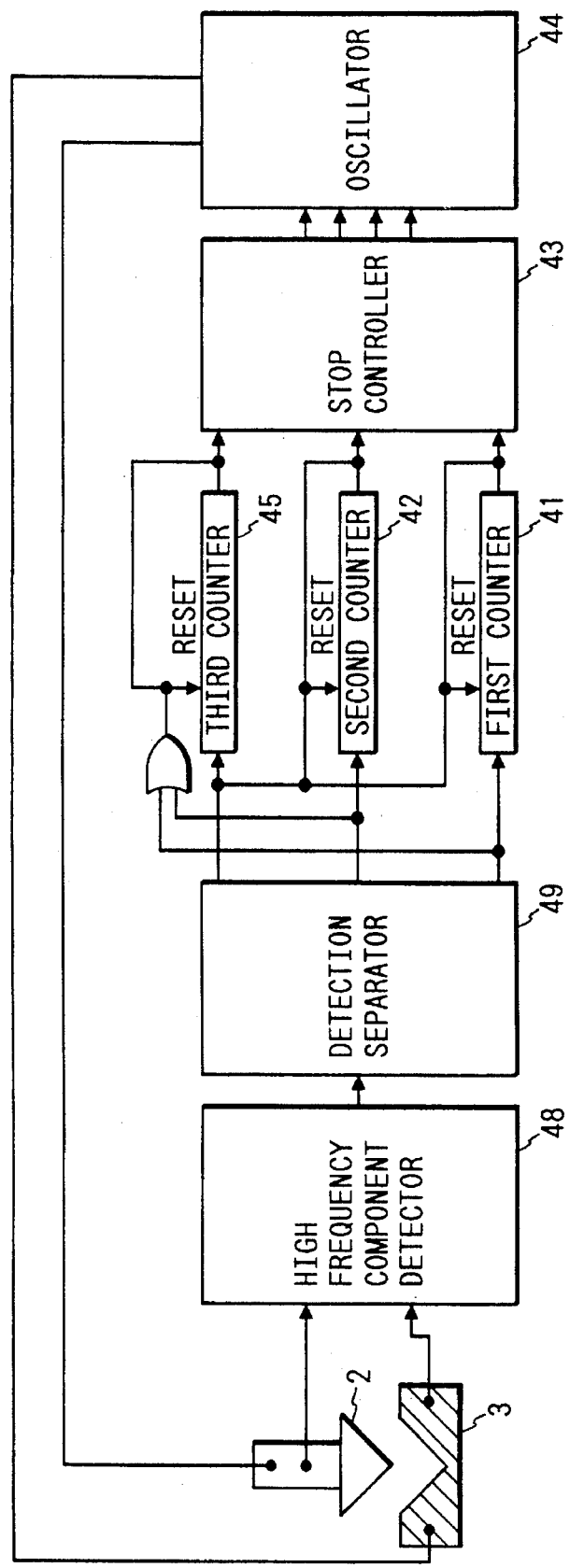
FIG. 38 is a block diagram illustrating a twenty-second preferred embodiment of the invention.

FIG. 38 is a block diagram illustrating an electrical discharge machine concerned with a twenty-second embodiment of the invention, wherein 48 indicates high frequency component detector for detecting high frequency components included in a machining gap voltage during electrical discharges, and 49 denotes detection separator for separating discharge pulses into three stages depending on the high frequency component magnitude, i.e., an arc discharge pulse with a smallest number of high frequency components, a quasi-arc discharge pulse having a second smallest number of high frequency components, and a normal discharge pulse having a largest number of high frequency components. 41 indicates a first counter for counting the number of successive arc discharge pulses having the smallest number of high frequency components, 42 designates a second counter for counting the number of successive quasi-arc discharge pulses with the second smallest number of high frequency components, and 45 denotes a third counter for counting the number of successive normal discharge pulses having the greatest number of high frequency components. 43 indicates a stop controller for controlling the stop time of electrical discharge machining under the control of a signal from the high frequency component detector 48. The other parts are identical to those in previous embodiments, are designated by identical reference characters, and will not be described here.

Operation will now be described. The discharge pulses are classified into the three stages by the detection separator 49 and their successive numbers are counted by the corresponding counters 41, 42, 45. The operations of the counters 41, 42, 45 are identical to those in the modification to another embodiment of the invention shown in FIG. 31 and will therefore not be described here.

The object to be controlled is not limited to the stop time. It may be, for example, a jump distance, machining time between jumps, discharge duration or discharge current. When the object to be controlled is the stop time, the variation of the stop time can be changed as required.

Figure 39:
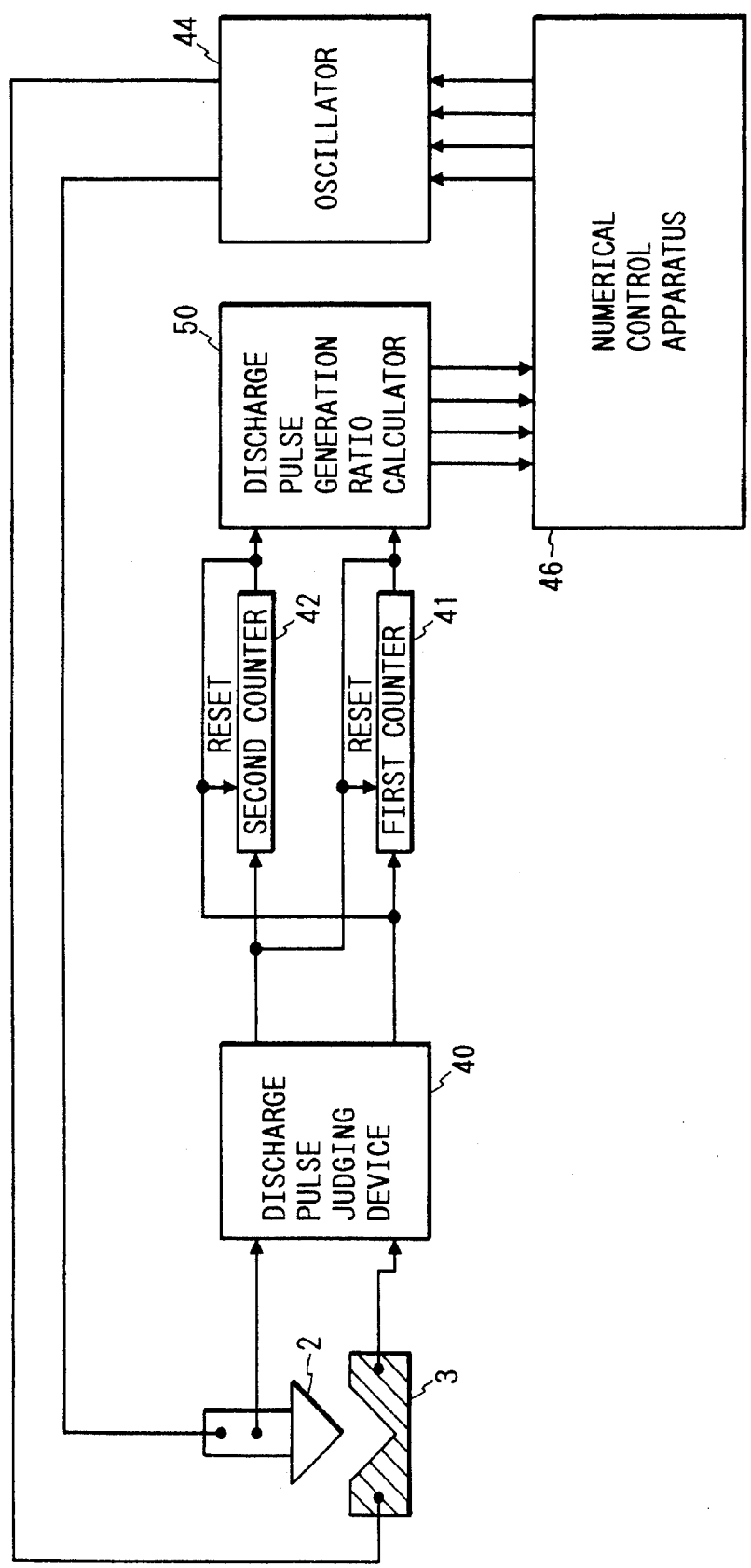
FIG. 39 is a block diagram illustrating a twenty-third preferred embodiment of the invention.

FIG. 39 is a block diagram illustrating an electrical discharge machine related to a twenty-third embodiment of the invention, wherein 40 indicates discharge pulse judging device for determining whether each discharge pulse is normal or faulty, 41 denotes a first counter for counting quasi-arc discharge pulses determined to be faulty by the discharge pulse judging device 40, 42 designates a second counter for counting normal discharge pulses determined to be normal by the discharge pulse judging device 40, 50 represents a discharge pulse generation ratio calculator acting as discharge pulse generation ratio calculating means for reading the counts of the first and the second counters 41, 42 and calculating the ratios of said discharge pulses generated in a certain length of time, and 46 indicates a command apparatus, e.g, a numerical control apparatus, for changing the machining condition depending on the ratios of the normal and quasi-arc discharge pulses. The other parts are identical to those in previous embodiments, are designated by identical reference characters, and will not be described here.

Operation will now be described. The discharge pulses are classified into the quasi-arc discharge pulses and normal discharge pulses by the discharge pulse judging device 40 and counted by the corresponding counters 41, 42. The discharge pulse generation ratio calculator 50 for calculating the ratios of the discharge pulses generated reads the counts of the first and the second counters 41, 42 at intervals of predetermined time T, and at the same time, resets the counts of the first and the second counters 41, 42, and calculates the generation ratios of the normal and quasi-arc discharge pulses. The numerical control apparatus 46 recognizes the machining status as instable when the ratio of the quasi-arc discharge pulses has exceeded a certain value, e.g., 10%, and renders the machining condition mild. The discharge pulses may be classified into more than two different types, and the object to be controlled is not limited to the stop time. It may be, for example, a jump distance, machining time between jumps, discharge duration or discharge current. When the object to be controlled is the stop time, the variation of the stop time can be changed as required.

Figure 40:
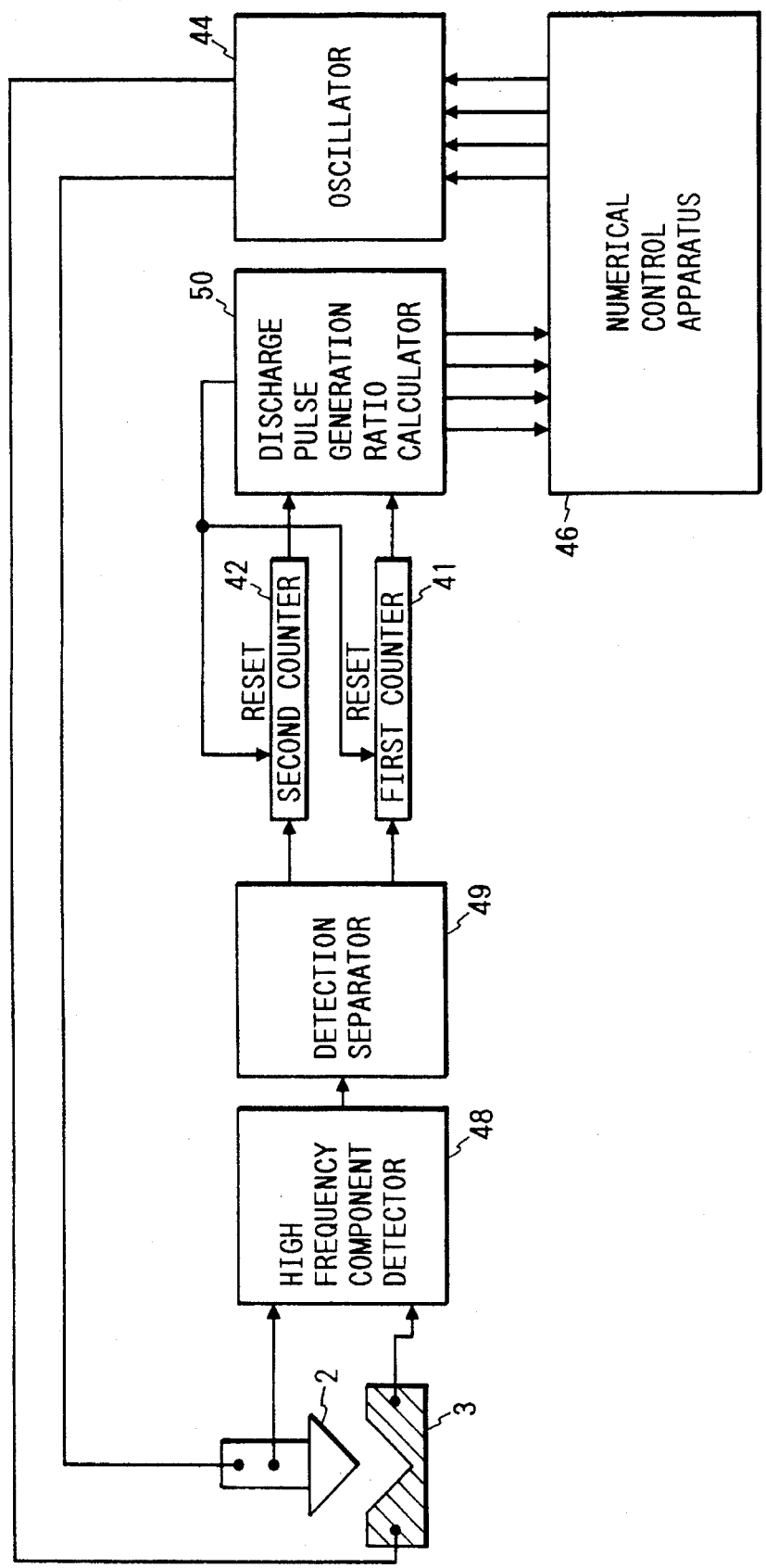
FIG. 40 is a block diagram illustrating a twenty-fourth preferred embodiment of the invention.

FIG. 40 is a block diagram illustrating an electrical discharge machine related to a twenty-fourth embodiment of the invention, wherein 48 indicates high frequency component detector for detecting high frequency components included in a machining gap voltage during electrical discharges, 49 denotes detection separator for determining whether discharge pulses are normal or faulty depending on the high frequency component magnitude, 41 represents a first counter for counting quasi-arc discharge pulses determined to be faulty by the detection separator 49, 42 designates a second counter for counting normal discharge pulses determined to be normal by the detection separator 49, 50 indicates discharge pulse generation ratio calculator for reading the counts of the first and the second counters 41, 42 and calculating the ratios of the discharge pulses generated in a certain length of time, and 46 denotes a command apparatus, e.g., a numerical control apparatus, for changing the machining condition depending on the ratios of the normal and quasi-arc discharge pulses. The other parts are identical to those in previous embodiments, are designated by identical reference characters, and will not be described here.

Operation will now be described. The discharge pulses are grouped into the quasi-arc discharge pulses and normal discharge pulses by the high frequency component detector 48 and the detection separator 49 depending on the high frequency component magnitude. The operations of the counters and thereafter are identical to those in the twenty-second embodiment of the invention shown in FIG. 39 and will therefore not be described here.

Figure 41:
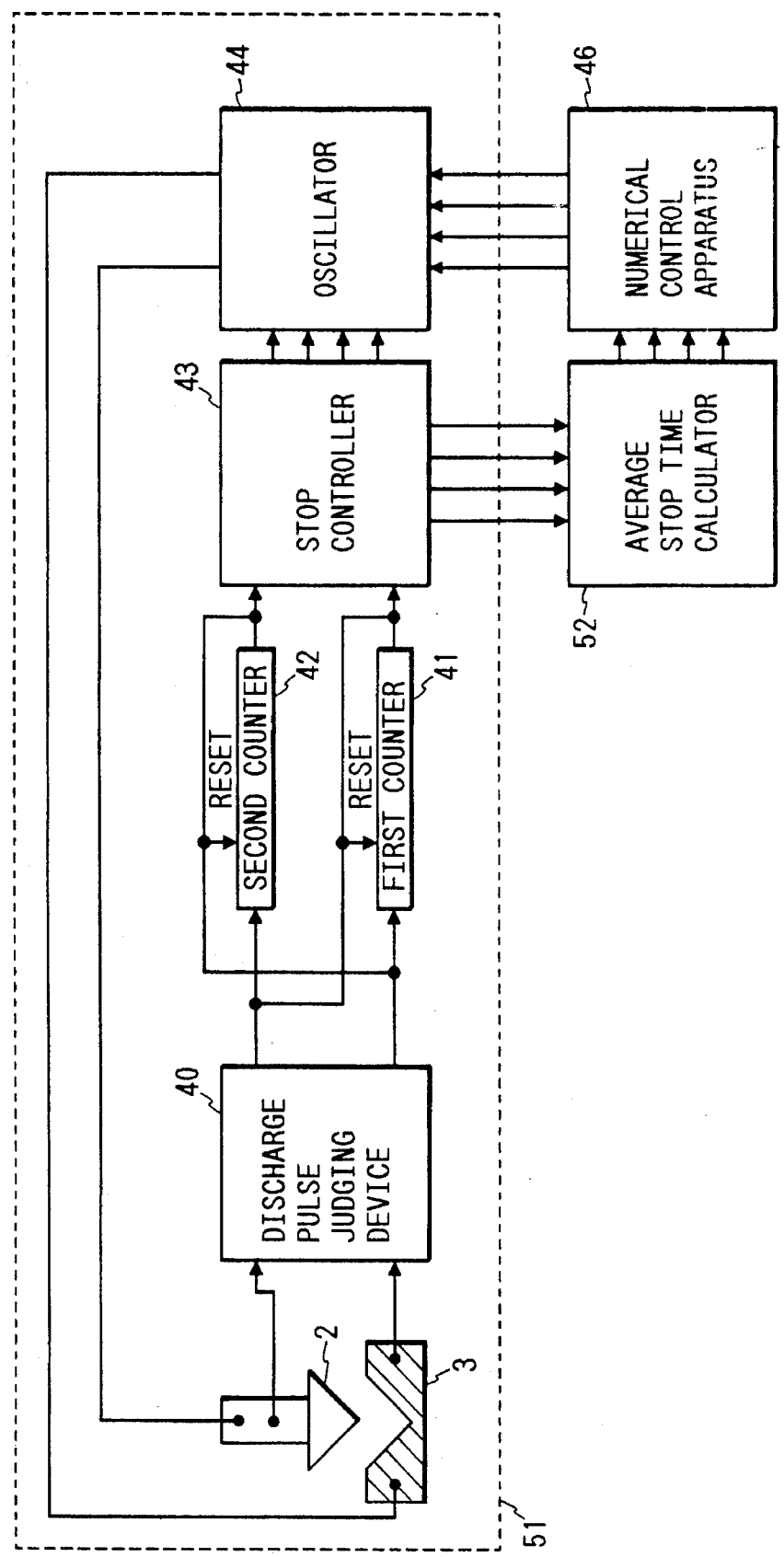
FIG. 41 is a block diagram illustrating a twenty-fifth preferred embodiment of the invention.

FIG. 41 is a block diagram illustrating an electrical discharge machine concerned with a twenty-fifth embodiment of the invention, wherein 51 indicates the arrangement diagram of the sixteenth embodiment of the invention shown in FIG. 30, illustrating the electrical discharge machine which exercises stop control. 52 indicates an average stop time calculator acting as average stop time calculating means for finding the average value of varying discharge pulse stop time, and 46 designates a command apparatus, e.g., a numerical control apparatus, for judging whether the machining status is stable or instable and changing the machining condition depending on the average stop time found by the average stop time calculator 52.

Figure 42:
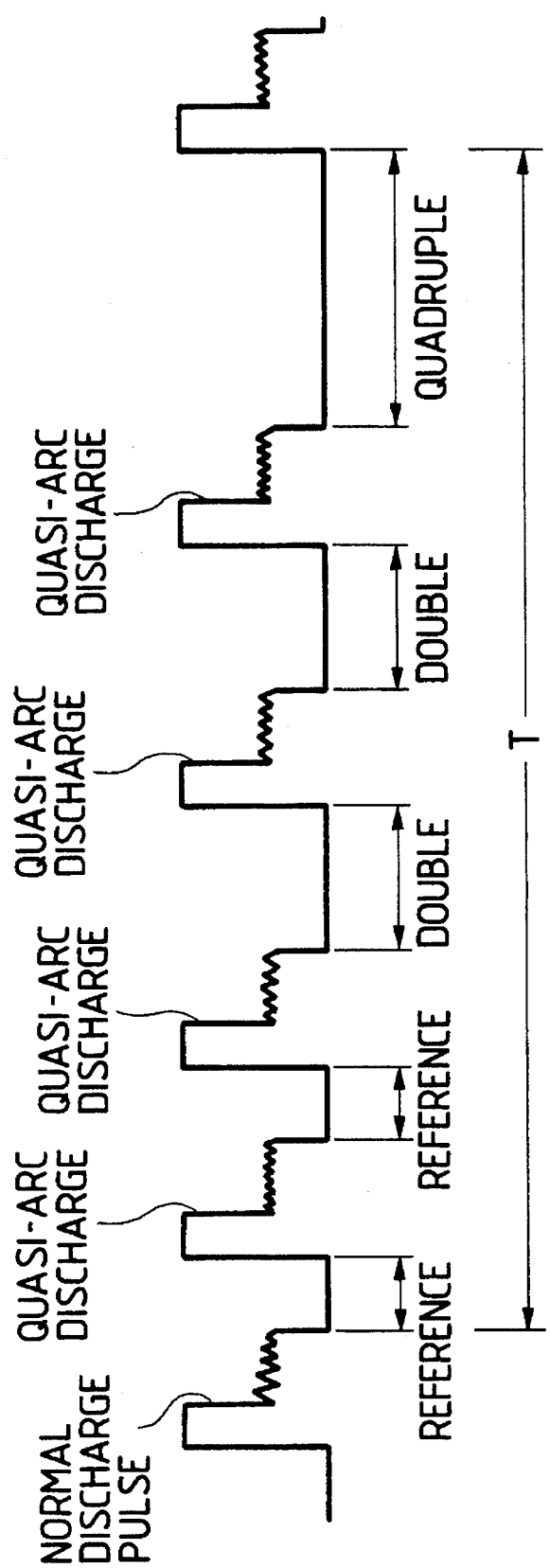
FIG. 42 illustrates the operation of the embodiment shown in FIG. 41.

Operation will now be described. As illustrated in the embodiment of the invention in FIG. 30, FIG. 42 shows the operation of the electrical discharge machine during the stop time, which controls the stop time. In FIG. 42, the stop time is controlled to be doubled when two quasi-arc discharge pulses occur in succession. In the electrical discharge machine which carries out stop control as described above, whether the machining status is stable or instable can be judged by an increase in the stop time. Assuming that the reference stop time in time T is 1 in FIG. 40, the stop times are 1, 1, 2, 2 and 4, the average stop time is calculated by the expression of (1+1+2+2+4)/5, and the result of calculation is 2. This calculation is made by the average stop time calculator 52. This value is judged by the numerical control apparatus 46, which then changes the machining condition. For instance, the machining condition is controlled to be much milder at the average stop time of 2.0 or greater, to be slightly milder at the average stop time between 1.5 and less than 2.0, and to be severer at the average stop time of 1.0 when no quasi-arc discharge pulses occur.

Figure 43:
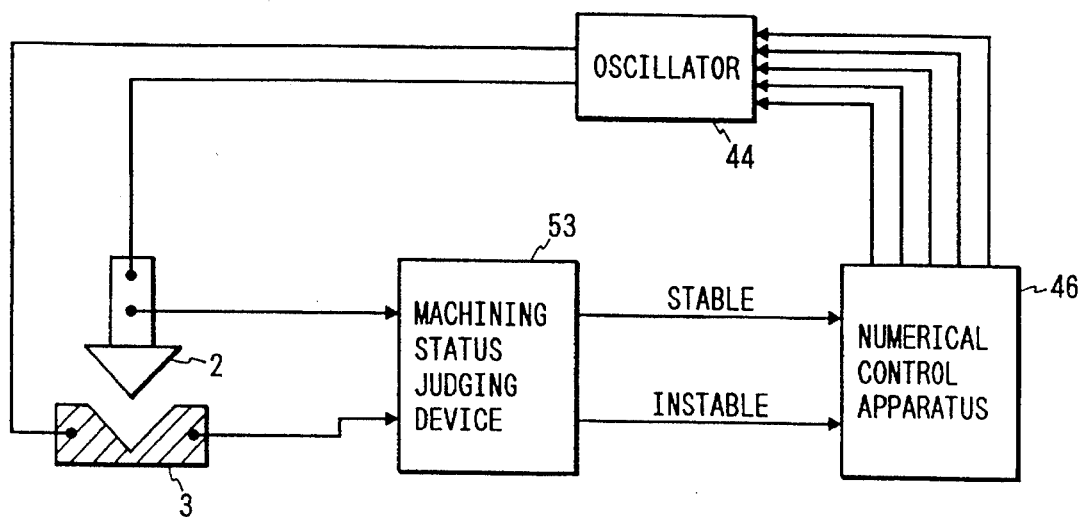
FIG. 43 is a block diagram illustrating a twenty-sixth preferred embodiment of the invention.

FIG. 43 is a block diagram illustrating an electrical discharge machine concerned with a twenty-sixth embodiment of the invention, wherein 53 indicates a machining status judging device serving as machining status judging means for determining whether the electrical discharge machining status is stable or instable, and 46 denotes a command apparatus, e.g., a numerical control apparatus, for changing machining conditions in an initial machining stage under the control of a signal from the machining status judging device 53. The other parts are identical to those in previous embodiments, are designated by identical reference characters, and will not be described here.

Operation will now be described. Whether the electrical discharge machining status is stable or instable is determined by the machining status judging device 53. It is known that machining is-likely to be instable in the initial machining stage. In this case, to weaken the machining conditions is effective to progress the machining stably. Hence, the machining is carried out in the initial stage under the machining conditions with small energy. When the machining status is determined to be stable by the machining status judging device 53, the machining conditions are switched to those with larger machining energy. Further, when the machining status is determined to be stable under those machining conditions, the machining conditions are changed to those with much larger machining energy. In this manner, the machining conditions are changed in sequence. The machining conditions include discharge current, a no-load voltage, discharge duration, stop time, a jump condition, etc. Further, if the switching to the conditions having large machining energy in the initial machining stage has rendered the machining conditions instable, the machining conditions can be returned to the original.

Figure 44:
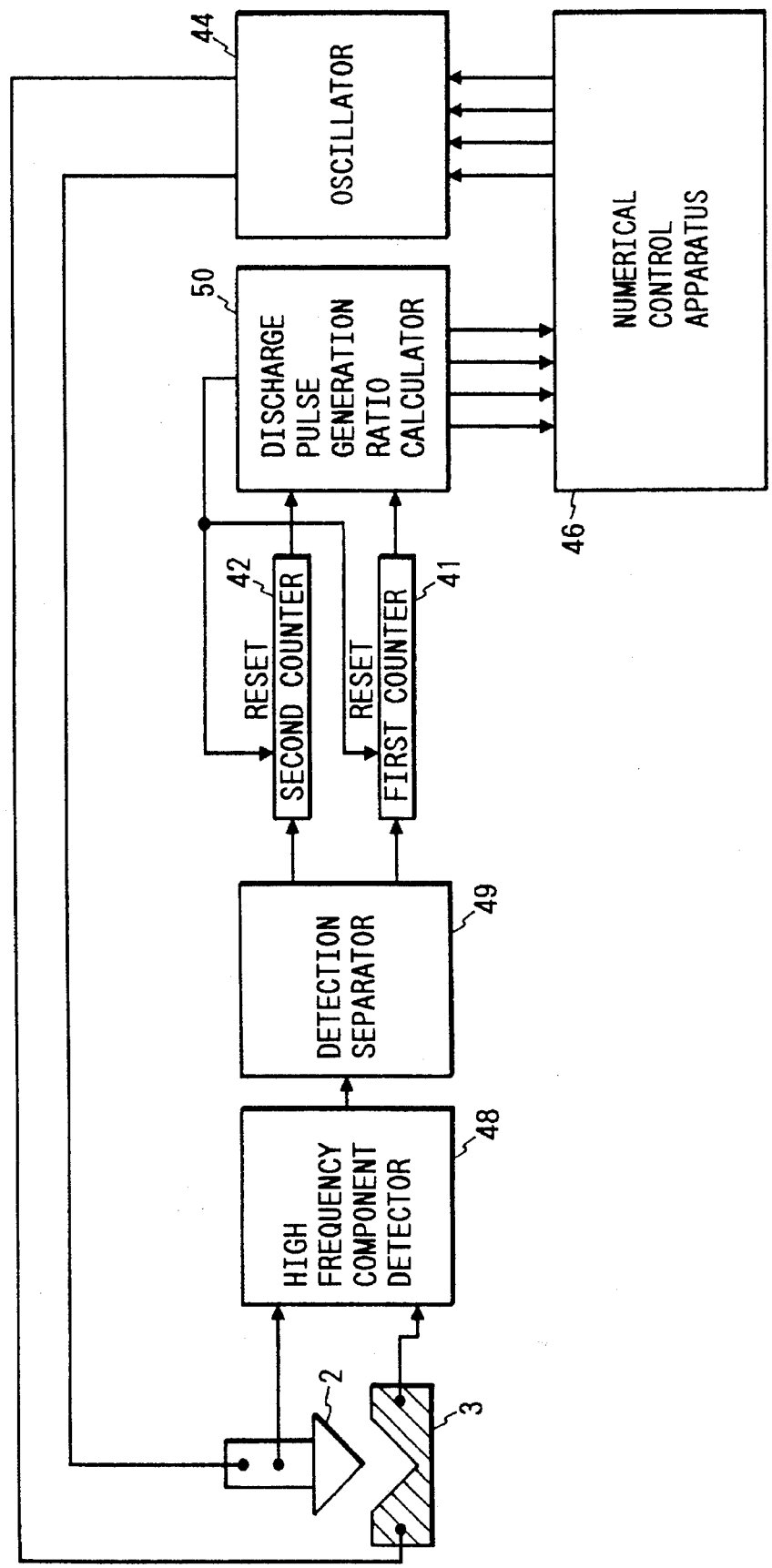
FIG. 44 is a block diagram illustrating a twenty-seventh preferred embodiment of the invention.

FIG. 44 is a block diagram illustrating an electrical discharge machine related to a twenty-seventh embodiment of the invention, wherein 48 indicates a high frequency component detector for detecting high frequency components included in a machining gap voltage during electrical discharges, 49 designates a detection separator for determining whether discharge pulses are normal or faulty depending on the high frequency component magnitude, 41 denotes a first counter for counting quasi-arc discharge pulses determined to be faulty by the detection separator 49, 42 represents a second counter for counting normal discharge pulses determined to be normal by the detection separator 49, 50 denotes a discharge pulse generation ratio calculator for reading the counts of the first and the second counters 41, 42 and calculating the ratios of the discharge pulses generated in a certain length of time, and 46 indicates a command apparatus, e.g., a numerical control apparatus, for changing the machining conditions depending on the ratios of the normal and quasi-arc discharge pulses. The other parts identical to those in previous embodiments, are designated by identical reference characters, and will not be described here.

Operation will now be described. The high frequency components of the discharge pulses are detected by the high frequency component detector 48, the discharge pulses are classified into normal and faulty discharge pulses by the detection separator 49 according to the high frequency component magnitude, and the ratios of the normal discharge pulses and quasi-arc discharge pulses are calculated by the discharge pulse generation ratio calculator 50 as described in the embodiment of the invention shown in FIG. 40 and will therefore not be described here.

In the initial machining stage, machining is performed under the machining conditions having small energy. When the ratio of faulty discharge pulse generation has been calculated to be, for example, 5% or less by the discharge pulse ratio calculator 50, the machining conditions are switched to those with larger machining energy. Further, when the machining status is determined to be stable under those machining conditions, the machining conditions are changed to those with much larger machining energy. The machining conditions are thus changed in sequence. If the switching to the conditions having large machining energy in the biting stage has rendered the machining conditions instable, the machining conditions can be returned to the original.

Figure 45:
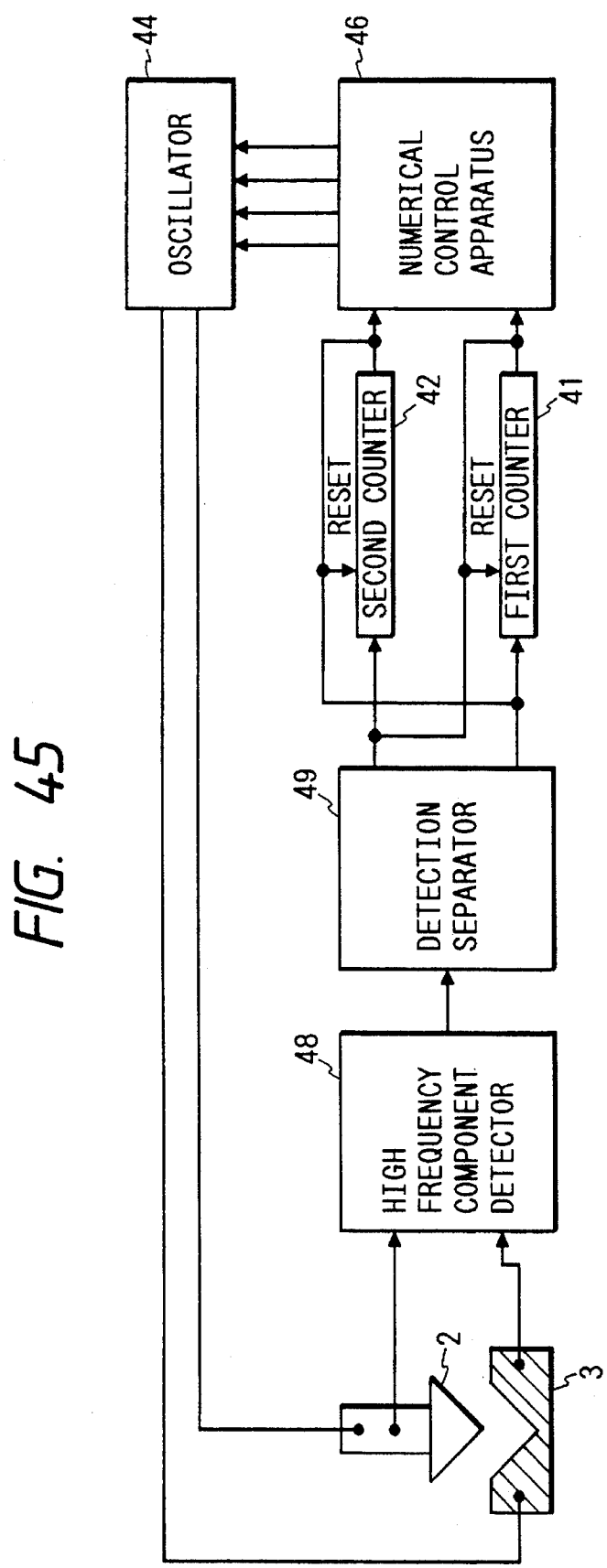
FIG. 45 is a block diagram illustrating a twenty-eighth preferred embodiment of the invention.

FIG. 45 is a block diagram illustrating an electrical discharge machine related to a twenty-eighth embodiment of the invention, wherein 48 indicates a high frequency component detector for detecting high frequency components included in a machining gap voltage during electrical discharges, 49 designates a detection separator for separating the discharge pulses into two stages depending on the high frequency component magnitude, 41 represents a first counter for counting the number of successive quasi-arc discharge pulses determined to be faulty by the detection separator 49, 42 denotes a second counter for counting the number of successive normal discharge pulses determined to be normal by the detection separator 49, and 46 indicates a command apparatus, e.g., a numerical control apparatus, for changing the machining conditions under the control of signals from the first and the second counters 41, 42.

Operation will now be described. In the initial machining stage, electrical discharge machining is carried out under the machining conditions having small energy. When the number of successive quasi-arc discharge pulses counted by the first counter 41 does not reach its set value or when a length of time when the set value is not reached has continued for a predetermined period of time, the machining conditions are switched to those with larger machining energy by the numerical control apparatus 46. Further, when, on those machining conditions, the number of successive quasi-discharge pulses counted by the first counter 41 does not reach its set value or when a length of time when the set value is not reached has continued for a predetermined period of time, the machining conditions are changed to those with much larger machining energy. In this way, the machining conditions are changed in sequence. Further, if the switching to the conditions having large machining energy in the initial machining stage has caused the number of successive quasi-arc discharge pulses counted by the first counter 41 to reach its set value, the machining conditions can be returned to the original.

Figure 46:
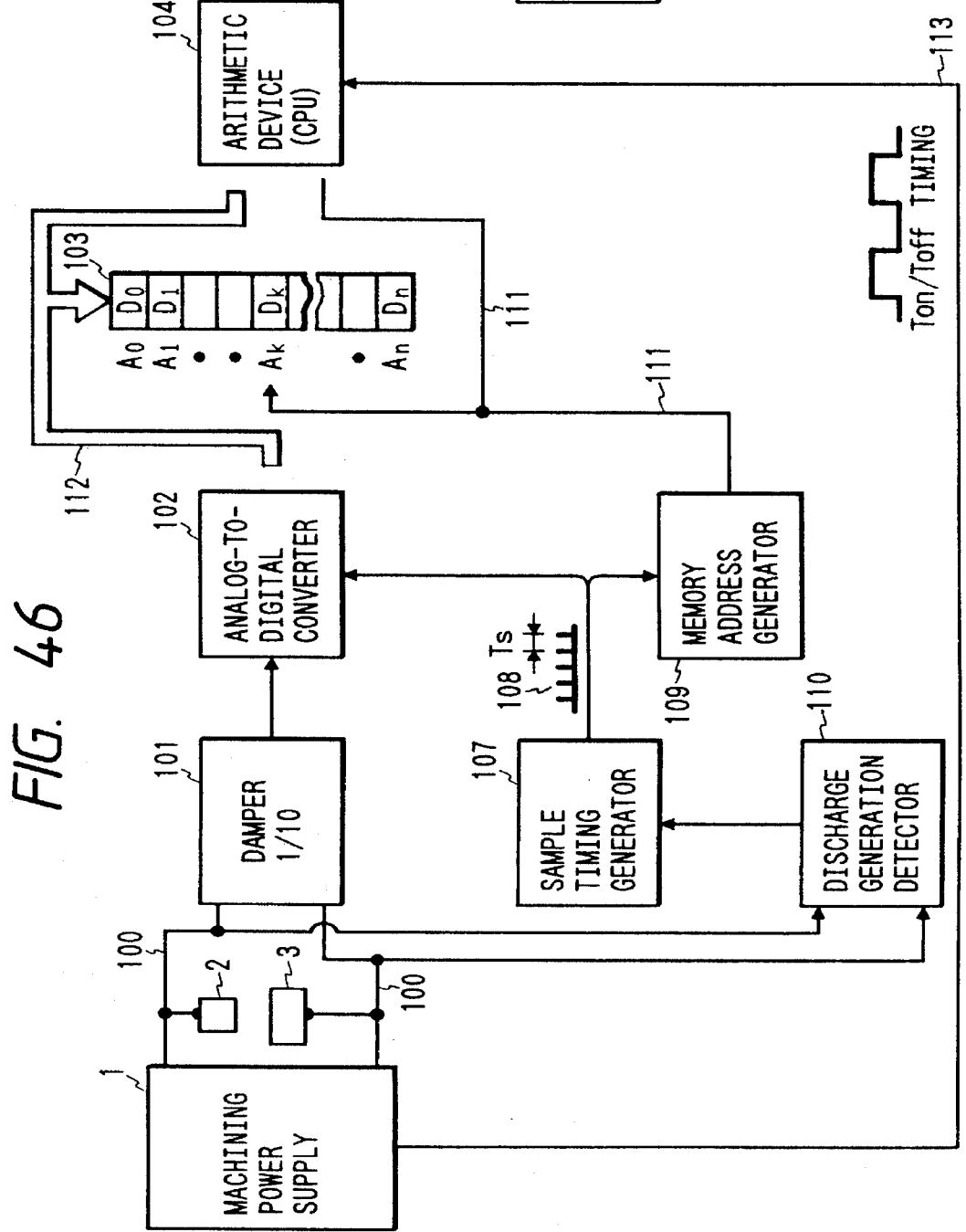
FIG. 46 is a block diagram illustrating a twenty-ninth preferred embodiment of the invention.

FIG. 46 is an arrangement diagram of a twenty-ninth embodiment of the invention. In FIG. 46, 1 indicates a machining power supply, 2 designates an electrode, 3 denotes a workpiece, 100 represents a detection cable, 101 indicates a damper, 102 denotes an analog-to-digital converter serving as analog-to-digital convert means, 103 represents a storage device, 104 indicates an arithmetic device (CPU) acting as arithmetic means, 105 denotes a comparator (CPU) acting as comparing means, 106 designates a reference value or reference pattern generator serving as reference value or reference pattern generating means, 107 represents sample timing generator, 108 indicates sample timing Ts, 109 represents memory address generator, 110 denotes discharge generation detector, 111 designates address buses, 112 indicates a data bus of the storage device, and 113 denotes a discharge pulse Ton/Toff timing signal. Electrical discharge machining is generally carried out in dielectric, which is omitted in FIG. 46.

Figure 47:
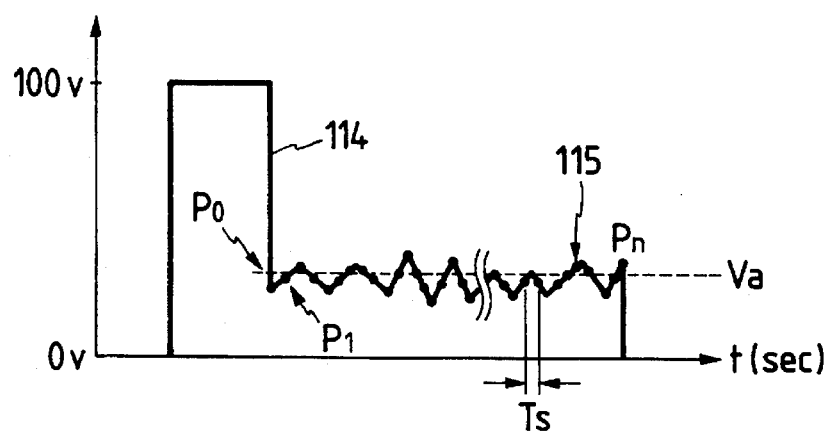
FIG. 47 illustrates the process of sampling in the invention.

Operation will now be described. A discharge voltage generated at the machining gap is connected to the damper 101 by the detection cable 100, and the damper 101 damps the discharge voltage waveform to, for example, 1/10, i.e., damps the input voltage of 100 V to 10 V, and outputs it. On detection of a discharge at the machining gap, the discharge generation detector 110 outputs a signal. On receiving this signal, the sample timing generator 107 generates the sample timing signal 108 of cycle Ts. The analog-to-digital converter 102 samples the output waveform of the damper 101 in synchronization with the sample timing signal 108 and converts it into a digital value. The memory address generator 109 consisting of a counter adds the sample timing signals 108 in sequence and generates memory addresses (A0, A1 to An). FIG. 47 illustrates the process of sampling, wherein 114 indicates a discharge voltage waveform of which time axis is shown expanded for ease of understanding. 115 denotes sampling points P0, P1 to Pn and Ts represents a sampling cycle. When a circuit is arranged so that one bit of the analog-to-digital converter 102 is weighted to be 0.1 V/1 bit, the analog-to-digital converter 102 converts, for example, the input 10 V of the converter, i.e., the machining gap discharge voltage of 100 V, into the binary eight-bit digital value of "1100100" and outputs the conversion result. The voltage waveform is sampled per sampling cycle Ts and converted into a digital value, and data Dn at sampling point Pn is stored into address An of the storage device 103.

The direct-current component of the discharge voltage can be represented by $Va=(D0+D1+\ldots+Dn)/n$ assuming that Va is the addition average of digital values D0 to Dn at sampling points P0 to Pn at the time of discharge occurrence. High frequency components at sampling points P0 to Pn can be represented by the absolute values of differences between digital values D0 to Dn and Va, $|D0-Va|, |D1-Va|, \ldots, |Dn-Va|$, and the average value Vb of the high frequency components can be represented by $Vb=(|D0-Va|+|D1-Va|+\ldots+|Dn-Va|)/n$.

On detection of the start of discharge stop time Toff from the discharge pulse Ton/Toff timing signal 113, the arithmetic device 104 operates on the addition average Va of said digital values D0 to Dn and the average value Vb of the high frequency components using digital values D0 to Dn stored in the storage device 103. The comparator 105 judges the machining status by comparison of data with the reference value generator or reference pattern generator 106. On the assumption that Va1 is the reference value of the direct-current component and Vb1 is the reference value of high frequency components, the comparator 105 determines that the machining status is stable when direct-current component Va is larger than its reference value Va1 and the machining status is instable when Va is smaller than Va1 and that the machining status is stable when high frequency component average value Vb is larger than its reference value Vb1 and the machining status is instable when Vb is smaller than Vb1.

As a matter of course, the arithmetic device 104 and the comparison judging device 105 composed by different CPUs in said embodiment may also be constituted by a single CPU. Said operation processing and comparison processing are performed during discharge stop time. On detection of discharge occurrence at a next pulse, the conversion processing and storage processing of the next pulse are carried out as in the preceding processings. However, since the operation processing and comparison processing of the previous pulse have ended during discharge stop time, the storage device 103 need not continue to store data D0 to Dn of the preceding pulse and is allowed to overwrite the data of the next pulse on memory, and the memory capacity is sufficient if the data of one pulse can be stored, achieving the machine with the minimum memory capacity.

While the simple addition average was used for the operation of the direct current component in said embodiment, a general n-degree expression, such as a first-degree expression, represented by, for example, $Va(t)=c1 \times t+c2$ may also be employed. In this case, high frequency component average Vb is represented by $Vb=(|D0-Va(t)|+\ldots+|Dn-Va(t)|)/n$.

Further, the voltage values over the whole time during the discharge were used for calculation in said embodiment may also be replaced by the voltage values within optional time during the discharge as required. Also, while the calculation was made under the control of the computer and software program in said embodiment, it is a matter of course that similar digital calculation may be achieved partly or wholly by a hardware logic circuit. Furthermore, whereas the discharge voltage was directly subjected to analog-to-digital conversion in said embodiment, it is apparent that the analog-to-digital conversion may be made and the result employed for calculation after the machining gap voltage has been introduced to the high-pass filter, resonance circuit, etc., and the alternating-current components or high frequency components of desired frequency fetched.

Figure 48:
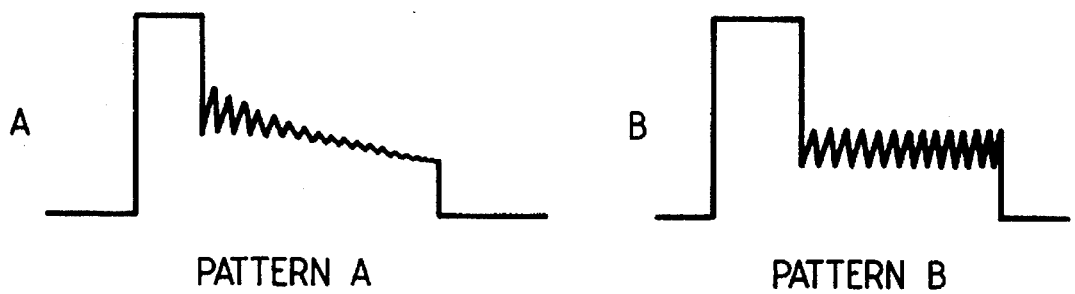
FIG. 48 illustrates discharge voltage waveforms provided to further describe a preferred embodiment of the invention.

FIG. 48 shows discharge voltage waveforms for the description of a twenty-ninth embodiment of the invention, wherein the high frequency components of the discharge voltage waveform 48-A are distributed to be larger in the early stage of discharge pulse Ton time and to be smaller in the final stage. This voltage waveform is valuable information indicating a premonitory phenomenon that machining will be instable. However, when the average value of the high frequency components is operated on and compared with the reference value as in this embodiment, the information on the change of such distribution will be lost. Hence, the arithmetic device 104 operates on and outputs the average value of the high frequency components in the present embodiment, and at the same time, recognizes patterns, in which the high frequency components decrease gradually as shown in waveform 48-A or increase gradually as shown in waveform 48-B, and outputs the result. The comparison judging device 105 compares a pattern with the reference patterns (patterns A, B, etc.) and judges pattern A as a premonitory status indicating that the machining status will be instable and pattern B as a stable machining status.

While the detection of high frequency components in a discharge voltage waveform was described in any of said embodiments, it is apparent that they are also applicable to a discharge current waveform, a machining gap impedance waveform, etc.

In the meantime, it is known in electrical discharge machining that electrical discharge characteristics depend on the electrical conditions set to the machining power supply, such as the pulse width, stop time and discharge peak value, and machining conditions from a machining condition setting device not shown (for example, the material and size of the electrode, the dielectric type, the time when the dielectric was changed last, the cycle of electrode up/down, the servo voltage and the dielectric pressure) and that the high frequency components of the discharge voltage waveform detected at the machining gap differ in amplitude or frequency depending on the same.

Accordingly, in each of the above described embodiments, the high frequency amplitude measuring parameters, such as the integration time constant, integration time and high-pass filter 4 cut-off frequency, the comparison reference value of the comparator, and/or the analysis reference value of the frequency analyzer may be changed on the basis of the electrical conditions set to the machining power supply, the machining conditions from the machining condition setting device, and the like. In this case, the embodiments can respond to a wide range of machining conditions.

It will be apparent that the invention, as detailed above, achieves an electrical discharge machining method and a machine therefor which detect an electrical discharge machining status precisely, prevent continuous arcs from being generated in a machining gap, prevent an electrode or a workpiece from being damaged, and improve machining efficiency considerably.

It will also be apparent that another invention of the present invention achieves an electrical discharge machine that offers stable machining and minimizes electrode consumption.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An electrical discharge machine for machining a workpiece by generating pulse discharges at a machining gap formed by a machining electrode and said workpiece opposed to each other, comprising:

low frequency intercepting means for passing only alternating-current components or high frequency components of at least one of the current, voltage and impedance of said machining gap;

rectifying means for rectifying the output of said low frequency intercepting means;

averaging means for averaging the output of said rectifying means; and display means for displaying, for each pulse, whether or not the output of the averaging means indicates a normal discharge.

2. The electrical discharge machine as defined in claim 1, further comprising:

discharge occurrence time detecting means for detecting discharge occurrence time;

time measuring means for outputting a time when a time constant of the low frequency intercepting means has elapsed, starting at said discharge occurrence time;

integrating means for integrating the output of the rectifying means according to the output of said time measuring means; and comparing means for comparing the output of the integrating means with a reference value to determine whether or not a normal discharge has occurred.

3. An electrical discharge machine for machining a workpiece by generating pulse discharges at a machining gap formed by a machining electrode and said workpiece opposed to each other, comprising:

low frequency intercepting means for passing only alternating-current components or high frequency components of at least one of the current, voltage and impedance of said machining gap;

rectifying means for rectifying the output of said low frequency intercepting means;

integrating means for integrating the output of said rectifying means;

control means for controlling the start and reset of said integrating means at the beginning of each pulse discharge; and display means for displaying, for each pulse, whether or not the output of the integrating means indicates a normal discharge.

4. An electrical discharge machine for machining a workpiece by generating pulse discharges at a machining gap formed by a machining electrode and said workpiece opposed to each other, comprising:

comparing means for comparing with a reference value at least one of the current, voltage and impedance of said machining gap, or alternating-current components or high frequency components of the current, voltage and impedance of said machining gap, or rectified outputs of the alternating-current components or high frequency components of the current, voltage and impedance of said machining gap; and time measuring means for receiving the output of the comparing means, generating a voltage waveform therefrom, and measuring a length of time during which the voltage waveform exceeds a comparison level during a single discharge;

controlling means for controlling a start and stop time between which the time measuring means measures said length of time; and display means for displaying whether or not the output of the time measuring means indicates a normal discharge.

5. An electrical discharge machine for machining a workpiece by generating pulse discharges at a machining gap formed by a machining electrode and said workpiece opposed to each other, comprising:

comparing means for comparing with a reference value at least one of the current, voltage and impedance of said machining gap, or alternating-current components or high frequency components of the current, voltage and impedance of said machining gap, or rectified outputs of the alternating-current components or high frequency components of the current, voltage and impedance of said machining gap;

count means for counting, during a single discharge, a number of at least one of leading edges and trailing edges of the output of said comparing means;

controlling means for resetting the count means at the beginning of each pulse discharge;

and display means for displaying, for each pulse, whether or not the output of the count means indicates a normal discharge.

6. An electrical discharge machine for machining a workpiece by generating pulse discharges at a machining gap formed by a machining electrode and said workpiece opposed to each other, comprising:

low frequency intercepting means for passing only alternating-current components or high frequency components of at least one of the current, voltage and impedance of said machining gap;

peak holding means for holding at least either of at least a maximum value and minimum value of the output of said low frequency intercepting means or a rectified output of said low frequency intercepting means over each pulse; and control means for controlling the reset of the output of said peak holding means.

7. An electrical discharge machine for machining a workpiece by generating pulse discharges at a machining gap formed by a machining electrode and said workpiece opposed to each other, comprising:

frequency analyzing means for analyzing a frequency distribution of at least one of the current, voltage and impedance of said machining gap;

control means for controlling the start and reset of said frequency analyzing means; and display means for displaying the output of said frequency analyzing means;

said frequency analyzing means outputting a frequency distribution centered at the center of gravity of the frequency distribution during a partial or whole discharge period, or a strength in a specific frequency zone.

8. An electrical discharge machine for machining a workpiece by generating pulse discharges at a machining gap formed by a machining electrode and said workpiece opposed to each other, comprising:

low frequency intercepting means for passing only alternating-current components or high frequency components of at least one of the current, voltage and impedance of said machining gap;

rectifying means for rectifying the output of said low frequency intercepting means;

integrating means for integrating the output of said rectifying means;

control means for controlling the start and reset of said integrating means; and count means for counting discharge pulses generated at said machining gap;

said integrating means being reset when said count means has counted a given number of discharge pulses.

9. An electrical discharge machine for machining a workpiece by generating pulse discharges at a machining gap formed by a machining electrode and said workpiece opposed to each other, comprising:

discharge detecting means for determining whether or not a discharge has occurred at said machining gap; and discharge status detecting means for detecting a discharge status by measuring alternating-current components or high frequency components of at least one of the current, voltage and impedance of said machining gap;

said discharge status detecting means measuring said alternating-current components or high frequency components not less than 1 microsecond after the occurrence of the discharge.

10. An electrical discharge machine for machining a workpiece by generating pulse discharges at a machining gap formed by a machining electrode and said workpiece opposed to each other, comprising:

short-circuit detecting means for determining whether or not a short circuit has occurred at said machining gap;

discharge status detecting means for detecting a discharge status by measuring alternating-current components or high frequency components of at least one of the current, voltage and impedance of said machining gap;

first comparing means for comparing the output of said discharge status detecting means with a first reference value and for providing a first digital output of the discharge status indicating a normal discharge when the output of said discharge status detecting means is greater than said first reference value;

second comparing means for comparing the output of said discharge status detecting means with a second reference value, set lower than said first reference value, and for providing a second digital output of the discharge status indicating a quasi-arc discharge when the output of said discharge status detecting means is greater than said second reference value and indicating an arc discharge when the output of said discharge status detecting means is less than said second reference value;

control means for controlling a machining condition according to the output of said short-circuit detecting means and the output of said comparing means.

11. An electrical discharge machine for machining a workpiece by generating pulse discharges at a machining gap formed by a machining electrode and said workpiece opposed to each other, comprising:

short-circuit detecting means for determining whether or not a short circuit has occurred at said machining gap;

discharge status detecting means for detecting a discharge status by measuring alternating-current components or high frequency components of at least one of the current, voltage and impedance of said machining gap; and first comparing means for comparing the output of said discharge status detecting means with a first reference value and for providing a first digital output of the discharge status indicating a normal discharge when the output of said discharge status detecting means is greater than said first reference value;

second comparing means for comparing the output of said discharge status detecting means with a second reference value, set lower than said first reference value, and for providing a second digital output of the discharge status indicating a quasi-arc discharge when the output of said discharge status detecting means is greater than said second reference value and indicating an arc discharge when the output of said discharge status detecting means is less than said second reference value;

control means for controlling a machining condition according to the outputs of said short-circuit detecting means and said first and second comparing means;

said control means designed to carry out the same control independently of the output of said discharge status detecting means if said short-circuit detecting means has detected the occurrence of a short circuit and to exercise control according to the output of said discharge status detecting means if short circuit occurrence is not detected.

12. An electrical discharge machine for machining a workpiece by generating pulse discharges at a machining gap formed by a machining electrode and said workpiece opposed to each other, comprising:

discharge pulse judging means for determining whether each discharge pulse is normal or faulty;

first count means for counting a number of successive faulty discharge pulses;

second count means for counting a number of successive normal discharge pulses; and means for causing said first count means to count and resetting said second count means when said faulty discharge pulse has occurred, for causing said second count means to count and resetting said first count means when said normal discharge pulse has occurred, for exercising control to reduce in intensity an electrical discharge machining condition and resetting said first count means when said first count means has counted a set value, and for exercising control to increase in intensity, the electrical discharge machining condition and resetting said second count means when said second count means has counted a set value.

13. The electrical discharge machine as set forth in claim 12, further comprising:

control means for controlling the stop time of electrical discharge machining to be longer when faulty discharge pulses have occurred and to be shorter when normal discharge pulses have occurred;

machining status detecting means for employing the length of the stop time as an indicator of stability or instability of the electrical discharge machine; and machining condition changing means for changing a machining condition according to the output of said machining status detecting means.

14. An electrical discharge machine for machining a workpiece by generating pulse discharges at a machining gap formed by a machining electrode and said workpiece opposed to each other, comprising:

discharge status detecting means for detecting a discharge status; and numerical control means for adjusting a machining condition based upon an output of said discharge status detecting means, wherein said numerical control means adjusts the machining condition after a delay time has elapsed;

stop control means for temporarily increasing a stop time between pulse discharges by at least one order of magnitude during said delay time until the machining condition is changed under the command of the numerical control means.

15. An electrical discharge machine for machining a workpiece by generating pulse discharges at a machining gap formed by a machining electrode and said workpiece opposed to each other, comprising:

discharge pulse judging means for determining whether each discharge pulse is normal or faulty;

first count means for counting a number of successive faulty discharge pulses determined to be faulty by said discharge pulse judging means;

second count means for counting a number of successive normal discharge pulses determined to be normal by said discharge pulse judging means; and control means for changing a machining condition under the command of command means when the count value of each count means has reached a set value and for temporarily stopping the discharge or controlling the machining condition to temporarily stop machining or to be reduced in intensity from when the count means has reached the set value until the machining condition is changed under the command of the commanding means.

16. An electrical discharge machine for machining a workpiece by generating pulse discharges at a machining gap formed by a machining electrode and said workpiece opposed to each other, comprising:

detecting means for detecting high frequency components included in a machining gap voltage, for discriminating said detected high frequency components in at least three stages, and for outputting a discrimination signal in one of periods from when desired delay time shorter than discharge duration has elapsed after the start of each discharge generated by the applied voltage to said machining gap until the termination of the discharge; and control means for exercising control to reduce in intensity an electrical discharge machining condition when a first stage discharge having a smallest number of said high frequency components takes place, to reduce in intensity the electrical discharge machining condition to a lesser degree than at the occurrence of the first stage discharge with the smallest number of high frequency components when a second stage discharge having a second smallest number of high frequency components takes place, and to increase in intensity the electrical discharge machining condition when a third stage discharge having a largest number of high frequency components take place.

17. An electrical discharge machine for machining a workpiece by generating pulse discharges at a machining gap formed by a machining electrode and said workpiece opposed to each other, comprising:

detecting means for detecting high frequency components included in a machining gap voltage, for discriminating said detected high frequency components in at least three stages, a first stage wherein said high frequency components are the fewest, a second stage wherein the high frequency components are the second fewest, and a third stage wherein the high frequency components are the most, and for outputting a discrimination signal in a period extending from when a desired delay time shorter than discharge duration has elapsed after the start of each discharge generated by the applied voltage to said machining gap, until the termination of the discharge;

first count means for counting discharge pulses in said first stage;

second count means for counting discharge pulses in said second stage;

third count means for counting discharge pulses in said third stage; and control means for exercising control reduce in intensity an electrical discharge machining condition when the first count means has counted a preset number of discharge pulses, to reduced in intensity the electrical discharge machining condition to a lesser degree than at the counting of the preset number of discharge pulses by the first count means when the second count means has counted a preset number of discharge pulses, and to increase in intensity the electrical discharge machining condition when the third count means has counted a preset number of discharge pulses.

18. The electrical discharge machine as defined in claim 17, wherein each of the first to the third count means counts a number of corresponding successive discharge pulses.

19. An electrical discharge machine for machining a workpiece by generating pulse discharges at a machining gap formed by a machining electrode and said workpiece opposed to each other, comprising:

machining status judging means for determining whether an electrical discharge machining status is stable or instable; and machining condition changing means for carrying out machining under machining conditions having small energy in an initial machining stage and increasing the machining energy in subsequent pulses when said machining status judging means has determined the machining status to be excellent.

20. An electrical discharge machine for machining a workpiece by generating pulse discharges at a machining gap formed by a machining electrode and said workpiece opposed to each other, comprising:

detecting means for detecting high frequency components included in a machining gap voltage, for discriminating said detected high frequency components at least between a discharge with a small number of said high frequency components and a discharge with a large number of said high frequency components, and for outputting a discrimination signal in one of periods from when desired delay time shorter than discharge duration has elapsed after the start of each discharge generated by the applied voltage to said machining gap until the termination of the discharge;

first count means for counting discharge pulses with the small number of high frequency components;

second counter means for counting discharge pulses with the large number of high frequency components; and means for performing machining under machining conditions having small energy in an initial machining stage, for increasing the machining energy in sequence as a ratio of a number of discharge pulses with the small number of high frequency components to a number of discharge pulses with the large number of high frequency components generated in a predetermined period of time drops below a predetermined value, and for changing the machining conditions to those with small energy when the switching to the machining conditions having large energy in the initial machining stage has caused the ratio of a number of discharge pulses with the small number of high frequency components to a number of discharge pulses with the large number of high frequency components generated in a predetermined period of time to rise above a predetermined value.

21. An electrical discharge machine for machining a workpiece by generating pulse discharges at a machining gap formed by a machining electrode and said workpiece opposed to each other, comprising:

detecting means for detecting high frequency components included in a machining gap voltage, for discriminating said detected high frequency components at least between a discharge with a small number of said high frequency components and a discharge with a large number of said high frequency components, and for outputting a discrimination signal in one of periods from when desired delay time shorter than discharge duration has elapsed after the start of each discharge generated by the applied voltage to said machining gap until the termination of the discharge;

first count means for counting the number of successive discharge pulses with the small number of high frequency components;

second count means for counting the number of successive discharge pulses with the large number of high frequency components; and means for performing machining under a machining conditions having small energy in an initial machining stage, for changing the machining conditions to those with large energy when the count of said first count means does not reach a set value or in a predetermined period of time after the count of said first count means does not reach the set value, and for returning the machining conditions to those with small energy when the switching to the machining conditions having large energy in the initial machining stage has caused the count of said first count means to reach the set value.

22. An electrical discharge machine for machining a workpiece by generating pulse discharges at a machining gap formed by a machining electrode and said workpiece opposed to each other, comprising:

analog-to-digital converting means for sampling the current, voltage or impedance of said machining gap to make conversion from analog values to digital values;

arithmetic means for distinguish and operating on high frequency components and direct-current component of said current, voltage or impedance from the digital values given by said analog-to-digital converting means; and comparing means for comparing the output of said arithmetic means with a reference value.

23. An electrical discharge machine for machining a workpiece by generating pulse discharges at a machining gap formed by a machining electrode and said workpiece opposed to each other, comprising:

analog-to-digital converting means for sampling the current, voltage or impedance of said machining gap to make conversion from analog values to digital values;

recognizing means for recognizing a time domain waveform shape of said current, voltage or impedance from the digital values given by said analog-to-digital converting means; and comparing means for comparing the output of said recognizing means with a reference waveform.

24. An electrical discharge machining method for detecting the condition of machining a workpiece, said machining being conducted by generating pulse discharges at a machining gap formed by a machining electrode and said workpiece opposed to each other, comprising:

detecting operation components, comprising alternating-current components or high frequency components of at least one of the current, voltage and impedance of said machining gap;

rectifying said detected components;

filtering said rectified components;

processing said filtered components;

identifying the discharge status by comparing said processed components of a single pulse to a judgement threshold value; and displaying the discharge status.

25. The electrical discharge machining method as set forth in claim 24, wherein said filtering step comprises smoothing said rectified components.

26. The electrical discharge machining method as set forth in claim 24, wherein said filtering step comprises averaging said rectified components.

27. The electrical discharge machining method as set forth in claim 24, wherein said filtering step comprises integrating said rectified components.

28. The electrical discharge machining method as set forth in claim 27, wherein said integrating step comprises operating at an integration starting time when a time constant of low frequency interception has elapsed, starting at the discharge occurrence time.

29. The electrical discharge machining method as set forth in claim 24, wherein said processing step comprises measuring a length of time when at least one of said operating components, rectified components and filtered components is larger or smaller than a reference value to detect a magnitude of high frequency components during a discharge.

30. The electrical discharge machining method as set forth in claim 24, wherein said processing step comprises conducting frequency analyses on at least one of the current, voltage and impedance of the machining gap and said displaying step comprises displaying a frequency distribution centered at the center of gravity of the frequency distribution or strength in a specific frequency zone to make frequency analyses only on the pulse waveform during discharge.

31. The electrical discharge machining method as set forth in claim 24, wherein said identifying step further comprises:

detecting an occurrence of a short circuit;

comparing the processed components with a first reference value, and providing a first digital output of the discharge status indicating a normal discharge when the processed components are greater than said first reference value; and comparing the processed components with a second reference value, set lower than said first reference value, and providing a second digital output of the discharge status indicating a quasi-arc discharge when the processed components are greater than said second reference value and indicating an arc discharge when the processed components are less than said second reference value.

32. The electrical discharge machining method as set forth in claim 31, further comprising:

executing only one type of machining condition control independently of the discharge status if a short circuit has occurred, and controlling the machining condition according to the detected discharge status if a short circuit does not occur.

33. The electrical discharge machining method as set forth in claim 24, wherein said identifying step further comprises discriminating each discharge pulse generated by an applied voltage to said machining gap between normal and faulty counting a number of successively faulty discharge pulses;

counting a number of successively normal discharge pulses;

resetting a count of normal discharge pulses when a faulty discharge has occurred;

resetting a count of faulty discharge pulses when a normal discharge has occurred;

reducing in intensity an electrical discharge machining condition and resetting the count of faulty discharge pulses when the count of faulty discharge pulses reaches a set value; and increasing in intensity an electrical discharge machining condition and resetting the count of normal discharge pulses when the count of normal discharge pulses reaches a set value.

34. The electrical discharge machining method as set forth in claim 24, wherein said identifying step further comprises detecting the premonitory phenomenon of continuous arcs which will damage the machined surface of the workpiece; and temporarily increasing a stop time between pulse discharges by at least one order of magnitude until an appropriate machining condition can be selected and implemented.

35. The electrical discharge machining method as set forth in claim 24, wherein said identifying step further comprises recognizing a time domain waveform shape of the operating conditions, and eliminating disturbances attributable to transient characteristics.

* * * * *